US008086662B1

(12) United States Patent
Doyle et al.

(10) Patent No.: US 8,086,662 B1
(45) Date of Patent: *Dec. 27, 2011

(54) DISTRIBUTED HYPERMEDIA METHOD AND SYSTEM FOR AUTOMATICALLY INVOKING EXTERNAL APPLICATION PROVIDING INTERACTION AND DISPLAY OF EMBEDDED OBJECTS WITHIN A HYPERMEDIA DOCUMENT

(75) Inventors: Michael D. Doyle, Wheaton, IL (US); David C. Martin, San Jose, CA (US); Cheong S. Ang, Pacifica, CA (US)

(73) Assignee: The Regents of the University of California, Oakford, CA (US)

( * ) Notice: Subject to any disclaimer, the term of this patent is extended or adjusted under 35 U.S.C. 154(b) by 1219 days.

This patent is subject to a terminal disclaimer.

(21) Appl. No.: 11/586,918

(22) Filed: Oct. 26, 2006

Related U.S. Application Data

(63) Continuation of application No. 10/217,955, filed on Aug. 9, 2002, now Pat. No. 7,599,985, which is a continuation of application No. 09/075,359, filed on May 8, 1998, now abandoned, which is a continuation of application No. 08/324,443, filed on Oct. 17, 1994, now Pat. No. 5,838,906.

(51) Int. Cl.
*G06F 9/46* (2006.01)
*G06F 17/30* (2006.01)
*G06F 9/50* (2006.01)

(52) U.S. Cl. ........ 709/202; 709/218; 709/219; 715/205; 715/738; 715/760; 715/777; 715/804; 718/106; 345/419; 345/427; 345/619; 345/638; 345/649; 345/653; 345/654; 345/655; 345/656; 707/E17.119

(58) Field of Classification Search .................. 709/202, 709/218, 219; 345/419, 427, 619, 638, 649, 345/653–656; 718/106; 719/310, 315; 707/E17.119
See application file for complete search history.

(56) References Cited

U.S. PATENT DOCUMENTS
4,815,029 A 3/1989 Barker et al.
(Continued)

FOREIGN PATENT DOCUMENTS
DE 4440598 C1 5/1996
(Continued)

OTHER PUBLICATIONS
Microsoft's Offer of Proof and Motion to Reconsider Regarding Revision of Claim Construction (1:99-cv-00626) (N. D. Ill Apr. 26, 2007).
(Continued)

*Primary Examiner* — Larry Donaghue
(74) *Attorney, Agent, or Firm* — Charles E. Krueger

(57) ABSTRACT

A system allowing a user of a browser program on a computer connected to an open distributed hypermedia system to access and execute an embedded program object. The program object is embedded into a hypermedia document much like data objects. The user may select the program object from the screen. Once selected the program object executes on the user's (client) computer or may execute on a remote server or additional remote computers in a distributed processing arrangement. After launching the program object, the user is able to interact with the object as the invention provides for ongoing interprocess communication between the application object (program) and the browser program. One application of the embedded program object allows a user to view large and complex multi-dimensional objects from within the browser's window. The user can manipulate a control panel to change the viewpoint used to view the image. The invention allows a program to execute on a remote server or other computers to calculate the viewing transformations and send frame data to the client computer thus providing the user of the client computer with interactive features and allowing the user to have access to greater computing power than may be available at the user's client computer.

28 Claims, 9 Drawing Sheets

U.S. PATENT DOCUMENTS

| | | | |
|---|---|---|---|
| 4,847,604 A | 7/1989 | Doyle | |
| 4,949,248 A | 8/1990 | Caro | |
| 5,056,057 A | 10/1991 | Johnson et al. | |
| 5,146,553 A | 9/1992 | Noguchi et al. | |
| 5,202,828 A | 4/1993 | Vertelney et al. | |
| 5,204,947 A | 4/1993 | Bernstein et al. | |
| 5,206,951 A | 4/1993 | Khoyi et al. | |
| 5,274,821 A | 12/1993 | Rouquie | |
| 5,297,249 A | 3/1994 | Bernstein et al. | |
| 5,307,499 A | 4/1994 | Yin | |
| 5,321,806 A | 6/1994 | Meinerth et al. | |
| 5,321,807 A | 6/1994 | Mumford | |
| 5,321,808 A | 6/1994 | Rupp | |
| 5,339,392 A | 8/1994 | Risberg | |
| 5,347,632 A | 9/1994 | Filepp et al. | |
| 5,367,621 A | 11/1994 | Cohen | |
| 5,367,635 A | 11/1994 | Bauer et al. | |
| 5,390,314 A | 2/1995 | Swanson | |
| 5,410,688 A | 4/1995 | Williams et al. | |
| 5,418,908 A | 5/1995 | Keller et al. | |
| 5,425,141 A | 6/1995 | Gedye | |
| 5,487,141 A | 1/1996 | Cain et al. | |
| 5,495,581 A | 2/1996 | Tsai | |
| 5,499,369 A | 3/1996 | Atkinson | |
| 5,537,526 A | 7/1996 | Anderson et al. | |
| 5,544,320 A | 8/1996 | Konrad | |
| 5,557,724 A | 9/1996 | Sampat et al. | |
| 5,581,506 A | 12/1996 | Yamauchi | |
| 5,581,686 A | 12/1996 | Koppolu et al. | |
| 5,581,760 A | 12/1996 | Atkinson et al. | |
| 5,594,837 A | 1/1997 | Noyes | |
| 5,606,493 A | 2/1997 | Duscher et al. | |
| 5,608,909 A | 3/1997 | Atkinson et al. | |
| 5,613,058 A | 3/1997 | Koppolu et al. | |
| 5,613,124 A | 3/1997 | Atkinson | |
| 5,634,019 A | 5/1997 | Koppolu et al. | |
| 5,634,129 A | 5/1997 | Dickinson | |
| 5,652,876 A | 7/1997 | Ashe et al. | |
| 5,669,005 A | 9/1997 | Curbow | |
| 5,694,546 A | 12/1997 | Reisman | |
| 5,710,925 A | 1/1998 | Leach | |
| 5,710,928 A | 1/1998 | Atkinson | |
| 5,717,755 A | 2/1998 | Shanton | |
| 5,732,229 A | 3/1998 | Dickinson | |
| 5,745,764 A | 4/1998 | Leach et al. | |
| 5,752,056 A | 5/1998 | Celik | |
| 5,754,175 A | 5/1998 | Koppolu et al. | |
| 5,778,383 A | 7/1998 | Grisar | |
| 5,778,385 A | 7/1998 | Pratt | |
| 5,787,448 A | 7/1998 | Anderson et al. | |
| 5,801,701 A | 9/1998 | Koppolu et al. | |
| 5,805,885 A | 9/1998 | Leach | |
| 5,812,862 A | 9/1998 | Smith et al. | |
| 5,838,906 A * | 11/1998 | Doyle et al. | 715/205 |
| 5,848,429 A | 12/1998 | McEntee et al. | |
| 5,877,765 A | 3/1999 | Dickman | |
| 6,055,514 A | 4/2000 | Wren | |
| 6,064,406 A | 5/2000 | Atkinson | |
| 6,240,465 B1 | 5/2001 | Leach | |
| 6,269,403 B1 | 7/2001 | Anders | |
| 6,412,020 B1 | 5/2002 | Leach | |
| 6,526,454 B2 | 2/2003 | Williams et al. | |
| 6,618,754 B1 | 9/2003 | Gosling | |
| 7,016,084 B2 | 3/2006 | Tsai | |
| 7,599,985 B2 * | 10/2009 | Doyle et al. | 709/202 |

FOREIGN PATENT DOCUMENTS

| | | | |
|---|---|---|---|
| EP | 0384986 A2 | 5/1990 |
| EP | 0483576 A2 | 5/1992 |
| EP | 0650126 A1 | 4/1995 |

OTHER PUBLICATIONS

Declaration of Dr. John P.J. Kelly in Support of Microsoft's Offer of Proof of Non-infringement (1:99-cv-00626) (N. D. Ill Apr. 26, 2007).

Reply Brief of Defendant-Appellant Microsoft Corporation (04-1234) (Fed. Cir. Aug. 16, 2004).

Brief of Defendant-Appellant Microsoft Corporation (04-1234) (Fed. Cir. Jun. 3, 2004).

Transcript of Trial Testimony of John Kelly, pp. 2640-2862 (1:99-cv-00626) (N. D. Ill. Jul. 31, 2003).

Supplemental Expert Witness Report or Larry S. Nixon Pursuant to Fed. R. Civ. P. Rule 26(a)(2)(B) (1:99-cv-00626) (N.D. Ill. May 21, 2007).

Plaintiff's Memorandum of Law in opposition to Microsoft Corporation's Offer of Proof and Motion to Reconsider Regarding Revision of Claim Construction (1:99-cv-00626) (N.D. Ill. May 21, 2007).

Plaintiffs' Statement of Undisputed Facts in Support of Their Motion for Summary Judgment on Inequitable Conduct (1:99-cv-00626) (N.D. Ill. May 21, 2007).

Plaintiffs' Memorandum of Law in Support of Their Motion for Summary Judgment on Inequitable Conduct and Plaintiffs' Opposition to Defendant's Motion for Leave to Amend its Answer and Counterclaim (1:99-cv-00626) (N.D. Ill. May 21, 2007).

Supplemental Expert Report of Dr. John P.J. Kelly Regarding Invalidity of United States Patent No. 5,838,906 (1:99-cv-00626) (N.D. Ill. May 21, 2007).

Corrected Supplemental Expert Witness Report of Larry S. Nixon Pursuant to Fed. R. Civ. P. Rule 26(a)(2)(B) (1:99-cv-00626) (N.D. Ill. May 22, 2007).

Plaintiffs' Sur-Reply Memorandum of Law in Opposition to Defendant's Motion for Leave to Amend its Answer and Counterclaim (1:99-cv-00626) (N.D. Ill. May 30, 2007).

Plaintiffs' Status Statement for May 31, 2007 Hearing (1:99-cv-00626) (N.D. Ill. May 30, 2007).

Microsoft's Status Report for May 31, 2007 Hearing (1:99-cv-00626) (N.D. Ill. May 29, 2007).

Defendant Microsoft's Motion to Continue Trial Pending Newly-Declared Interference in the PTO Between the '906 Patent and Microsoft's Koppolu Patent (1:99-cv-00626) (N.D. Ill. May 29, 2007).

Defendant Microsoft's Reply Memorandum in Support of its Motion for Leave to Amend its Answer and Counterclaim (1:99-cv-00626) (N.D. Ill. May 25 2007).

Plaintiffs' Memorandum of Law in Opposition to Microsoft Corporation's Motion to Continue Trial (1:99-cv-00626) (N.D. Ill. May 30, 2007).

*Eolas* v. *Microsoft* Combined Petition of Microsoft Corporation for Rehearing and Rehearing En Banc (Appeal No. 04-1234 in the U.S. Court of Appeals for the Federal Circuit—Mar. 16, 2005).

Declaration of Interference, *Doyle* v. *Koppolu*, Patent Interference 105,563 McK (May 24, 2007).

Ex Parte Srinivasa R. Koppolu, C. Douglas Hodges, Barry B. MacKichan, Richard McDaniel, Rao V. Remala, and Antony S. Williams, App. No. 2005-1431 (B.P.A.I. May 24, 2007).

Koppolu Motion 2 (for judgement based on Doyle inequitable conduct), *Doyle* v. *Koppolu*, Patent Interference 105,563 McK (Aug. 15, 2007)

Judgment, *Doyle* v. *Koppolu*, Patent Interference 105,563 McK (Sep. 25, 2007).

Plaintiffs' Local Rule 56.1 (a) Response to Defendant's Statement of Additional Facts regarding Plaintiffs' Motion for Summary Judgment on Inequitable Conduct and Exhibits, *Eolas* v. *Microsoft*, Case No. 99 C 0626 (Jul. 19, 2007).

Defendant Microsoft's Local Rule 56.1 (a) Response to Plaintiffs' Statement of Additional Facts regarding Microsoft's Motion for Summary Judgment of Obviousness and Exhibits, *Eolas* v. *Microsoft*, Case No. 99 C 0626 (Jul. 18, 2007).

Reply in Support of Microsoft's Motion for Summary Judgment of Obviousness and Exhibits, *Eolas* v. *Microsoft*, Case No. 99 C 0626 (Jul. 18, 2007).

Plaintiffs' Reply Brief in Support of Their Motion for Summary Judgment on Inequitable Conduct, *Eolas* v. *Microsoft*, Case No. 99 C 0626 (Jul. 18, 2007).

Declaration of Edward W. Felton in Support of Plaintiffs' Opposition to Microsoft's Motion for Summary Judgment, *Eolas* v. *Microsoft*, Case No. 99 C 0626 (Jul. 9, 2007).

Plaintiffs' Local Rule 56.1 (b)(3) Response to Microsoft Corporation's Statement of Undisputed Facts in Support of its Motion for Summary Judgment of Obviousness, *Eolas v. Microsoft*, Case No. 99 C 0626 (Jul. 9, 2007).
Defendant Microsoft's Local Rule 56.1 (b)(3) Response to Plaintiffs' Statement of Undisputed Facts, and Microsoft's Statement of Additional Material Facts, in Opposition to Plaintiffs' Motion for Summary Judgment on Inequitable Conduct and Exhibits, *Eolas v. Microsoft*, Case No. 99 C 0626 (Jul. 9, 2007).
Plaintiffs' Opposition to Microsoft's Motion for Summary Judgment of Obviousness, *Eolas v. Microsoft*, Case No. 99 C 0626 (Jul. 9, 2007).
Defendant Microsoft's Opposition to Plaintiffs' Motion for Summary Judgment on Inequitable Conduct, *Eolas v. Microsoft*, Case No. 99 C 0626 (Jul. 9, 2007).
Microsoft's Local Rule 56.1 Statement of Undisputed Facts in Support of its Motion for Summary Judgment of Obviousness and Exhibits, *Eolas v. Microsoft*, Case No. 99 C 0626 (Jun. 29, 2007).
Memorandum in Support of Microsoft's Motion for Summary Judgment of Obviousness and Exhibits, *Eolas v. Microsoft*, Case No. 99 C 0626 (Jun. 29, 2007).
DTX1031-c.pdf (MS__SUPP1205 002 part 1).
DTX1031-hmml.pdf (MS__SUPP1205 002 part 2).
DTX1031-html.pdf (MS__SUPP1205 002 part 3).
DTX1031-images.pdf (MS__SUPP1205 002 part 4).
DTX1031-make.pdf (MS__SUPP1205 002 part 5).
DTX1031-other.pdf (MS__SUPP1205 002 part 6).
DTX1031-shell.pdf (MS__SUPP1205 002 part 7).
DTX1031-v.pdf (MS__SUPP1205 002 part 8).
DTX1031-wais.pdf (MS__SUPP1205 002 part 9).
DTX1030-c1.pdf (MS__SUPP1205 001 part 1).
DTX1030-c2.pdf (Ms SUPP1205 001 part 2).
DTX1030-hmml.pdf (MS__SUPP1205 001 part 3).
DTX1030-html.pdf (MS__SUPP1205 001 part 4).
DTX1030-images.pdf (MS__SUPP1205 001 part 5).
DTX1030-make.pdf (MS__SUPP1205 001 part 6).
DTX1030-other.pdf (MS__SUPP1205 001 part 7).
DTX1030-ps.pdf (MS__SUPP1205 001 part 8).
DTX1030-sgml.pdf (MS__SUPP1205 001 part 9).
DTX1030-shell.pdf (MS__SUPP1205 001 part 10).
DTX1030-v1.pdf (MS__SUPP1205 001 part 11).
DTX1030-v2.pdf (MS__SUPP1205 001 part 12).
DTX1030-wais.pdf (MS__SUPP1205 001 part 13).
DX258-c.pdf.
DX258-images.pdf.
DX258-ps.pdf.
DX258-text.pdf.
DX258-wais.pdf.
DX326-c.pdf.
DX326-images.pdf.
DX326-text.pdf.
DX273-c.pdf.
DX273-images.pdf.
DX273-text.pdf.
E-027693-c.pdf.
E-027693-make.pdf.
E-027693-text.pdf.
E-021700-c.pdf.
E-021700-html.pdf.
E-021700-images.pdf.
E-021700-make.pdf.
E-021700-ps.pdf.
E-021700-shell.pdf.
E-021700-text.pdf.
DX215-text1.pdf.
DX215-text2.pdf.
DX215-c.pdf.
DX215-images.pdf.
DX215-make.pdf.
DX215-ps.pdf.
DX215-shell.pdf.
DX215-text3.pdf.

In re Srinivasa Koppolu, et al., Appeal No. 2005-1431, U.S. Appl. No. 09/442,070 for reissue of Patent 5,801,701 (B.P.A.I. Nov. 14, 2005).
Notice of Lodging of Deposition Testimony Played in Plaintiffs Case in Chief (Jul. 22, 2003) (Koppolu Testimony).
Expert Witness Report of Larry S. Nixon Pursuant to Fed. R. Civ. P. Rule 26(a)(2)(B) (Dec. 14, 2001).
OLE 2.0 PDC Questions and Answers (no date).
Stephen Le Hunte, "<EEMBED>—Embedded Objects," HTML Reference Library—HTMLIB v2.1, 1995: n.pag. Online. Internet.
Andreessen, M., Dec. 1, 1992 post to WWW Talk Mailing list.
Defendant's Trial Exhibit 273: Information Regarding Microsoft OLE 2.01 SDK (CD).
File Tree Printout of Defendant's Trial Exhibit 273: Information Regarding Microsoft OLE 2.01 SDK.
Defendant's Trial Exhibit 258: Information Regarding Microsoft OLE 2.0 Toolkit Program (CD).
File Tree Printout of Defendant's Trial Exhibit 258: Information Regarding Microsoft OLE 2.0 Toolkit Program.
MS-ET 0166172: Information Regarding Microsoft OLE 2.01 SDK (CD).
File Tree Printout of MS-ET 0166172: Information Regarding Microsoft OLE 2.01 SDK.
MS-ET 0189860: First Companion Disk for "Inside OLE 2" by Kraig Brockschmidt (CD).
File Tree Printout of MS-ET 0189860: First Companion Disk for "Inside OLE 2" by Kraig Brockschmidt.
MS-ET 0189861: Second Companion Disk for "Inside OLE 2" by Kraig Brockschmidt (CD).
File Tree Printout of MS-ET 0189861: Second Companion Disk for "Inside OLE 2" by Kraig Brockschmidt.
Defendant's Trial Exhibit 326: Information Regarding Multimedia Viewer (CD).
File Tree Printout of Defendant's Trial Exhibit 326: Information Regarding Multimedia Viewer.
Defendants Trial Exhibit 215: Information Regarding Emacs (CD).
File Tree Printout of Defendants Trial Exhibit 215: Information Regarding Emacs.
E 021700: Information Regarding WebRouser (CD).
File Tree Printout of E 021700: Information Regarding WebRouser.
E 027693: Information Regarding Distributed Hypermedia Object Embedding (DHOE) (CD).
File Tree Printout of E 027693: Information Regarding Distributed Hypermedia Object Embedding (DHOE).
*Eolas Techs., Inc. v. Microsoft Corp.*, No. 99-C-626, 2003 U.S. Dist. LEXIS 11476 (N.D. Ill. Jul. 2, 2003).
*Eolas Techs., Inc. v. Microsoft Corp.*, 270 F.Supp.2d 997 (N.D. Ill., Jul. 1, 2003).
*Eolas Techs., Inc. v. Microsoft Corp.*, No. 99-C-626, 2003 U.S. Dist. LEXIS 6322 (N.D. Ill. Apr. 16, 2003).
*Eolas Techs., Inc. v. Microsoft Corp.*, 65 U.S.P.Q.2d 1090 (N.D. Ill. Oct. 18, 2002).
*Eolas Techs., Inc. v. Microsoft Corp.*, No. 99-C-626, 2000 U.S. Dist. LEXIS 18886 (N.D. Ill. Dec. 28, 2000).
Complaint and Demand for Jury Trial, *Eolas Techs., Inc. v. Microsoft Corp.*, No. 99-C-626 (N.D. Ill) (Feb. 2, 1999).
Answer, *Eolas Techs., Inc. v. Microsoft Corp.*, No. 99-C-626 (N.D. Ill) (Mar. 24, 1999).
Microsoft Corporation's Submission Regarding Claim Construction Issues and Scheduling, *Eolas Techs., Inc. v. Microsoft Corp.*, No. 99-C-626 (N.D. Ill) (Sep. 7, 1999).
First Amended Answer and Counterclaim, *Eolas Techs., Inc. v. Microsoft Corp.*, No. 99-C-626 (N.D. Ill) (Sep. 7, 1999).
Plaintiff's Reply to Microsoft's First Amended Counterclaim, *Eolas Techs., Inc. v. Microsoft Corp.*, No. 99-C-626 (N.D. Ill) (Oct. 27, 1999).
Defendant Microsoft Corporation's Initial Brief on Claim Construction Issues, *Eolas Techs., Inc. v. Microsoft Corp.*, No. 99-C-626 (N.D. Ill Mar. 24, 1999) (Oct. 14, 2000).
Plaintiff Eolas Techs., Inc. Memorandum in Support of Claim Construction (N.D. Ill Oct. 14, 2000).
Defendant Microsoft Corporation's Reply Brief on Claim Construction Issues, *Eolas Techs., Inc. v. Microsoft Corp.*, No. 99-C-626 (N.D. Ill, Oct. 23, 2000).

Plaintiff Eolas Technologies' Reply Memorandum in Support of Claim Construction, *Eolas Techs., Inc.* v. *Microsoft Corp.*, No. 99-C-626 (N.D. Ill Oct. 23, 2000).
Memorandum Opinion and Order *Eolas Techs., Inc.* v. *Microsoft Corp.*, No. 99-C-626 (N.D. Ill, Dec. 28, 2000).
Plaintiff Eolas Technologies' First Amended Complaint and Demand for Jury Trial, *Eolas Techns., Inc.* v. *Microsoft Corp.*, No. 99-C-626 (N.D. Ill, Apr. 6, 2001) (Apr. 9, 2001).
Defendant Microsoft Corporation's Answer to First Amended Complaint and Second Amended Counterclaim, *Eolas Techs., Inc.* v. *Microsoft Corp.*, No. 99-C-626 (N.D. Ill) (Apr. 18, 2001).
Plaintiff Eolas Technologies' Reply to Defendant's Second Amended Counterclaim, *Eolas Techs., Inc.* v. *Microsoft Corp.*, No. 99-C-626 (N.D. Ill May 2, 2001).
Plaintiff Eolas Technologies' Second Amended Complaint and Demand for Jury Trial, *Eolas Techs., Inc.* v. *Microsoft Corp.*, No. 99-C-626 (N.D. Ill, Aug. 31, 2001) (Aug. 31, 2001).
Defendant Microsoft Corporation's Answer to Second Amended Complaint and Third Amended Counterclaim, *Eolas Tech., Inc.* v. *Microsoft Corp.*, No. 99-C-626 (N.D. Ill) (Sep. 17, 2001).
Plaintiff's Proposed Jury Instructions Regarding Claim Construction, *Eolas Techs., Inc.* v. *Microsoft Corp.*, No. 99-C-626 (N.D. Ill) (Jan. 27, 2003).
Plaintiff's Proposed Preliminary and Final Jury Instructions, *Eolas Techs., Inc.* v. *Microsoft Corp.*, No. 99-C-626 (N.D. Ill) (Apr. 25, 2003).
Memorandum of Microsoft Corporation in Support of its Motion to Clarify the Court's *In Limine* Ruling with Respect to Communications about the Viola WWW Browser involving *Michael Doyle, Eolas Techs., Inc.* v. *Microsoft Corp.*, No. 99-C-626 (N.D. Ill) (Jul. 2, 2003).
Plaintiff's Motion to Exclude Extrinsic Evidence of Claimed Pei Wei Invention beyond that Disclosed in the Precise Reference Asserted as Anticipating Prior Art, *Eolas Techs., Inc.* v. *Microsoft Corp.*, No. 99-C-626 (N.D. Ill) (Jul. 22, 2003).
Microsoft's Response to Plaintiffs' Motion to Exclude Extrinsic Evidence of Claimed Pei Wei Invention Beyond that Disclosed in the Precise Reference Asserted as Anticipating Prior Art, *Eolas Tech., Inc.* v. *Microsoft Corp.*, No. 99-C-626 (N.D. Ill) (Jul. 23, 2003).
Microsoft's Motion to Preclude Plaintiffs from Arguing that the Prior Art Lacks Elements not Found in the Claims of the '906 Patent, *Eolas Techs., Inc.* v. *Microsoft Corp.*, No. 99-C-626 (N.D. Ill) (Jul. 28, 2003).
Plaintiffs' Memorandum in Further Support of Their Motion to Exclude Extrinsic Evidence of Claimed Pei Wei Invention, *Eolas Techs., Inc.* v. *Microsoft Corp.*, No. 99-C-626 (N.D. Ill) (Jul. 29, 2003).
Microsoft's Offer of Proof Regarding Viola Prior Art, *Eolas Techs., Inc.* v. *Microsoft Corp.*, No. 99-C-626 (N.D. Ill) (Aug. 5, 2003).
Plaintiffs' Memorandum in Opposition to Microsoft's Offer of Proof Regarding the "Viola Prior Art," *Eolas Techs., Inc.* v. *Microsoft Corp.*, No. 99-C-626 (N.D. Ill, Aug. 11, 2003) (Aug. 7, 2003).
Microsoft's Post-Trial Brief on Inequitable Conduct, *Eolas Techs., Inc.* v. *Microsoft Corp.*, No. 99-C-626 (N.D. Ill) (Aug. 18, 2003).
Plaintiffs' Post-Trial Brief on Microsoft's Inequitable Conduct Claims, *Eolas Techs., Inc.* v. *Microsoft Corp.*, No. 99-C-626 (N.D. Ill) (Aug. 22, 2003).
Microsoft's Response to Plaintiffs' Post-Trial Brief on Inequitable Conduct, *Eolas Techs., Inc.* v. *Microsoft Corp.*, No. 99-C-626 (N.D. Ill) (Aug. 26, 2003).
Plaintiffs' Objections to Microsoft's Offer of Proof Regarding Viola Prior Art, *Eolas Techs., Inc.* v. *Microsoft Corp.*, No. 99-C-626 (N.D. Ill) (Sep. 3, 2003).
Defendant Microsoft's Motion for Judgment as a Matter of Law and a New Trial, *Eolas Techs., Inc.* v. *Microsoft Corp.*, No. 99-C-626 (N.D. Ill) (Oct. 6, 2003).
*Eolas Techs., Inc.* v. *Microsoft Corp.*, 1:99-CV-00626 (Fed. Cir. June 20, 2005).
Microsoft's Motion for Revision of Claim Construction and Summary Judgment of Non-Infringement, *Eolas Techs., Inc.* v. *Microsoft Corp.*, No. 99-C-626 (N.D. Ill) (Dec. 15, 2005).
Declaration of Munir R. Meghjee in Support of Plaintiffs' Memorandum of Law in Opposition to Microsoft Corporation's Motion for Revision of Claim Construction and Summary Judgment of Non-Infringement, *Eolas Techs., Inc.* v. *Microsoft Corp.*, No. 99-C-626 (N. D. Ill) (Jan. 12, 2006).
Plaintiffs' Memorandum of Law in Opposition to Microsoft's Motion for Revision of Claim Construction and Summary Judgment of Non-Infringement, *Eolas Techs., Inc.* v. *Microsoft Corp.*, No. 99-C-626 (N.D. Ill) (Jan. 12, 2006).
Plaintiffs' Local Rule 56.1 (b)(3) Response to Microsoft Corporation's Statement of Undisputed Facts in Support of Its Motion for Revision of Claim Construction and Entry of Summary Judgment of Non-Infringement, *Eolas Techs., Inc.* v. *Microsoft Corp.*, No. 99-C-626 (N.D. Ill) (Jan. 12, 2006).
Declaration of Laura L. Donoghue in Support of Microsoft's Reply Memorandum in Support of its Motion for Revision of Claim Construction and Summary Judgment of Noninfringement, *Eolas Techs., Inc.* v. *Microsoft Corp.*, No. 99-C-626 (N.D. Ill) (Jan. 31, 2006).
Plaintiffs' Sur-Reply in Opposition to Microsoft's Motion for Revision of Claim Construction and Summary Judgment of Non-Infringement, *Eolas Techs., Inc.* v. *Microsoft Corp.*, No. 99-C-626 (N.D. Ill) (Feb. 27, 2006).
Defendants' Sur-Rebuttal in Support of its Motion for Revision of Claim Construction and Summary Judgment of Non-Infringement, No. 99-C-626 (N.D. Ill) (Mar. 6, 2006).
Expert Report of Dr. John P.J. Kelly (Dec. 14, 2001).
Rebuttal Expert Report of Edward W. Felten Regarding Validity (Jan. 18, 2002).
Supplemental Expert Report of Dr. John P.J. Kelly (Feb. 1, 2002).
Expert Report of Kraig Brockschmidt (Dec. 12, 2001).
Rebuttal Report of Kraig Brockschmidt.
Expert Report of Robert L. Harmon Regarding Claim Construction.
Rebuttal Expert Report of Robert L. Harmon Pursuant to Rule 26(a)(2)(B). F.R.C.P.
Expert Report of Robert L. Harmon Pursuant to Rule 26(a)(2)(B). F.R.C.P.
Berners-Lee, Tim "HTML, HMML, and HyperTeX" post to WWW-Talk E-mail List (Apr. 21, 1993).
Raggett, Dave, "Standardizing new HTML features" post to WWW-Talk E-mail List (Apr. 27, 1993).
Janssen, Bill, "Re: Standardizing new HTML features" post to WWW-Talk E-mail List (Apr. 27, 1993).
Andreessen, Marc, "Re: Standardizing new HTML features" post to WWW-Talk E-mail List (Apr. 27, 1993).
Janssen, Bill, "Re: Standardizing new HTML features" post to WWW-Talk E-mail List (Apr. 29, 1993).
Sanders, Tony, "Re: Standardizing new HTML features" post to WWW-Talk E-mail List (Apr. 29, 1993).
Fine, Thomas A., "More than just HTML (was Re: Poetry and Maths)" post to WWW-Talk E-mail List (May 25, 1993).
Raggett, Dave, "Re: More than just HTML (was Re: Poetry and Maths)" post to WWW-Talk E-mail List (May 27, 1993).
Abbey, Jonathan, "Re: Keeping HTML Simple & Format negotiation between Browser & Server" post to WWW-Talk E-mail List (May 27, 1993).
Raggett, Dave, "Re: Keeping HTML Simple & Format negotiation between Browser & Server" post to WWW-Talk E-mail List (Jun. 1, 1993).
Berners-Lee, Tim, "HTML+DTD in ftp://info.cern.ch/pub/www/dev/htmlplus.dtd" post to WWW-Talk E-mail List (Jun. 2, 1993).
Raggett, Dave, "HTML+support for eqn & Postcript" post to WWW-Talk E-mail List (Jun. 14, 1993).
Janssen, Bill, "Re: HTML+ support for eqn & Postcript" post to WWW-Talk E-mail List (Jun. 14, 1993).
Altis, Kevin, "Re: HTML+ support for eqn & Postcript" post to WWW-Talk E-mail List (Jun. 18, 1993).
Sanders, Tony, "Re: launching executables through HTML" post to WWW-Talk E-mail List (Jun. 19, 1993).
Andreessen, Marc, "Re: launching executables through HTML" post to WWW-Talk E-mail List (Jun. 20, 1993).
Perry, William M., "New Version of the Emacs Browser for W3 (.04b)" post to WWW-Talk E-mail List (Apr. 13, 1993).
Perry, William M., "New Version of WWW Browser for Emacs" post to WWW-Talk E-mail List (Jun. 18, 1993).

Phillips, George Perry, "Re: launching executables through HTML files" post to WWW-Talk E-mail List (Jun. 20, 1993).
Montulli, Lou, "Re: launching executables through HTML files" post to WWW-Talk E-mail List (Jun. 22, 1993).
Raisch, Rob, "Re: Suggestion for a new URL type" post to WWW-Talk E-mail List (Jun. 26, 1993).
VanHeyningen, Marc, "Re: Suggestion for a new URL type" post to WWW-Talk E-mail List (Jun. 26, 1993).
Andreessen, Marc, "Re: Suggestion for a new URL type" post to WWW-Talk E-mail List (Jun. 26, 1993).
Phillips, George, "Re: browser execution" post to WWW-Talk E-mail List (Jun. 28, 1993).
Andreessen, Marc, "browser execution" post to WWW-Talk E-mail List (Jun. 29, 1993).
Sanders, Tony, "Re: browser execution" post to WWW-Talk E-mail List (Jun. 29, 1993).
McRae, Christopher, "Xmosaic and Xv" post to WWW-Talk E-mail List (Jun. 26, 1993).
Deposition Transcript of Pei Wei (Oct. 27, 1999 and Oct. 28, 1999).
Trial Transcript of Dave Raggett, pp. 1804-1897 (Jul. 23, 2003).
Trial Transcript of Pei Wei, pp. 2244-2469 (Jul. 28-29, 2003).
Defendant's Trial Exhibit 37 (includes "viola.TOGO.tar.Z" and other Viola information) [Compact Disc].
Printout of readable contents of Defendant's Trial Exhibit 37.
Defendant's Trial Exhibit 34 (information regarding Viola including Viola 930512.tar.gz.zip) [Compact Disc].
Printout of readable contents of Defendant's Trial Exhibit 34.
PW 1130 (Viola related material similar to Defendant's Trial Exhibit 34 but with a different file structure) [Compact Disc].
MS Supp 1205_001 (Viola related material) [Compact Disc].
MS Supp 1205_002 (Viola related material) [Compact Disc].
MS-ET 0009786 (violaTOGO.tar.Z) [Compact Disc].
Ms-Et 9706 (information regarding Viola similar to PW 1130) [Compact Disc].
MS-ET 0153301 (information regarding Viola similar to PW 1130) [Compact Disc].
Defendant's Trial Exhibit 37 File Tree Printout.
PW 1130 File Tree Printout.
Defendant's Trial Exhibit 34 File Tree Printout.
MS Supp 1205_001 File Tree Printout.
MS Supp 1205_002 File Tree Printout.
MS-ET 0009786 File Tree Printout.
MS-ET 9706 File Tree Printout.
MS-ET 0153301 File Tree Printout.
WWW-Talk Archive 1993 Q2 and 1993 Q3 (Apr. to Oct. 1993) (available at http://ksi.cpsc.ucalgary.ca/archives/WWW-TALK/).
Missing Messages 0982-0999 from WWW-Talk Archive 1993Q2 and 1993Q3 (Apr. to Oct. 1993) (retrieved from http://1997.webhistory.org/www.lists/www-talk.1993q2/and http://1997.webhistory.org/www.lists/www-talk.1993q3/).
"A Little History of the world Wide Web," n.pag. Online. Internet: available http://www.w3.org/History.html (retrieved Aug. 18, 2006).
"NCSA Mosaic Version Information," n.pag. Online Internet: available http://www.ncsa.uiuc.edu/SDG/Software.
"The second phase of the revolution," WIRED, Oct. 1994, pp. 116-152.
Vetter, Ronald "Mosaic and the World-Wide Web," Computer Magazine, v.27, Iss.10, pp. 49-57, Oct. 1994.
Wynne et al. "Lean Management, Group Support Systems, and Hypermedia: a Combination Whose Time Has Come," System Sciences, 1993 Annual Hawaii Int'l Conf., pp. 112-121.
Hansen, Wilfred "Andrew as a Multiparadigm Environment for Visual Languages," Visual Languages, 1993 IEEE Symposium, pp. 256-260.
Moran, Patrick "Tele-Nicer-slicer-Dicer: A New Tool for the Visualization of Large Volumetric Data," NCSA Technical Report (TRO14), Aug. 1993.
University of Southern California's Mercury Project—"USC Mercury Project: Interface," Project Milestones, USC Press Release—obtained from Internet, http://www.usc.edu/dept/raiders/.
Hansen, Wilfred "Enhancing documents with embedded programs: How Ness extends in the Andrew ToolKit," IEEE Computer Language, 1990 International Conference.

Tani, M., et al., "Object-Oriented Video: Interaction with Real-World Objects Through Live Video," May 1992, p. 593-598.
Crowley, T., et al., "MMConf: An Infrastructure for Building Shared Multimedia Applications," CSCW 90 Proceedings, Oct. 1990, p. 329-342.
Davis, H., et al., "Towards An Integrated Information Environment With Open Hypermedia System," ACM ECHT Conference, Dec. 1992, pp. 181-190.
Ferrara, F., "The KIM Query System," Abstract, SIGCHI Bulletin, vol. 6, No. 3, Jul. 1994, pp. 30-39.
Gibbs, S., "Composite Multimedia and Active Objects," OOPSLA '91, pp. 97-112.
Davis, H., et al., "Microcosm: An Open Hypermedia System," Interchi '93, Apr. 1993, p. 526.
Vaziri, A., "Scientific Visualization in High-Speed Network Environments," Computer Networks and ISDN Systems 22, 1991, pp. 111-129.
Cullen, J., et al., "The Use of FTAM to access graphical pictures across wide area networks," Computer Networks and ISDN Systems, 1992, pp. 337-383.
Lashkari, Y.Z., et al.,"PLX: A Proposal to Implement a General Broadcasting Facility in a Distributed Environment Running X Windows," Comput. & Graphics, vol. 16, No. 2, pp. 143-149, 1992.
Kirste, T., "Spacepicture—An Interactive Hypermedia Satellite Image Archival System," Comput. & Graphics, vol. 17, No. 3, pp. 251-260, 1993.
Coulson, G., et al., "Extensions to ANSA for Multimedia Computing," Computers Networks and ISDN Systems 25, 1992, pp. 305-323.
Huynh, Duong Le, et al., "PIX: An Object-Oriented Network Graphics Environment," Comput. & Graphics, vol. 17, No. 3, pp. 295-304, 1993.
Berners-Lee, T.J., et al., The World-Wide Web, Computer Networks and ISDN Systems 25, 1992, pp. 454-459.
Shackelford, D.E., et al., "The Architecture and Implementation of a Distributed Hypermedia Storage System," Hypertext '93 Proceedings, Nov. 1993, pp. 1-13.
Labriola, D., "Remote Possibilities," PC Magazine, Jun. 14, 1994, pp. 223-228.
Udell, J., "Visual Basic Custom Controls Meet OLE," Byte Magazine, Mar. 1994, pp. 197-200.
Sarna, D.E., et al., "OLE Gains Without (Much) Pain," Datamation Magazine, Jun. 15, 1994, pp. 31 and 113.
Rizzo, J., "What's OpenDoc?," MacUser magazine, Apr. 1994, pp. 119-123.
Fogarty, K., et al., "Microsoft's OLE can be Network Trojan Horse," Network World Magazine, Jun. 27, 1994, vol. 11, No. 26, pp. 1 and 75.
"Cello WWW Browser Release 1.01a," Article obtained from the Internet, ftp.law.cornell.edu/pub/L11/Cello no DDE, Mar. 16, 1994, pp. 2-9.
"OLE 2.0: Death to Monoliths," Byte Magazine, Mar. 1994, p. 122.
Duncan, Ray, "Advanced MSDOS Programming," Microsoft Press, 1986 pp. 390, 391, 486, 487.
Lin, Jin-Kun, "Virtual Screen: A Framework for Task Management," The X Resource, Issue 1, Winter 1992- Proceedings of the 6th Annual X Technical Conference, pp. 191-198, 1992.
Lin, Jin-Kun, "A Multimedia and Multisource Document Editor of an Open Architecture," Dept. of Computer Science, University of N.C. at Chapel Hill, ACM 089791-533-X/92/0010/0057, pp. 57-62, 1992.
Berners-Lee T., et al., Hypertext Markup Language (HTML), Internet Draft IETF(Jun. 1993).
Toye, G., et al., SHARE: A Methodology and Environment for Collaborative Product Development, Proceedings, Second Workshop on Enabling Technologies: Infrastructure for Collaborative Enterprises, 1992, IEEE, pp. 33-47, Apr. 22, 1993.
Lin, J. MediaMosaic—A Multimedia Editing Environment, Proc. Of the 5th Annual ACM Symposium on User Interface Software and Technology, ACM Press, pp. 135-141, 1992.
Halasz, F., Reflections on NoteCards: Seven Issues for the Next Generation of Hypermedia Systems, ACM Journal on Computer Documentation, vol. 25, No. 3, pp. 71-87, Aug. 2001, reprinting article published in 1988.

Feiner, S., et al., An Experimental System for Creating and Presenting Interactive Graphical Documents, ACM Transactions on Graphics, vol. 1, No. 1, pp. 59-77, Jan. 1982.
Engelbart, D., Knowledge-Domain Interoperability and an Open Hyperdocument System, Proc. Of the 1990 ACM Conference on Computer Supported Cooperative Work, ACM Press, pp. 143-156, 1990.
Meyrowitz, N., Intermedia: The Architecture and Construction of an Object-Oriented Hypermedia System and Applications Framework, Proc. Of the Conf. on Object Oriented Programming Systems, Languages, and Applications, ACM Press, pp. 186-201, 1986.
Wiil, U., Issues in the Design of EHTS: A Multiiser Hypertext System for Collaboration, Proc. Of the 25th Hawaii Int'l. Conf. on Systems Sciences, vol. 2, pp. 629-639, Jan. 1992.
Celentano, A., et al., A Multiple Presentation Document Management System, Proc. Of the 10th Annual Int'l Conf. on Systems Documentation, ACM Press, pp. 63-71, 1992.
Garg, P. et al., A Hypertext System to Manage Life Cycle Documents, Proc. Of the 25th Annual Hawaii Int'l Conf. on System Sciences, 1988, IEEE, vol. 2, pp. 337-346, Jan. 1988.
Kahn, P., Webs, Rees, and Stacks: How Hypermedia System Design Effect Hypermedia Content, Designing and Using Human-Computer Interfaces and Knowledge Based Systems, Elsevier Science Publishers, pp. 443-449, 1989.
Streitz, N. et al., Hypertest: Concepts, Systems, and Applications, Cambridge Univ. Press, pp. 1-12, 356-359, 367-369, 1990.
Stotts, P., et al., Hyperdocuments as Automata: Trace-based Browsing Property Verification, UNC CS Technical Report, TR92-038, citeseer.ist.psu.edu/stotts92hyperdocument.html, p. 1, 1992.
Adie, C., Network Access to Multimedia Information, 2nd ed., RARE Project OBR(93)015, RARE, pp. 1-53, Feb. 4, 1994.
Reichard, K., et al., X11R96: the Rumored Changes (Release 6 of the X Window System), UNIX Review, vol. 11, No. 5, p. 101 (pp. 1-4 as printed) (May 1993).
Cox, B., Object Oriented Programming: An Evolutionary Approach, Addison-Wesley, pp. 1-12, 1987.
Solaris OpenWindows: Introduction to the ToolTalk Service—A White Paper, Sun Microsystems, Inc., pp. 1-16, 1991.
Tool Inter-Operability: A Hands On Demonstration—A Simple Demonstration of How the TookTalk Service Works, Sun Microsystems, Inc., pp. 1-24, 1992.
Designing and Writing a ToolTalk Procedural Protocol—A White Paper, Sun Microsystems, Inc. pp. 1-24, 1992.
Fresco Frequently Asked Questions, www.i.h.kyoto-u.ac.jp/~shom/doc.org/fresco/FAQ.html, pp. 1-4, Apr. 13, 1995.
Palay, A., Andrew Toolkit: An Overview, Tech Rept., Carnegie-Mellon University Information Technology Center, pp. 1-15, 1988.
Dettmer, R., X-Windows—the great integrator, IEE Review, vol. 36, No. 6, pp. 219-222 (Jun. 1990).
The Andrew View, Carnegie Mellon Unic., www-2.cs.cmu.edu/People/AUIS/ftp/NEWSLETTER/ASCII/93Jun.ascii, vol. 2, No. (pp. 1-12 as printed) (Jun. 1993).
The X Window System and Broadway, www.broadwayinfo.com/bwwhitesbroadwayhct.htm, Hummingbird Communications Ltd., pp. 1-11 (1987).
Neuendorffer, T., ADEW: A Multimedia Interface Builder for Andrew, Proceedings Multi-Media Communications, Applications, and Technology Workshop, pp. 1-19 (Jul. 1991).
Letter from America Online, Inc., Microsoft Corp., and Macromedia, Inc. (Oct. 14, 2003) and Letter from Adobe Systems Inc. re: Potential Director-Ordered Reexamination of U.S. Patent No. 5,838,906 pursuant to 35 U.S.C. § 303(a) (Oct. 15, 2003) (with cover letter from Sidley, Austin, Brown & Wood LLP) (including attachments).
Anonymous Facsimile re: possible interference (Oct. 16, 2005).
Letter from Stephen Wren (discussing relevance of U.S. Pat. No. 6,055,514 to U.S. Pat. No. 5,838,906) (Feb. 22, 2005).
Letter from Pennie & Edmonds, LLP on behalf of the WWW Consortium, re: Citation of Prior Art Under 35 U.S.C. §301 and 37 C.F.R. 1.501 in Relation to U.S. Patent No. 5,838,906 (Oct. 24, 2003).
Festa, Paul, CNET News.com "Rivalries set Aside in Defense of Internet Explorer" (Sep. 25, 2003) (http://news.com.com/2009-1023_3-5082004.html).
Roberts, Paul, "Microsoft's Patent Loss Rattles Tech Community" (Sep. 3, 2003) (http://www.infoworld.com/article/03/09/03/Hnmicrosoft'sloss_1.html).
Festa, Paul, CNET News.com "Eolas Files Motion to Enjoin IE" (Oct. 8, 2003) (http://news.com.com/2100-1028_3-5088349.html?tag=st+pop).
Lynch, Stephen, "Microsoft Rivals Join Patent Fight; M'Soft Rivals Join to Wage Patent Fight" N. Y.Post (Oct. 9, 2003).
O'Reilly Network, Patent List (Jul. 10, 2003).
Ray Ozzie, "Saving the Browser," Weblog entry (2003) (discussing Lotus Notes R3 relevance to the patent).
"Microsoft's OLE can be network Trojan horse," Network World Magazine, vol. 11, No. 26, Jun. 27, 1994.
Object linking and Embedding OLE 2.01 Design Specification (Sep. 27, 1993).
Programming for Windows with Object Linking and Embedding 2.0 (Mar. 1, 1993).
Extensible Compound Document Architecture Client and Server API specification (no date).
Pei Y. Wei, "X Browser" (e-mail to www-talk discussion list) (Dec. 13, 1991).
Pei Y. Wei "X Browser" (e-mail to www-talk discussion list) (Dec. 13, 1994).
Dale Dougherty, "WWW Developer's Conference" (e-mail to www-talk discussion list) (Jun. 19. 1993).
Pei Wei, "Re: Universal network graphics language" (e-mail to www-talk discussion list) (Jan. 28, 1994).
Pei Wei, "Viola WWW beta release is available" (e-mail to www-talk discussion list) (Feb. 25, 1994).
Pei Wei, "Re: World Wide Web and Viola" (e-mail to www-talk discussion list) (May 13, 1992).
Pei Wei, "A Brief Overview of the VIOLA Engine, and its applications" (MSET 0009788-0009801)(no date).
Pei Wei, "A Brief Overview of the VIOLA Engine, and its applications" (InterNIC details for http://www.viola.org) (retrieved from http://www.internicdomainnames.com).
Pei Wei, "A Brief Overview of the VIOLA Engine, and its applications" (TT05417-05433) (1994) (retrieved on Aug. 4, 1998 from http://scam.xcf.berkeley.edu/~wei/viola/violaIntro.html).
Pei Wei, "A Brief Overview of the VIOLA Engine, and its applications" (E0714-021725) (1994) (retrieved from http://scam.xcf.berkeley.edu/~wei/viola/violaIntro.html).
Pei Wei, "A Brief Overview of the VIOLA Engine, and its applications" (TT 05441-05600) (1994) (including "Viola in a Nutshell: the Viola World Wide Web Toolkit" from http:/scam.xcf.berkeley.edu/~wei/viola/book).
Pei Wei, "A Brief Overview of the VIOLA Engine, and its applications" ((MSET 0000026-0000036) (retrieved from http://scam.xcf.berkeley.edu/~wei/viola/violaIntro.html).
Pei Wei, "Re;FYI . . . press release," (e-mail to www-vrml @wired.com) (Aug. 31, 1994).
Pei Wei, "Re: FYI . . . press release" (e-mail to www-talk discussion list) (Aug. 31, 1994).
Pei Wei, "RE: FYI . . . press release" (e-mail to mddoyle @netcom.com) (Sep. 1, 1994).
Michael Doyle, "Re: More RE: FYI . . . Press release" (e-mail to Pei Wei) (Sep. 1, 1994).
Pei Wei, "Re: FYI . . . press release" (e-mail to vrml discussion list) (Sep. 1, 1994).
Michael Doyle, "Scripts vs APIs" (e-mail to vrml discussion list) (Sep. 1, 1994).
Pei Wei "WWW Browsers" Extensibility Issues, Stanford Computer Forum WWW Workshop-Sep. 20-21, 1994.
Pei Wei, "Extensibility in WWW Browsers" Stanford Computer Forum WWW Workshop-Sep. 20-21, 1994.
Michael Doyle, "Re: Hot Java is here! and it *rocks*" (e-mail to www-talk discussion list) (Mar. 27, 1995).
Pei Wei, "Re: Eolas Acquires Milestone Internet Software Patent" (e-mail to www-talk discussion list) (Aug. 21, 1995).
Tim Berners-Lee, Press Release: "The World Wide Web—past, present and future" (Jul. 17, 1996) (retrieved from http://www.bcs.org.uk/news/timbl.htm).

Pei Wei, "Re: Universal network graphics language" (e-mail to www-talk discussion list) (Jan. 28, 1994).
Microsoft Product Support Services Application Note (Text File) GC0165:Rich-Text Format (RTF) Specification (Jun. 1992).
Tim Berners-Lee, "HTML + DTD in ftp://info.cern.ch/pub/www/dev/htmlplus.dtd" (e-mail to www-talk discussion list) (Jun. 2, 1993).
Dave Raggett, "HTML + support for eqn & Postscript" (e-mail to www-talk discussion list) (Jun. 14, 1993).
Dave Raggett, "HTML + support for eqn & Postscript" (e-mail to www-talk discussion list) (Jun. 14, 1993).
Christopher J. McRae, "Re: Xmosaic and Xv" (e-mail to www-talk discussion list) (Jun. 26, 1993).
Dave Raggett, "HTML + (Hypertext markup language)" (Jul. 23, 1993).
William Perry, "Re: Interest in HTML Conformance?" (e-mail to www-talk discussion list) (Apr. 17, 1994).
William Perry, "Presentation Tags, etc." (e-mail to Tony Jebson) (May 5, 1994).
William Perry, "Re: Where can I find doc on embedding X windows in Lemacs buffers?" (e-mail to help-lucid-emacs) (May 28, 1994).
Jeff Sparkes, "Re: Where can I find doc on embedding X windows in Lemacs buffers?" (e-mail to help-lucid-emacs) (May 31, 1994).
Daniel Connolly, "Re: HTML 2.0 specification" e-mail to wmperry@spry.com (Sep. 2, 1994).
NCSA Software Development Group, "Introducing NCSA Mosaic" (Dec. 1993).
Kraig Brockschmidt, Programming for Windows with Object Linking and Embedding (OLD) 2.0 DRAFT (no date).
Kraig Brockschmidt, "Inside OLE 2.0" Microsoft Press (Oct. 1993).
ECDA extensible Compound Document Architecture (Jul. 10, 1990).
Microsoft Corporation, "Information At Your Fingertips Backgrounder" (Dec. 1990).
Microsoft Corporation, Object Landing & embedding—Extensible Application Protocols (Apr. 8, 1991).
Microsoft Corporation, "OLE 2.0 Design Summary" (Jul. 5, 1991).
Microsoft Corporation, "OLE 2.0 Architecture and Protocol Proposal" (Jul. 9, 1991).
Microsoft Corporation, "OLE 2.0 Design Specification" (Apr. 15, 1993).
Microsoft Corporation, "Microsoft OLE 2.0 Developers Conference Previews Applications Using Object Technology for Windows" (May 3, 1993).
Microsoft Corporation, "Windows Objects: Object Linking & Embedding 2.0 Developers Conference" (May 3, 1993).
Stuart J. Johnston and Vance McCarthy, "Developers get hands on complex but vital OLE 2.0," Info World, vol. 15, issue 19 (May 10, 1993).
Kraig Brockschmidt, "Programming for Windows with Object Linking and Embedding 2.0" Preliminary Draft (Apr. 19, 1993).
Microsoft Corporation, OLE 2.01 Design Specification.
Microsoft Corporation, "Microsoft OLE Controls-Specification Overview" (Jan. 1994).
Microsoft Corporation, "Microsoft Multimedia View Publishing Toolkit" 1 of 3 volumes: Getting Started, "Authoring Guide" and "Technical Reference" (1993).
Microsoft Corporation, "Microsoft Multimedia View Publishing Toolkit" 2 of 3 volumes: Getting Started, "Authoring Guide" and "Technical Reference" (1993).
Microsoft Corporation, "Microsoft Multimedia View Publishing Toolkit" 3 of 3 volumes: Getting Started, "Authoring Guide" and "Technical Reference" (1993).
E-mail From Ang Re: Plan (Oct. 8, 1994).
Bert Bos, "Re: Structured text v. page descriptions" (e-mail to David C. Martin) (Nov. 3, 1994).
Microsoft Windows Win32 Professional Developers Conference Information Packet including a Microsoft Non-Disclosure Agreement (Oct. 18, 1993).
Maritz, P—Microsoft Letter to Microsoft Win32 Professional Developers Conference Attendees (Nov. 8, 1993).
Kraig Brockschmidt, "A Primer on Designing Custom Controls," Microsoft System Journal, Mar.-Apr. 1992.
Microsoft Corporation, "Object Linking and Embedding Backgrounder" (Dec. 1990).
Microsoft Corporation, "Compound Documents Backgrounder" (Dec. 1990).
Rude Q&A OLE.
Microsoft Corporation, "OLE Controls Architecture" Version 0.6 (Sep. 1, 1993).
Kraig Brockschmidt, "OLE 2.0: implementing Visual Editing (In-Place Activation)" (Nov. 1993).
Kraig Brockschmidt, "Chapter One: OLE Controls Architecture" (Nov. 10, 1993).
Microsoft Corporation, "OLE Controls Architecture" Version 0.7 (Nov. 17, 1993).
Microsoft Corporation, "OLE Controls Architecture" Version 0.2 (May 15, 1993).
Kraig Brockschmidt, "Network DDE in Windows for Workgroups 3.1 Bridges Programs Between PCs," Microsoft Systems Journal, Jan. 1993.
Microsoft Corporation, "Object Linking & Embedding Version 2.0 Programmer's Reference" (Apr. 15, 1993).
Moeller, Michael, et al., "Microsoft Maps New OCX Plan; ActiveX Seen as Web content Platform," PC Week vol. 13, No. 10, p. 1 (Mar. 11, 1996).
Marovac, Nenad et al., "Hypernet: A Tool to Choreograph Worldwide Distributed Hypermedia Documents," Comput & Graphics vol. 16, No. 2, pp. 197-202 (1992).
Netscape Communications Corp., Press Release: "Netscape Communications Offers New Network Navigator Free on the Internet" (1998).
Sackman, Gleason, "WWW>Telerobotics via the Web(fwd)" (e-mail to comp.infosystems discussion list) (Sep. 7, 1994).
"The Pattern in the Mosaic: An Interview with Jim Clark and Marc Andreesen," Network Computing, p. 44 (Jan. 15, 1994).
Oliver, Dick, "Netscape Unleashed" (1996).
"Reply by Third Party Requester Under C.F.R. 1.535" (May 5, 2006).
"WWW-Talk Electronic Mailing List Contributors from Jan. 1993 Through Jun. 1993".
"World-Wide Web Mailing Lists," retrieved from http://www.bilkent.edu.tr/pub/WWW/Mail/Lists.html (May 2, 2006).
Hughes, Kevin, "Entering the World-Wide Web: A Guide to Cyberspace" (Oct. 1993) (http://w3.cib.unibo.it/intro/www-guide/www.guide.html.
Thomas, Eric, "LISTSERV for the Non-Technical User" (Sep. 18, 1993).
Andreessen, Marc, "NCSA Mosaic Technical Summary" (May 8, 1993).
Weber, Jay C., "Protest of Patent #5,838,906 under 37 CFR 1.291, and Citation of Prior Art for # 5,838,906, under 37 CFR 1.502" (including attachments) (Feb. 6, 2004).
WWW-Talk Archive 1991 printout (retrieved from http://ksi.cpsc.ucalgary.ca/archives/WWW-TALK/www-talk-1991.index.html).
WWW-Talk Archive 1992 printout (retrieved from http://ksi.cpsc.ucalgary.ca/archives/WWW-TALK/www-talk-1992.index.html).
WWW-Talk Archive 1993 Q1 printout (retrieved from http://ksi.cpsc.ucalgary.ca/archives/WWW-TALK/www-talk-1993q1.index.html).
WWW-Talk Archive 1993 Q4 printout (retrieved from http://ksi.cpsc.ucalgary.ca/archives/WWW-TALK/www-talk-1993q4.index.html).
WWW-Talk Archive Jan. 1 to Jan. 27, 1994 printout (retrieved from http://ksi.cpsc.ucalgary.ca/archives/WWW-TALK/www-talk-1994q1.index.html).
Sep. 4, 2008, "Litigation Search Report CRU 3999", U.S. Reexamination Control No. 90/007,858, 109 pages.
Dec. 28, 2005 "Patent Assignment Abstract of Title", U.S. Reexamination Control No. 90/007,858, 2 pages.
Dec. 29, 2005, "Notice of Reexamination Request Filing Date", U.S. Reexamination Control No. 90/007,858, 2 pages.
Jan. 5, 2006, "Litigation Search Report CRU 3999", U.S. Reexamination Control No. 90/007,858, 88 pages.
Feb. 9, 2006, "Ex Parte Reexamination Communication Transmittal Form", U.S. Reexamination Control No. 90/007,858, 15 pages.

Jun. 29, 2006, "Ex Parte Reexamination Communication Transmittal Form", U.S. Reexamination Control No. 901007,858, 9 pages.
Nov. 6, 2006 "Information Disclosure Statement", U.S. Reexamination Control No. 90/007,858, 515 pages.
Dec. 4, 2006, "Revised Information Disclosure Statement", U.S. Reexamination Control No. 90/007,858, 5 pages.
Jul. 29, 2003, "Transcript of Proceedings", vol. 14, 501 pages.
Jan. 22, 2007, "Information Disclosure Statement", U.S. Reexamination Control No. 90/007,858, 11 pages.
Jan. 23, 2007, "Information Disclosure Statement", U.S. Reexamination Control No. 90/007,858, 156 pages.
Jan. 29, 2007, "Information Disclosure Statement", U.S. Reexamination Control No. 90/007,858, 172 pages.
WWW Talk Jan.-Mar. 1993 Archives, Messages from Mon, Jan. 4, 1993 to Wed, Mar. 31, 1993, 451 Pages, available at http://1997.webhistory.org/www.lists/www-talk.1993q1/.
May 5, 2005, "Suspension of Action", U.S. Reexamination Control No. 90/006,831, 2 pages.
Oct. 27, 2005, "Information Disclosure Statement Under 37 CFR § 1.97 and §1.98", 2 pages.
Oct. 27, 2005, "Information Disclosure Statement by Applicant", Form 1449, 1 page.
David Raggett, "HTML+ (Hypertext markup language)", Hewlett Packard Laboratories, Jul. 1993, 32 pages.
WWW Talk Apr-Jun 1993 Archives, Jun. 14, 1993, 2 pages, available at http://ksi.cpsc.ucalgary.ca/archives/WWW-TALK/www-talk-1993q2.messages/467.html.
Sep. 15, 2006, "Information Disclosure Statement", 4 pages.
Sep. 15, 2006, "Information Disclosure Statement", Form 1449, 1 page.
"WWW Talk Apr.-Jun. 1993 Archives", Messages from Wed, Mar. 31, 1993 to Wed, Jun. 30, 1993, 622 Pages, available at http://1997.webhistory.org/www.lists/www-talk.1993q2/.
Sep. 18, 2006, "Information Disclosure Statement", 3 pages.
Sep. 18, 2006, "Information Disclosure Statement", Form 1449, 12 pages.
"Extensible Compound Document Architecture, Client and server API specification", Sep. 21, 1990, 7 pages.
"VRML Hypermail Archives", Aug. 31, 1994, 2 pages, available at http://1997.webhistory.org/www.lists/www-vrml.1994/0487.html.
"VRML Hypermail Archives", Sep. 1, 1994, 4 pages, available at http://www.intercom.co.cr/www-archives/ vrml-1994/0496.html.
"Network World, The News weekly", vol. 11 No. 26, Jun. 27, 1994, 2 pages.
"WWW Talk Nov.-Dec. 1991 Archives", Dec. 13 1991, 622 Pages, available at http://lists.w3.org/Archives/Public/www-talk/1991NovDec/0023.html.
"Viola Overview", O'Reilly & Associates, Inc, P.Y. Wei, Aug. 16, 1994, 11 pages.
"Viola Overview", O'Reilly & Associates, Inc, P.Y. Wei, available at http://scam.XCF.berkeley.edu/~wei/viola/violaintro.html , Aug. 16, 1994, 11 pages.
"VRML Hypermail Archives", Sep. 1, 1994, 2 pages, available at http://www.intercom.co.cr/www-archives/ vrml-1994/0492.html.
"VIOLA MAIL", Sep. 1, 1994, 2 pages.
"VIOLA MAIL", Aug. 31, 1994, 2 pages.
"Extensible WWW Browser Architecture", O'Reilly & Associates, Pei Wei, Stanford Computer Forum WWW Workshop—Sep. 20-21, 1994, 12 pages.
"Extensible WWW Browser Architecture", O'Reilly & Associates, Pei Wei, Stanford Computer Forum WWW Workshop—Sep. 20-21, 1994 8 pages.
"www-talk@w3.org Mail Archives", from Jul. to Aug. 1995, Pei Wei, available at http://lists.w3.org/Archives/Public/www-talk1995JulAug/0429.html, 2 pages.
"WWW Talk Jan. 1994 Archives", Jan. 28, 1994, available at http://ksi.cpsc.ucalgary.ca/archives/WWW-TALK/www-talk-1994q1.messages/357.htm, 2 pages.
"The World Wide Web—past, present and future", Tim Berners-Lee, Press release Jul. 17, 1996, 11 pages.
"www-talk@w3.org Mail Archives", from Jul. to Aug. 1995, available at http://lists.w3.org/Archives/Public/www-talk/1995JulAug/0431.html, 32 pages.

"Previews Applications Using Object Technology for Windows", Microsoft Ol£ 2.0 Developers Conference, Microsoft news release, Redmond, Wash., May 3, 1993, 6 pages.
"Introducing NCSA Mosaic", NCSA Software Development group, Dec. 1993, 2 pages.
"Information at Your Fingertips Backgrounder", Microsoft Corporation, Dec. 1990, 2 pages.
"WWW-TALK/www-talk-1993q2.messages", Apr.-Jun. 1993, available at http://ksi.cpsc.ucalgary.ca/archivesWWW-TALK/www-talk-1993q2.messages/599.html, 3 pages.
"Microsoft OLE Controls", Microsoft Corporation, Jan. 1994, 18 pages.
Stuart J. Johnston and Vance McCarthy, "Developers get hands on complex but vital OLE 2.0",Info World, vol. 15, Issue 19, May 10, 1993, 2 pages.
"WIN-DEV", International developers conference for Windows, Oct. 18-22, 1993, 12 pages.
"Microsoft Windows ", Win32 professional developers conference, Dec. 1993, 29 pages.
Kraig Brockschmidt, "A Primer on Designing Custom Controls", Microsoft Systems Journal , Mar.-Apr. 1993, 14 pages.
"Object Linking and Embedding Backgrounder", Microsoft Corporation, Dec. 1990, 6 pages.
"Compound Documents Backgrounder", Microsoft Corporation, Dec. 1990, 5 pages.
Kraig Brockschmidt, "Network DDE in Windows for Workgroups 3.1 Bridges Programs Between PC's", Microsoft Systems Journal , Jan. 1993, 15 pages.
Kevin Reichard and Eric F. Jhonson, "XIIR6: The Rumored Changes", May 1993, Supplied by the British Library, 5 pages.
Robert Cailliau, "A Little History of the World Wide Web", Aug. 18, 2006, created circa 1995, available at http:www.w3.org/history.html, 6 pages.
"OLE 2.0: Death to Monoliths?", Reviews Roundup, Byte Mar. 1994, 1 page.
"Cello WWW Browser", Release 1.01a, Mar. 16, 1994, 8 pages.
Thomas Kirste, "Spacepicture—An Interactive Hypermedia Satellite Image Archival System", Computer & Graphics, vol . 17, No. 3, 1993, 10 pages.
Nenad Marovac and Larry Osburn, "Hypernet: A Tool to Choreograph Worldwide Distributed Hypermedia Documents", Computer & Graphics, vol . 16, No. 2, 1992, 6 pages.
G. Coulson, "Extensions to ANSA for multimedia Computing", Computer Networks and ISDN Systems, 1992 , 18 pages.
Duong Le Huynh, "Pix: An Object-Oriented Network Graphics Environment", Computer & Graphics , vol. 17, No. 3, 1993, 10 pages, Pergamon press Ltd.
T.J. Berners-Lee, "The World-Wide Web", Computer networks and ISDN systems, 1992, 6 pages, Elsevier Science Publishers B.V.
Douglas E. Shackelford, "The Architecture and Implementation of a Distributed Hypermedia Storage System", Nov. 1993, 13 pages.
Don Labriola, "Remote Possibilities", PC Magazine, Jun. 14, 1994, 6 pages.
Jon Udell, "Visual Basic Custom Controls Meet OLE", BYTE Magazine, Mar. 1994, 3 pages.
David E, Y.Saran, "Gains Without (Much) Pain", Datamation Magazine, Jun. 15, 1994, 4 pages.
Rizzo.J, "What's OpenDoc?", MacUser magazine, Apr. 1994, 2 pages.
Kevin Fogarty, K., et al., "Microsoft's OLE can be network Trojan Horse", Network World Magazine, Jun. 27, 1994, vol. 11, No. 26, 1 page.
Eric Mankin, "Art, Archaeology & Automatons", "Internet-Controlled Robot On-Line at USC", USC Press Release, available at http://www.usc.edu/dept/raiders/story/press-release.html , May 2, 1996, 3 pages.
Hansen, Wilfred "Enhancing documents with embedded programs: How Ness extends in the Andrew Toolkit", IEEE, 1990. 11 pages.
Tani, Masayuki., et al., "Object-Oriented Video: Interaction with Real-World Objects Through Live Video", May 1992, 6 pages.
Crowley, Terrence., et al., "MMConf: An Infrastructure for Building Shared Multimedia Applications", CSCW 90 Proceedings, Oct. 1990, 14 pages.

Hugh Davis, et al., "Towards An Integrated Information Environment With Open Hypermedia System", ACM ECHT Conference, Dec. 1992, 10 pages.
Ferrara, F., "The KIM Query System", Abstract, SIGCHI Bulletin, vol. 26, No. 3, Jul. 1994, 10 pages.
Gibbs, S., "Composite Multimedia and Active Objects", OOPSLA '91, 16 pages.
Davis, H., et al., "Microcosm: An Open Hypermedia System", Interchi '93, ACM, Apr. 1993, 1 page.
Vaziri, A., "Scientific Visualization in High-Speed Network Environments", Computer Networks and ISDN Systems 22, 1991, 19 pages.
Cullen, J., et al., "The Use of FTAM to access graphical pictures across wide area networks", Computer Networks and ISDN Systems, 1992, 7 pages.
Lashkari, Y.Z., et al., "PLX: A Proposal to Implement a General Broadcasting Facility in a Distributed Environment Running X Windows", Computer. & Graphics, vol. 16,No. 2, 1992, 7 pages.
Ashlund, S., et al., "Conference on Human Factors in Computing Systems", Interchi '93, ACM, Apr. 1993, 1 page.
Moeller, M., et al., "Microsoft maps new OCX plan; ActiveX seen as Web content platform", PC Week Magazine, vol. 13, No. 10, Mar. 11, 1996, 2 pages.
Marovac, N., et al., "Hypernet: A Tool To Choreograph Worldwide Distributed Hypermedia Documents", Computer. & Graphics, vol. 16, No. 2, 1992, 6 pages.
"Netscape Communications Offers New Network Navigator Free On The Internet", Press release, Oct. 13, 1994, 2 pages.
Sackman.G., "WWW Tele-robotics via the Web (fwd)", Forwarded mail item, Sep. 7, 1994, 1 page.
Vetter, Ronald, "Mosaic and the World-Wide Web," Computer Magazine, v.27, Iss.10, Oct. 1994, 10 pages.
Wynne et al. "Lean Management, Group Support Systems, and Hypermedia: a Combination Whose Time Has Come", System Sciences, 1993 Anuall HawaiiInt'l Conf., IEEE/IEE Publications, 11 pages.
Hansen, Wilfred, "Andrew as a Multiparadigm Environment for Visual Languages", Visual Languages, 1993 IEEE Symposium, 6 pages.
Moran, Patrick., "Tele-Nicer-slicer-Dicer: A New Tool for the Visualization of Large Volumetric Data", NCSA, Aug. 1993 7 pages.
"Protest Under 37 CFR 1.291(a) of Patent No. 5,838,906", Feb. 6, 2004, 126 pages.
"Frequently Asked Questions", Apr. 13, 1995,4 pages.
"Certificate of Service", Feb. 25, 2005, 2 pages.
"Citation of Prior Art", Oct. 24, 2003, 14 pages.
Paul Festa, "Rivalries set aside in defense of Internet Explorer", CNET News.com, Sep. 25, 2003, available at http://news.cnet.com/2009-1023_3-5082004.html, 6 pages.
Paul Roberts, "Microsoft's patent loss rattles tech community", Article obtained from http://Iwww.infoworld.com/article/03/09/03/HNmicrosoft'sloss_1.html, Sep. 3, 2003, 4 pages.
Paul Festa, "Eolas files motion to enjoin IE", CNET News.com, Oct. 8, 2003, obtained from http://news.cnet.com/2100-1028_3-5088349.html, 4 pages.
"Saving the Browser", Ray Ozzie's Weblog, Sep. 13, 2003, 20 pages.
"Controversial Patents", O'Reilly Network : Patents List, Jul. 10, 2003, 3 pages.
"Reply by Third Party Requester Under 37 CFR § 1.535", U.S. Reexamination Control No. 90/007,858, May 5, 2006, 19 pages.
"WWW-TALK Electronic Mailing List Contributors", Jan.—Jun 1993, 7 pages.
"World Wide Web Mailing Lists", W3C, 1994, 3 pages.
"Certificate of Service", Microsoft Corporation's Motion For Leave To File An Amended Answer, Sep. 7, 1999, 40 pages.
"Certificate of Service", Plaintiff's Reply to Microsoft's First Amended Counterclaim, Oct. 27, 1999, 454 pages.
"Certificate of Service", Plaintiffs' Memorandum in Further Support of Zheir Motion to Exclude Extrinsic Evidence of Claimed Pei Wei Invention, Jul. 29, 2003, 46 pages.
"Microsoft's Offer of Proof Regarding Viola-Prior-Art", *EOLAS Technologies Inc*, vs. *Microsoft Corporation*, in the United States District Court, Aug. 5, 2003, 22 pages.
"Notice of Filing", Aug. 5, 2003, 16 pages.

"Microsoft's Post-Trial Brief on Inequitable Conduct ", in The United States District Court, for The Northern District of Illinois Eastern Division, Dec. 14, 2001, 575 pages.
"Information Disclosure Statement", U.S. Appl. No. 10/217,955, Jun. 18, 2007, 3 pages.
"Information Disclosure Statement by Applicant", Form 1449A/PTO, Jun. 20, 2007, 2 pages.
"Information Disclosure Statement", United States Patent and Trademark Office, Oct. 9, 2007, 3 pages.
"Information Disclosure Statement by Applicant", Form 1449A/PTO, Oct. 15, 2007, 2 pages.
Dick, Oliver, "Netscape Unleashed", Sams Publishing, 3 Sub edition, Aug. 1997, pp. 220-223.
"Information Disclosure Statement", U.S. Reexamination, Oct. 24, 2007, 3 pages.
"Information Disclosure Statement By Applicant", form 1449A/PTO, Nov. 1, 2007, 1 page.
"Default File Extensions in Mosaic 2.0pre4", NCSA Institute, Dec. 2005, 1 page.
"Default MIME Types in Mosaic 2.0pre4", NCASA Institute, Dec. 2005, 1 page.
WWW Talk Jul.-Oct.1993 Archives,"NCSA Mosaic for X 2.0 prerelease 4 available", Messages fromJun. 30 , 1993 to Sep. 30, 1993,Available at http://ksi.cpsc.ucalgary.ca/archives/WWW-TALK/www-talk-1993q3.messages/1046.html. 4 pages.
John Bradley, "Interactive Image Display for the X Window System", Version 2.20, Apr. 24, 1992,pp. 1-72.
John Bradley, "Interactive Image Display for the X Window System", Version 3.00, Apr. 26, 1993, 105 pages.
Michael D.Doyle, "Processing of Cross Sectional Image Data for Reconstruction of Human Development Anatomy From Museum Specimens", Feb. 1993, vol. 13 No. 1,8 pages.
Adrian Nye, "The Definitive Guide to the X windows System", "Xlib programming Manual", O'Reilly & Associates Inc., vol. 1, 1998, ISBN 0-9371.75-26-29,105 pages.
Douglas A. Young."The X window system programming and applications with Xt OSF/Motif Edition", Prentice Hall, 1990, 70 pages.
Filing Receipt for Non Patent Literature Documents, Dec. 3, 2007, 4 pages.
"PATENT APPLICATION", Aug. 14, 2002, 43 Pages.
"Notice to File Missing Parts Of Non-provisional Application", Sep. 11, 2002, 2 pages.
"Notice To File Missing Parts Of Non-provisional Application", Sep. 11, 2002, 5 pages.
"Information Disclosure Statement Under37 CFR § 1.97 and §1.98", U.S.Reexamination, Sep. 8, 2003, 5 Pages.
"Request for Refund Under 27 CFR § 1.28", Apr. 8, 2003, 6 pages.
"Office Action Summary", Jul. 20, 2004, 23 pages.
"Letter Restarting the Period for Response to the Last Office Action", Date Mailed : Sep. 9, 2004 5 pages.
George Toy, "SHARE: A Methodology and Environment for Collaborative Product Development", 1993 IEEE, 15 pages.
Toye, G."SHARE: A Methodology And Environment For Collaborative Production Development", Apr. 20-22 , 1993, IEEE in: Enabling Technologies: Infrastructure for Collaborative Enterprises, pp. 33-47, 3 pages.
Jin-Kun Lin,"MediaMosaic—A Multimedia Editing Environment",USIT'92, ACM Portal, Nov. 1992, pp. 135-140.
Message System for Andrew, Proceedings of the USENIX Winter Technical Conference, USIT'92, Nov. 1992, 1 page.
Frank G. Halasz,"Reflections on Notecards: Seven Issues For The Next Generation Of Hypermedia Systems", ACM Journal on Computer Documentation Aug. 2001 vol. 25, No. 3, 18 pages.
S. Feiner,"An experimental system for creating and presenting interactive graphical documents", ACM Transactions on Graphics (TOG) archive, vol. 1 , Issue 1 (Jan. 1982), pp. 59-77,ISSN:0730-0301, 23 pages.
Douglas C. Engelbart," Knowledge-domain interoperability and an open hyper document system", Computer Supported Cooperative Work archive Proceedings of the 1990 ACM conference on Computer-supported cooperative work , pp. 143-156,ISBN:0-89791-402-3,ACM Press,1990, 20 pages.

Norman Meyrowitz,"Intermedia: The Architecture and Construction of an Object-Oriented Hypermedia System and Applications Framework", 1986 ACM, Sep. 1986, 24 pages.
UffeKock Will,"Issues in the Design of EHTS:A Multiuser Hypertext System for Collaboration", 1992 IEEE, 13 pages.
Augusto Celentano,"A Multiple Presentation Document Management System", 1992 ACM, 14 pages.
Pankaj K. Garg,"A Hypertext System to Manage Software Life Cycle Documents",1988 IEEE, 13 pages.
"Response to office Action", Mar. 11, 2005, 69 pages.
"Terminal Disclaimer To Obviate A Double Patenting Rejection over a PRIOR Patent", Mar. 11, 2005, 3 pages.
"Object Linking & Embedding 2.0 Developers Conference", Conference Guide, Microsoft Corporation, May 1993, 48 pages.
"Object Linking & Embedding 2.0 Developers Conference", Microsoft Corporation, May 1993, 339 pages.
"Object Linking & Embedding 2.0", OLE 2.0 Design Specification, Microsoft Corporation, Apr. 15, 1993, 335 pages.
"Microsoft Multimedia Viewer", Microsoft Corporation, Version 2.0, 1993, 242 pages.
Microsoft Product Support Services Application Note (Text File), Microsoft Corporation, 1989-1992, 38 pages, available at http://latex2rtf.sourceforge.net/RTF-Spec-1.0.txt.
"OLE 2.0 Architecture and Protocol Proposal", Microsoft Corporation, Jul. 9, 1991, 41 pages.
"OLE 2.0 Design Summary", Microsoft Corporation, Jul. 5, 1991, 44 pages.
David Raggett, "HTML+ (Hypertext markup language)", WWW Discussion Group, Jul. 23, 1993, 34 pages.
"USPTO Office communication", Oct 18, 2006, U.S. Reexamination control No:90/007,85. 2 pages.
"Information Disclosure Statement", Jan. 3, 2007, 4 pages.
"Information Disclosure Statement By Applicant", Form 1449A, Jan. 8, 2007, 2 pages.
"Information Disclosure Statement", Jan. 29, 2007, 3 pages.
"Information Disclosure Statement by Applicant", Jan. 29, 2007, 2 pages.
"Information Disclosure Statement", Jan. 26, 2007, 3pages.
"Information Disclosure Statement By Applicant", Jan. 26, 2007, 1 page.
WWW Talk 1992 Archives: "Re: Lets keep the web together", Messages from Jan. 9, 1992 to Dec. 22, 1992, 1 page, available at http://ksi.cpsc.ucalgary.ca/archives/wvvw-TALK/www-talk-1992.messages/385.html.
"Information Disclosure Statement", Feb. 2, 2007, 3 pages.
"Information Disclosure Statement By Applicant", Feb. 2, 2007, 2 pages.
"Notice of Lodging of Deposition Testimony", *Eolas* Vs *Microsoft*, in the United States District Court, Jul. 21, 2003, 167 pages.
"Information Disclosure Statement", May 7, 2007, 3 pages.
"Information Disclosure Statement by Applicant", May 7, 2007, 1 page.
"Submission of Information Pursuant to 35 U.S.C. § 301 and 37 CFR 1.501 in relation to U.S. Patent No. 5.838,90", Oct. 14-22, 2003, 16 pages.
Potential Director-Ordered Reexamination of U.S. Patent No. 5,838,906 pursuant to 35 U.S.C. §303(a), Oct. 15, 2003, 3 pages.
David Raggett," HTML+ (Hypertext markup language)", www Discussion Group:, Jul. 23, 1993, 35 pages.
WWW Talk Apr.-Jun. 1993 Archives: HTML+ support for eqn & Postscript, Messages from Wed, Mar. 31, 1993 to Wed, Jun. 30, 1993, 4 pages, available at http://ksi.cpsc.ucalgary.ca/archives/WWW-TALK/www-talk-1993q2.messages/467.html.
David St John Raggett, Declaration of Davis St John Reggett, Declaration Under 37 CFR 1132, Oct. 4, 2003, 6 pages.
Paul Festa," PATENT POLITICS", Sep. 25, 2003, 6 pages, available at http://news.cnet.com/2009-1023_3-5082004. html.
Paul Roberts,"Microsoft's patent loss rattles tech community", InfoWorld, Sep. 3, 2003, 4 pages.
Paul Festa, "Eolas files motion to enjoin IE", CNET News, Oct. 8, 2003, 4 pages, available at http://news.cnet. com/2100-1028_3-5088349.html?tag=st_pop.
Ray Ozzie,"Saving the Browser", 2003, 20 pages.

O'Reilley Network: Patents List, Controversial Patents, Jul. 2003, 3 pages.
WWW Talk Apr.-Jun. 1993 Archives, Mar. 1993, 39 pages.
Silvano Pozzi, "ALIVE: A distributed live-link documentation system", Lectronic Publishing, vol. 5(3), Sep. 1992, 12 pages.
M. Satyanarayan, "The Project: An Experiment in Large-Scale Distributed Personal Computing", Oct. 1984, 24 pages.
David Trowbridge, "Using Andrew for Development of Educational Applications", Jun. 1985, 6 pages.
Bruce Arne Sherwood, "An integrated authoring environment", Jun. 1985, 8 pages.
James H Morris, "Andrew: A Disturbed Personal Computing Environment", Communications of ACM, Mar. 1986, vol. 29, No. 3, 18 pages.
Ayami Ogura, "The Andrew System Programmer's Guide to the Base Environment", IBM Corporation, Nov. 1986, Version 2, 162 pages.
Bob Sidebotham , "Volumes: The Andrew File System Data Structuring Primitive", EUUG Conference Proceedings Manchester, UK Autumn 1986, 8 pages.
Edward R. Zayas, "Administrative Cells: Proposal for Cooperative Andrew File Systems", Information Technology Centre, Carnegie Mellon University, Jun. 25, 1987, 12 pages.
David Trmvbridge, "Design and Implementation of a Computer-Based Tutor", Center for Design of Educational Computing, 8th National Educational Computing Conference, 1987, 16 pages.
Edward R. Zayas et. al, "Design and Specification of the Cellular Andrew Environment", International Business Machines, Aug. 1988, 76 pages.
Maria Go Wadlow, et al. User Interface Guidelines for the Andrew System, Version 2.0, Dec. 1988, 48 pages.
Nathaniel Borenstein, et al., "A Multi-media Message System for Andrew", Information Technology Center, Carnegie-Mellon University, 1988, 9 pages.
John H Howard, "An Overview of the Andrew File System", Information Technology Center, Carnegie Mellon University, 1988, 6 pages.
JJames H. Morris, "Make or Take Decisions in Andrew", Information Technology Center Carnegie Mellon University, 1988, 10 pages.
Michael Leon Kazar, "Synchronization and Caching Issues in the Andrew File System", Information Technology Center, Carnegie-Mellon University, 1988, 14 pages.
Jaap Akkerhuis et. al., "Processable Multimedia Document Interchange using ODA", Information Technology Center, Carnegie Mellon University, EUUG Conference Proceedings, Vienna, Sep. 1989, 12 pages.
Mark Sherman, et. al., "Experiences Interchanging Multimedia Documents Using ODA", 1st World Electronic Media Symposium Oct. 1989, Geneva, 5 pages.
Dan Boyarski, "A Visual Tour of Andrew", Snapshots of the Andrew system, A campus-wide computing network, Sep. 11, 1989, 21 pages.
Nathaniel S. Borenstein, et.al., "Architectural Issues in the Andrew Message System", Information Technology Center, Carnegie Mellon University, 1989, 13 pages.
James H. Morris, "Experience with Electronic Mail in Andrew", Carnegie Mellon University, 1989, 24 pages.
Wilfred J. Hansen, "Enhancing documents with embedded programs: How Ness extends insets in the Andrew Tool Kit", Jan. 1990, 20 pages.
Maria G. Wadlow, "The Andrew System: The Role of Human Interface Guidelines in the Design of Multimedia Applications", May 1990, Current Psychology: Research and Reviews (Summer 1990), 22 pages.
Mark Sherman, et al., "Building Hypertext on Multimedia Toolkit: An Overview of Andrew Toolkit Hypermedia Facilities", Aug. 1990, Information Technology Center, Carnegie Mellon University, 12 pages.
Mark Sherman, "Exchanging Multimedia Documents: The Office Document Architecture", BMUG Newsletter, vol. IV, No. I, Winter/Spring 1990, 3 pages.
Christina Haas et al., "Helping the User by Helping the Developer: The Role of Guidelines in a Multimedia Context", SIGCHI Bulletin, Jan. 1991, vol. 23, 4 Pages.

Paul G. Crumley, "TRADMYBD—Technical Reference Technical Reference Manual and Programmers' Guide", Version 1.00, Jan. 1991, 57 pages.
Ayumi Ogura et. al., "The Design and Maintenance of the Andrew Help System: Providing a Large Set of Information to a Large Community of Users", SIGCHI Bulletin, Jan. 1991, vol. 23, 4 pages.
Thomas Neuendorffer, "ADEW: A Multimedia Interface Builder for Andrew", Jul. 1991, Sydney, 19 pages.
Michael L. Horowitz, "The Alexandria Project: In support of an Information Environment", Nov. 21, 1991, 33 pages.
Wilfred J. Hansen, "The Andrew View, Andrew Consortium", vol. 2, No. 2, Jun. 1993, 12 pages.
Wilfred J. Hansen, "Andrew as a Multiparadigm Environment for Visual Languages", Visual Languages, 1993 IEEE Symposium, IEEE/IEE Publications, 6 pages.
"Bibliography of Publications on The Andrew User Interface System", Selections from 1984-1995, 4 pages.
Wilfred J. Hansen, "Data stream formats in the Andrew User Interface System", Andrew Consortium, Carnegie Mellon University, Apr. 26, 2006, Obtained From : http://www.fileformat.info/format/cmu/spec/c4cfb8404a304ea687b344485c445eb2/view.htm, 6 pages.
Rob McCool, "CGP/1.0 specification", WWW Talk Oct 93-present, available at http://1997.webhistory.org/www.lists/www-talk.1993q4/0518.html, 3 pages.
Alan Falconer Slater, Controlled by the Web, Heriot-Watt University, Firs International Conference on the World-Wide Web, May 1994, 1-11 pages.
D. D. Cowan, "Application Integration: Constructing Composite Applications from Interactive Components", Software Practice and Experience, vol. 23(3), Mar. 1993, pp. 255-275.
Eric A. Bier, "Embedded Buttons: Documents as User Interfaces", UIST'91, ACM Portal, Nov. 1991, pp. 45-53.
Messages from compu.windows.news discussion group, posted by Theodore Thompson, May 31, 1989, 7 pages.
Jim Rudolf, "Completing the Job of Interface Design", IEEE Computer Society, Nov. 1992, vol. 9, issue 6, pp. 11-22.
Hyperlook, The Turning Institute Limited, 1991, 51 Pages.
Message from Don Hopkins, dated Nov. 1, 1989, 3 pages.
Larry Koved, Embedded Menus: Selecting Items In Context, 1987 ACM Computer Science Conference, Communication of ACM, Apr. 1986, vol. 29, No. 4, pp. 312-318.
John Ewing, "An experimental comparison of a mouse and arrow-jump keys for an interactive encyclopedia", Mar. 6, 1985, Academic Press Inc., pp. 29-45.
"Research Directions for Hyperties", Community Meeting, Oct. 12, 1987, 2 pages.
Ben Shneiderman, "User interface design for the Hyperties electronic encyclopedia", Hypertext '87 Papers, Nov. 1987, pp. 189-194.
"What is Emacs?", Unipress Emacs Newsletter, Feb. 1988, pp. 4-8.
Ben Shneiderman, "User interface design for the Hyperties electronic encyclopedia", Proceedings of Hypertext '87, Nov. 1987, pp. 199-204.
Ben Shneiderman, "Evaluating Three Museum Installations of a Hypertext System", Department of Computer Science and Human-Computer Interaction Laboratory, University of Maryland, Jul. 1988, Pages27.
Ben Shneiderman, "UNIX and X-Windows implementations for the Hyperties Hypertext System", Proposal to UMIACS lab community, Dec. 12,1988 5 pages.
Edward Barrett, "The Society of Text", Hypertext, Hypermedia, and the Social Construction of Information, 1989 Massachusetts Institute of Technology, the MIT Press, 19 pages.
Ben Shneiderman, "Evaluating Three Museum Installations of a Hypertext System", Journal Of The American Society For Information Science, May 1989, 11 pages.
Fersko-Weiss, Henry, "3-D reading with the hypertext edge" May 28, 1991, PC Magazine, vI0, nI0, p. 260(2), 2 pages.
"Integrated voice/video/data system puts Indiana Prairie schools on leading edge", T H E Journal (Technological Horizons In Education), v19, nl, p. 32(2), Aug. 1991, 7 pages.
Intel's Alan Priestly explains where digital video interactive is heading, Computergram International, n17, Sep. 13,1991, 3 pages.

Ben Shneiderman, "Designing to Facilitate Browsing: A Look Back At the Hyperties Workstation Browser", University of Maryland, vol. 3, No. 2, 1991, pp. 101-117.
Hyperties Version 3.05, Industrial Hypertext Software Strength + Multimedia for the IBM PC, Cognetics Corporation, May 1992,421 pages.
Jim Canning, "Hyperties offers extensive hyperlinking", Info World Magazine Review Board, Sep. 7, 1992, p. 76.
Jim Canning, "Hyperties offers extensive hyperlinking", Info World Magazine Review Board, Sep. 7, 1992, p. 77.
Jim Canning, "Hyperties offers extensive hyperlinking", Info World Magazine Review Board, Sep. 7, 1992, pp. 76-77.
Hyperties, "Hypetext + Multimedia Software for the IBM PC", Hyperties 3.05 Professional Version Disk 1, Cognetics Corporation, 1992.
"Hyperties", "Hypetext 30 Multimedia Software for the IBM PC", Hyperties 3.05 Professional Version Disk 2, Cognetics Corporation, 1992.
"Hyperties", "Hypetext + Multimedia Software for the IBM PC", Hyperties 3.0 Browser Tour, Cognetics Corporation, 1992.
"Hyperties Version 3.05", "Quick Start and Troubleshooting Guide", Cognetics Corporation, 1992, 22 pages.
Multimedia Technology in Engineering Education, Issam Qasem and Habib Mohamadian Southern University, IEEE, 1992, pp. 46-49.
Ehud Rivlin,"Navigating in Hyperspace", Communication of the ACM, vol. 37 Issue 2, Feb. 1994. pp. 87-96.
Norman Meyrowitz,"Intermedia: The Architecture and Construction of an Object-Oriented Hypermedia System and Applications Framework", ACM 0-89791-204-7/86/09(X)-0186, Sep. 1986, 16 pages.
Nicole Yankelovich,"Intermedia: The Concept and the Construction of a Seamless Information Environment", IEEE 0018-9162/88/0100-00815, Jan. 1988, 16 pages.
Timothy Catlin,"InterNote: Extending a Hypermedia Framework to Support Annotative Collaboration", ACM 089791-339-6/89/0011/0378, Nov. 1989, 14 pages.
Cynthia A. Char,"Design Options for Interactive Videodisc: A Review and Analysis", May 1986, 21 pages.
Taylor Graham, "Hypermedia",ISSN 0955-8543, vol. 2 No. 1, 1990, 22 pages.
Bernard J.Haan," IRIS Hypermedia Services", Communications of the ACM, vol. 35, No. 1, Jan. 1992, 16 pages.
Paul Kahn,"Design of Hypermedia Publications: Issues and Solutions", ISBN 0 521 40246 8, Proceedings of the International Conference on Electronic Publishing, Sep. 1990, 20 pages.
Paul Kahn,"Video in Hypermedia: The Design of InterVideo", Visual Resources, Vol. VII, pp. 353-360, 1991, 10 pages.
Dr. James H. Coombs," Hypertext, Full Text, and Automatic Linking", Proceedings of the 13th International Conference on Research and Development in Information Retrieval, ISBN 0-89791-408-2, Sep. 5-7, 1990, 18 pages.
Norman Meyrowitz,"Intermedia: The Architecture and Construction of an Object-Oriented Hypermedia System and Applications Framework", ACM 0-89791-204-7/86/09(X)-0186, Sep. 1986, 16 pages.
Norman Meyrowitz,"The Missing Link: Why We're All Doing Hypertext Wrong", The Society of Text Hypertext, Hypermedia, and the Social Construction of Information, ISBN 0-262-0229 I-5, 1989, 10 pages.
Victor A. Riley,"An Interchange Format documents for Hypertext Systems: anchors the Intermedia Model", National Institute of Standards and Technology Special Publication 500-178, Mar. 1990, 12 pages.
Karen E. Smith,"Intermedia: A Case Study of the Differences between Relational and Object-Oriented Database Systems", ACM 0-89791-247-0/87/0010-0452, 1987, Oct. 1987, 14 pages.
Kenneth Utting,"Context and Orientation in Hypermedia Networks", ACM Transactions on Information Systems, vol. 7, No. 1, pp. 58-84, Jan. 1989, 27 pages.
"Computer", Electronic publishing Technologies, Computer Society of IEEE, IEEE 0018-9162/88/0100-0081, Jan. 1988, 18 pages.
Kate Barnes,"10 Minute Guide to Lotus Notes Release 3 for Windows", ISBN 1-56761-176-1, printed in the United States of 'America, 1993, 179 pages.

Richard L. Phillips,"A Bridge from full-function to Reduced-function Workstations", IEEE Explore, ISBN 0272-1716/86/0500-0053, May 1986, 5 pages.
Richard L. Phillips,"A Scientific Visualization Workbench", IEEE CH2617-9/88/0000/014, 1988, 8 pages.
Richard L. Phillips,"Distributed Visualization at Los Alamos National Laboratory", Aug. 1989, 8 pages.
Richard L. Phillips,"An Interpersonal Multimedia Visualization System", IEEE Computer Graphics & Applications, May 1991, 8 pages.
Richard L. Phillips,"A General Multimedia Digital publication System", Communications of the ACM, vol. 34, No. 7, Jul. 1991, 9 pages.
Hugh Davis,"Towards an Integrated Information Environment with Open Hypermedia Systems", Oct. 11, 1993, 10 pages.
Wendy Hall,"The Microcosm Link Service", ACM 0-89791-624—719310011, Hypertext '93 Proceedings, Nov. 1993, 4 pages.
Antoine Rizk," Multicard : An open hypermedia System", ACM ECHT Conference, ISBN-89791-547-X/92/0011/0004, Nov. 30, 1992, 7 pages.
"Advanced MS DOS programming", Microsoft Corporation, 1986, 6 pages.
Tony Williams, "extensible Compound Document Architecture", Microsoft Corporation, Jul. 10, 1990, 36 pages.
"Compound Documents Backgrounder", Microsoft Corporation, Dec. 1990, 5 pages.
"Information at your fingertips Backgrounder", Microsoft Corporation, Dec. 1990, 3 pages.
"Object Linking and Embedding Backgrounder", Microsoft Corporation, Dec. 1990, 6 pages.
"The Windows Interface An application Design Guide", Microsoft Corporation, ISBN 1-55615-439-9, 1987, 226 pages.
"Object linking & embedding", beta version, Extensible Application Protocols, Microsoft Corporation, Apr. 8, 1991, 96 pages.
"OLE 2.0 Design Summary", Annotated Version, Microsoft Corporation, Jul. 5, 1991, 44 pages.
"OLE 2.0 Architecture and Protocol Proposal", Microsoft Corporation, Jul. 9, 1991, 41 pages.
Kraig Brockschmidt,"A Primer on Designing Custom Controls", 14 pages.
Microsoft Product Support Services Application Note (Text File), Microsoft Corporation, 1989-1992, 38 pages, available at http://latex2rtf.sourceforge.net/RTF-Spec-1.0.txt.
Robert G. Atkinson,"Method and System for Transactioning of Modifications to a Tree Structured File", United States Patent (US005506983A), Apr. 9, 1996, 28 pages.
Robert G. Atkinson,"Method and System for Referring to and Binding to Objects Using Identifier Objects", United States Patent (US005682536A), Oct. 28, 1997, 91 pages.
Robert G. Atkinson,"Method and System for Storing Data Objects Using a Small Object Data Stream", United States Patent (US005706504A), Jan. 6, 1998, 28 pages.
Robert G. Atkinson,"Method and System for Storing and Accessing Data in a Compound Document Using Object Linking", United States Patent (US005715441A), Feb. 3, 1998, 28 pages.
Robert G. Atkinson,"Method and System for Referring to and Binding to Objects Using Identifier Objects", United States Patent (US005740439A), Apr. 14, 1998, 90 pages.
Srinivasa R. Koppolu,"Method and System for In-Place Interaction With Contained Objects", United States Patent (US005754175A), May 19, 1998, 95 pages.
Kraig Brockschmidt,"Network DDE in Windows for Workgroups 3.1 Bridges Programs between PCs", Microsoft Systems Journal, 1993, 15 pages.
"Object Linking & Embedding 2.0 Developers Conference", Microsoft Corporation, May 1993, 46 pages.
"Microsoft OLE 2.0 Developers Conference", Microsoft Corporation, May 1993, 6 pages.
"Object Linking & Embedding 2.0 Developers Conference", Microsoft Corporation, May 1993, 339 pages.
WWW-Talk Apr.-Jun. 1993: Re: Standardizing new HTML features, Messages from Thu Apr. 1, 1993 to Wed Jun. 30, 1993, 2 pages, available at http://1997.webhistory.org/www.lists/www-talk.1993q2/0178.html.
WWW-Talk Apr.-Jun. 1993: Standardizing new HTML features, Messages from Thu Apr. 1, 1993 to Wed Jun. 30, 1993, 2 pages, available at http://1997.webhistory.org/www.lists/www-talk.1993q2/0180.html.
WWW-Talk Apr.-Jun. 1993: Re: Standardizing new HTML features, Messages from Thu Apr. 1, 1993 to Wed Jun. 30, 1993, 2 pages, available at http://1997.webhistory.org/www.lists/www-talk.1993q2/0184.html.
WWW-Talk Apr.-Jun. 1993: Re: Standardizing new HTML features, Messages from Thu Apr. 1, 1993 to Wed Jun. 30, 1993, 1 page, available at http://1997.webhistory.org/www.lists/www-talk.1993q2/0200.html.
WWW-Talk Apr.-Jun. 1993: Re: Standardizing new HTML features, Messages from Thu Apr. 1, 1993 to Wed Jun. 30, 1993, 2 pages, available at http://1997.webhistory.org/www.lists/www-talk.1993q2/0198.
WWW-Talk Apr.-Jun. 1993: Re: Standardizing new HTML features, Messages from Thu Apr. 1, 1993 to Wed Jun. 30, 1993, 1 page, available at http://1997.webhistory.org/www.lists/www-talk.1993q2/0201.html.
WWW-Talk Apr.-Jun. 1993: Re: Standardizing new HTML features, Messages from Thu Apr. 1, 1993 to Wed Jun. 30, 1993, 1 page, available at http://1997.webhistory.org/www.lists/www-talk.1993q2/0202.html.
WWW-Talk Apr.-Jun. 1993: Tables and Html+, Messages from Thu Apr. 1, 1993 to Wed Jun. 30, 1993, 1 page, available at http://1997.webhistory.org/www.lists/www-talk.1993q2/0271.html.
WWW-Talk Apr.-Jun. 1993: Html+ support for eqn & Postscript, Messages from Thu Apr. 1, 1993 to Wed Jun. 30, 1993, 2 pages, available at http://1997.webhistory.org/www.lists/www-talk.1993q2/0469.html.
WWW-Talk Apr.-Jun. 1993: Html+ support for eqn & Postscript, Messages from Thu Apr. 1, 1993 to Wed Jun. 30, 1993, 1 page, available at http://1997.webhistory.org/www.lists/www-talk.1993q2/0484.html.
WWW-Talk Apr.-Jun. 1993: Re: Xmosaic and Xv, Messages from Thu Apr. 1, 1993 to Wed Jun. 30, 1993, 2 pages, available at http://1997.webhistory.org/www.lists/www-talk.1993q2/0656.html.
WWW-Talk Apr.-Jun. 1993: NCSA Mosaic for X 1.2 available, Messages from Thu Apr. 1, 1993 to Wed Jun. 30, 1993, 3 pages, available at http://1997.webhistory.org/www.lists/www-talk.1993q2/0700.html.
WWW-Talk 1992: viola update (with latest W3 library), Messages from Thu Jan. 9, 1992 to Sat Dec. 9, 1995, 1 page, available at http://1997.webhistory.org/www.lists/www-talk.1992/0152.html.
WWW-Talk Oct.-Dec. 1993: NCSA Mosaic for X 2.0 prerelease 5 available, Messages from Thu Sep. 30, 1993 to Fri Dec. 31, 1993, 2 pages, available at http://1997.webhistory.org/www.lists/www-talk.1993q4/0151.html.
WWW-Talk 1991: WorldWideWeb mailing list: Introduction, Messages from Mon Oct. 28, 1991 to Fri Dec. 13, 1991, 1 page, available at http://1997.webhistory.org/www.lists/www-talk.1991/0001.html.
WWW-Talk 1991 by thread: X Browser, Messages from Mon Oct. 28, 1991 to Fri Dec. 13, 1991, 1 page, available at http://1997.webhistory.org/www.lists/www-talk.1991/0029.html.
WWW-talk from Jan. to Feb. 1992: Viola - WWW interface, Messages from Thu Jan. 9, 1992 to Thu Feb. 27, 1992, 3 pages, available at http://lists.w3.org/Archives/Public/www-talk/1992JanFeb/0002.html.
WWW-Talk Apr.-Jun. 1993 by thread: WWW Developer's Conference, Messages from Thu Apr. 1, 1993 to Wed Jun. 30, 1993, 2 pages, available at http://1997.webhistory.org/www.lists/www-talk.1993q2/0572.html.
WWW-Talk Jan.-Mar. 1994 by thread: Re: Universal network graphics language, Messages from Mon Oct. 18, 1993 to Thu Mar. 31, 1994, 2 pages, available at http://www.intercom.co.cr/www-archives/1994-q1/0361.html.
WWW-Talk Jan.-Mar. 1994 by thread: ViolaWWW beta release is available, Messages from Mon Oct. 18, 1993 to Thu Mar. 31, 1994, 2 pages, available at http://www.intercom.co.cr/www-archives/1994-q1/0716.html.

WWW-Talk Jan.-Mar. 1994 by thread: ViolaWWW Release, Messages from Mon Oct. 18, 1993 to Thu Mar. 31, 1994, 1 page, available at http://www.intercom.co.cr/www-archives11994-q1/1031.html.
WWW-Talk Jan.-Mar. 1994 by thread: viola-talk@ora.com, Messages from Mon Oct. 18, 1993 to Thu Mar. 31, 1994, 1 page, available at http://www.intercom.co.cr/www-archives11994-q1/1069.html.
Pei E Wei, A Brief Overview of the VIOLA Engine, and its Applications, Aug. 26, 1999, 11 pages.
WWW-VRML1994 by thread: Re: Fyi . . . press release, Messages from Fri Jun. 10, 1994 to Tue Dec. 27, 1994, 2 pages, available at http://1997.webhistory.org/www.lists/www-vrml.1994/0490.html.
WWW-VRML 1994 by thread: Re: Fyi . . . press release, Messages from Fri Jun. 10, 1994 to Tue Dec. 27, 1994, 1 page, available at http://1997.webhistory.org/www.lists/www-vrml.1994/0488.html.
WWW-VRML 1994 by thread: Re: FYI . . . press release, Messages from Fri Jun. 10, 1994 to Tue Dec.27, 1994, 2 pages, available at http://1997.webhistory.org/www.lists/www-vrml.1994/0489.html.
WWW-VRML 1994 by thread: Scripts vs APIs, Messages from Fri Jun. 10, 1994 to Tue Dec. 27, 1994, 1 page, available at http:/11997.webhistory.org/www.lists/www-vrml.1994/0496.html.
WWW-VRML 1994 by thread: Re: FYI . . . press release, Messages from Fri Jun. 10, 1994 to Tue Dec. 27, 1994, 2 pages, available at http://.1997.webhistory.org/www.lists/www-vrml.1994/0493.html.
WWW-VRML 1994 by thread: Re: FYI . . . press release, Messages from Fri Jun. 10, 1994 to Tue Dec. 27, 1994, 2 pages, available at http://.1997.webhistory.org/www.lists/www-vrml.1994/0490.html.
WWW-VRML 1994 by thread: Re: FYI . . . press release, Messages from Fri Jun. 10, 1994 to Tue Dec. 27, 1994, 2 pages, available at http://.1997.webhistory.org/www.lists/www-vrml.1994/0492.html.
Pei Wei," www Browsers: Extensibility Issues", Sep. 20-21, 1994, 8 pages.
WWW-Talk Jul.-Sep. 1995 by thread: Re: Eolas Acquires Milestone Internet Software Patent, Messages from Mon Jul. 3, 1995 to Tue Sep. 26, 1995, 2 pages, available at http://www.intercom.co.cr/www-archives/1995-q3/0438.html.
WWW-Talk Jul.-Sep. 1995 by thread: Re: Eolas Acquires Milestone Internet Software Patent, Messages from Mon Jul. 3, 1995 to Tue Sep. 26, 1995, 1 page, available at http://www.intercom.co.cr/www-archives/1995-q3/0426.html.
Lesley Williams Brunet,"Oral History and Information Technology: Human Voices of Assessment", Journal of Organizational Computing, 1(3), 251-274(1991), 25 pages.
G. Anthony Gorry,"The Virtual Notebook System: An Architecture for Collaborative Work", Journal of Organizational Computing, 1(3), 233-250 (1991), 18 pages.
Jerry Fowler,"Experience with the Virtual Notebook System: Abstraction in Hypertext", ACM 0-89791-689-1/94/0010, 1994, 11 pages.
By James Kobielus,"Tools tailored to meetings", Network World, Aug. 9, 1995, 1 page.
Bob Brown, "CLIENT/SERVER APPLICATIONS Distributed Databases, Messaging, Groupware, Imaging and Multimedia", Network World, Aug. 16, 1993, 2 pages.
Andrew M. Burger,"The Virtual Notebook System", Hypertext '91 Proceedings, Dec. 1991, 7 pages.
"Enterprise Applications", Networkworld, Feb. 8, 1993, 2 pages.
Frank M. Shipman, "Distributed Hypertext for Collaborative Research: The Virtual Notebook System", Hypertext '89 Proceedings, Nov. 1989, 7 pages.
Robert Cailliau, "A Little History of the World Wide Web", Oct. 3, 1995, 4 pages, available at http://www.cs.princeton.edu/~chazelle/courses/BIB/history-web.pdf.
WWW-Talk Jan.-Mar. 1994 by thread: ViolaWWW beta release is available, Messages from Mon Oct. 18, 1993 to Thu Mar. 31, 1994, 2 pages, available at http://www.intercom.co.cr/www-archives/1994-q1/0716.html.
WWW-Talk Jan.-Mar. 1994 by thread: ViolaWWW beta release is available, Messages from Mon Oct. 18, 1993 to Thu Mar. 31, 1994, 2 pages, available at http://www.intercom.co.cr/www-archives/1994-q1/0722.html.
Pei Wei,"The Viola Home Page", Oct 24, 1999, 32 pages, available at http://www.viola.org/.

WWW-Talk Jan.-Mar. 1995 by thread: Re: Hot Java is here! and it "rocks", Message from Sat Dec. 31, 1994 to Fri Apr. 7, 1995, 2 pages, available at http://1997.webhistory.org/www.lists/www-talk.1995q1/0711.html.
Stuart J. Johnston,"Developers get hands on complex but vital OLE 2.0", Info World, vol. 15, Issue 19, May 10, 1993, 3 pages.
"Addendum to the Proceedings", ACM ISBN: 089791-661-1, Sep. 1993, 7 pages.
Wayne Eckerson "Microsoft brings object technology to the mainstream", Network World, Oct. 4, 1993, 2 pages.
"The International Conference for Windows", Oct. 1993, 12 pages.
"OLE Controls Architecture", Version 0.7, Microsoft Corporation, Nov. 17, 1993, 74 pages.
"Microsoft Multimedia Viewer", Microsoft Corporation, Version 2.0, 1993, 37 pages.
"Microsoft Multimedia Viewer", Microsoft Corporation, Version 2.0, 1993, 242 pages.
"OLE 2. 0 Developers Conference", 1993, 464 pages.
"Microsoft OLE Controls- Preliminary Specification and Overview", Microsoft Corporation, Jan. 1994, 18 pages.
Jon Udell,"Visual Basic Custom Controls Meet OLE", BYTE Magazine, Mar. 1994, 3 pages.
"Microsoft: the road to OLE 2.0", Release 1.0, May 25, 1994, 5 pages.
David E. Y Sarna,"OLE Gains Without (Much) Pain", Data Mation, Jun. 15, 1994, 4 pages.
Micheal Coony,"IBM set for its ATM coming-Out Party", Network World, vol. 11, No. 26, Jun. 27, 1994, 2 pages.
Kevin Fogarty,"Microsoft's OLE can be network Trojan horse", Network World, vol. 11, No. 26, Jun. 27, 1994, 1 page.
"Cafe OLE: get ready for Windows 4.0 with OLE 2.0", Compute, Issue 167, Aug. 1994, p. 38, 7 pages.
"OLE 2.0: Death to Monoliths?", BYTE Magazine, Mar. 1994, 1 page.
Michael Moeller,"Microsoft maps new OCX plan; ActiveX seen as Web content platform", PC Week, v13 n. 10, Mar. II, 1996, 2 page.
George Toye,"Share: A Methodology and Environment for Collaborative Product Development", IEEE 0-8186-4082-0/9, 1993, 18 pages.
Andrew D. Birrell,"Implementing Remote Procedure Calls", ACM Transactions on Computer Systems, vol. 2, No. 1, Feb. 1984, pp. 39-59, 21 pages.
"Xerox Viewpoint Series Product Descriptions", Xerox Corporation, Apr. 1985, 142 pages.
"Product Descriptions", Xerox Corporation, Jul. 1985, 96 pages.
James Donahue,"Integration Mechanisms in Cedar", ACM 0-89791-165-2/85/006/024, 1985, 7 pages.
Richard E. Sweet,"The Mesa Programming Environment", ACM 0-89791-165-2/85/006/0216, 1985, 14 pages.
Jeff Johnson,"The Xerox Star: A Retrospective", IEEE 0018-9162/89/0900-0011, Sep. 1989, 18 pages.
Michael D. Doyle, "Processing of cross-sectional Image data for Reconstruction of human developmental Anatomy from museum specimens", Feb. 1993, Sigbio Newsletter, 7 pages.
WWW-Talk Oct.-Dec. 1993 by date, "NCSA Mosaic for X 2.0 available", Messages from Sep. 30, 1993 to Dec. 31, 1993, 8 pages, Available at http://1997.webhistory.org/www.lists/www-talk.1993q4/0447.html.
Mark j kilgard,"OPEN GL& X", the X Journal Nov.-Dec. 1993, 15 pages.
Mark j kilgard,The X journal Jan.-Feb. 1994, 23 pages.
Mark J. Kilgard, "OpenGL and X Integrating OpenGL , Part " with Motif", Jul./Aug. Issue of the X Journal, May 9, 1994, 12 pages.
John F. Koegel,"HyOctane: A HyTime Engine for an MMIS", ACM Published in Proc. ACM Multimedia "93, Aug. 1993,8 pages.
Steven R. Newcomb, "Hyper Media/Time Based Document Structuring Language", Communications of the ACM/Nov. 1991/vol. 34, No. II, 17 pages.
Lloyd Rutledge,"A HyTime engine for hypermedia document presentation", Sep. 8, 1993, 61 pages.
John F. Koegel,"Supporting Real-Time Analysis of Multimedia Communication Sessions", SPIE digital library on Jun. 3, 2010 to 152.1.24.47, 10 pages.

John F. Koegel,"Toolkits for Multimedia Interface Design", Proc. Xhibition '92, Jun. 1992, 17 pages.
Eric M. Hoffert,"The Digital News system at EDUCOM: A Convergence of interactive computing,News papers, Television and High Speed Networks", Communications of the ACM/Apr. 1991/vol 34,No. 4, 4 pages.
Michael Swaine,"Applications Are Talking Too", May 1991, 6 pages.
D. S. Blodgett,"Integrating Commercial Off-The-Shelf Tools for Custom Software Development", Jun. 1992, 36 pages.
Troy Kelley,"Developing a Hypercard-Unix Interface for Electronic Mail Transfer", Jun. 1992, 114 pages.
Eric Lease Morgan," Implementing TCP/IP Communications with HyperCard", Information Technology and Libraries; Dec. 1992; 11, 4; ABI/INFORM Global, 12 pages.
Dean Blackketter,"Building Network-based Interactive Media", Apple Computer, Inc, Downloaded on May 4, 2010 at 19:47:41 UTC from IEEE Xplore, 6 pages.
"Textual Pornography", Jun. 2, 2010, 21 pages.
Frank M. Kappe,"Aspects of a Modern Multi-Media Information System", Jun. 1991, 163 pages.
Michael Pichler,"Interactive Browsing of 3D Scenes in Hypermedia: The Hyper-G 3D Viewer", Oct. 6, 1993, 118 pages.
Tim Berners-Lee,"The World Wide Web—past, present and future", Tim. Berners-Lee receives BCS Distinguished, Jul. 17, 1996, 11 pages.
Theodor Holm Nelson,"The World Wide Web History Project", Oct. 29, 1999, 11 pages, available at http://1997.webhistory.org/historyday/abstracts.html.
WWW-Talk and WWW-HTML Mail Archives, Apr. 18, 2003, 1 page, available at http://ksi.cpsc.ucalgary.ca/archives/ WWW-TALK/archives.html.
Index of/archives/WWW-TALK, Apr. 18, 2003, 2 pages, available at http://ksi.cpsc.ucalgary.ca/archives/WWW-TALK/.
WWW Talk 1991 Archives: WorldWideWeb mailing list: Introduction, Messages from Mon, Oct. 28, 1991 to Fri, Dec. 13, 1991, 1 page, available at http://ksi.cpsc.ucalgary.ca/archives/WWW-TALK/www-talk-1991.messages/1.html.
WWW-Talk Apr.-Jun. 1993 Archives: Re. Standardizing new HTML features, Messages from Wed, Mar. 31, 1993 to Wed, Jun. 30, 1993, 1 page, available at http://ksi.cpsc.ucalgary.ca/WWW-TALK/www-talk-1993q2.messages/182.html.
WWW-Talk Apr.-Jun. 1993 Archives: Re. Standardizing new HTML features, Messages from Wed, Mar. 31, 1993 to Wed, Jun. 30, 1993, 2 pages, available at http://ksi.cpsc.ucalgary.ca/WWW-TALK/www-talk-1993q2.messages/196.html.
WWW-Talk Apr.-Jun. 1993 Archives: Re. Keeping HTML Simple & Format negotiation, Messages from Wed, Mar. 31, 1993 to Wed, Jun. 30, 1993, 3 pages, available at http://ksi.cpsc.ucalgary.ca/WWW-TALK/www-talk-1993q2.messages/392.html.
WWW-Talk Apr.-Jun. 1993 Archives: Re. Keeping HTML Simple & Format negotiation between Browser & Server, Messages from Wed, Mar. 31, 1993 to Wed, Jun. 30, 1993, 2 pages, available at http://ksi.cpsc.ucalgary.ca/WWW-TALK/www-talk-1993q2.messages/400.html.
WWW-Talk Apr.-Jun. 1993 Archives: Re. More than just HTML (was Re: Poetry and Maths), Messages from Wed, Mar. 31, 1993 to Wed, Jun. 30, 1993, 2 pages, available at http://ksi.cpsc.ucalgary.ca/WWW-TALK/www-talk-1993q2.messages/390.html.
WWW Talk Apr.-Jun. 1993 Archives: launching executables through HTML files), Messages from Wed, Mar. 31, 1993 to Wed, Jun. 30, 1993, 21 pages, available at http://ksi.cpsc.ucalgary.ca/WWW-TALK/www-talk-1993q2.messages/571.html.
WWW-Talk Apr.-Jun. 1993 Archives: Re. Keeping HTML Simple & Format negotiation between Browser & Server, Messages from Wed, Mar. 31, 1993 to Wed, Jun. 30, 1993, 2 pages, available at http://ksi.cpsc.ucalgary.ca/WWW-TALK/www-talk-1993q2.messages/420.html.
WWW-Talk Apr.-Jun. 1993 Archives: Re. launching executables through HTML files), Messages from Wed, Mar. 31, 1993 to Wed, Jun. 30, 1993, 1 page, available at http://ksi.cpsc.ucalgary.ca/WWW-TALK/www-talk-1993q2.messages/572.html.
WWW-Talk Apr.-Jun. 1993 Archives: Re. link areas within images, Messages from Wed, Mar. 31, 1993 to Wed, Jun. 30, 1993, 1 page, available at http://ksi.cpsc.ucalgary.ca/WWW-TALK/www-talk-1993q2.messages/586.html.
WWW-Talk Apr.-Jun. 1993 Archives: Re. Xmosaic and Xv, Messages from Wed, Mar. 31, 1993 to Wed, Jun. 30, 1993, 1 page, available at http://ksi.cpsc.ucalgary.ca/WWW-TALK/www-talk-1993q2.messages/653.html.
WWW-Talk Jul.-Oct. 1993 Archives: Submitting input-form data to server, Messages from Wed, Jun. 30, 1993 to Thu, Sep. 30, 1993, 3 pages, available at http://ksi.cpsc.ucalgary.ca/WWW-TALK/www-talk-1993q3.messages/808.html.
WWW-Talk Oct. 1993-present: Re: Generalising inclined images, Messages from Thu, Sep. 30, 1993 to Fri, Dec. 31, 1993, 2 pages, available at http://ksi.cpsc.ucalgary.ca/WWW-TALK/www-talk-1993q3.messages/78.html.
WWW-Talk Oct. 1993-present: Re: Generalising inclined images, Messages from Thu, Sep. 30, 1993 to Fri, Dec. 31, 1993, 1 page, available at http://ksi.cpsc.ucalgary.ca/WWW-TALK/www-talk-1993q3.messages/88.html.
WWW-Talk Oct. 1993-present: Re: Generalising inclined images, Messages from Thu, Sep. 30, 1993 to Fri, Dec. 31, 1993, 1 page, available at http://ksi.cpsc.ucalgary.ca/WWW-TALK/www-talk-1993q3.messages/89.html.
WWW-Talk Oct. 1993-present: Re: image/*, audio/*, etc.?, Messages from Thu, Sep. 30, 1993 to Fri, Dec. 31, 1993, 2 pages, available at http://ksi.cpsc.ucalgary.ca/WWW-TALK/www-talk-1993q3.messages/95.html.
WWW-Talk Oct. 1993-present:Re: Generalising inclined images, Messages from Thu, Sep. 30, 1993 to Fri, Dec. 31, 1993, 1 page, available at http://ksi.cpsc.ucalgary.ca/WWW-TALK/www-talk-1993q3.messages/96.html.
WWW-Talk Oct. 1993-present:Re: Generalising inclined images, Messages from Thu, Sep. 30, 1993 to Fri, Dec. 31, 1993, 2 pages, available at http://ksi.cpsc.ucalgary.ca/WWW-TALK/www-talk-1993q3.messages/106.html.
WWW-Talk Oct. 1993-present Archives, Messages from Thu to Sep. 30, 1993 to Fri, Dec. 31, 1993, 1 page, Available at http://ksi.cpsc.ucalgary.ca/WWW-TALK/www-talk-1993q3.messages/198.html.
WWW-Talk Jul.-Sep. 1995 Archives, Messages from Jul. 1995 to Sep. 1995, Aug. 21, 1995, 1 page, Available at http://1997.webhistory.org/www.lists/www-talk.1995q3/0441.html.
WWW-Talk Jul.-Sep. 1995 Archives, Messages from Jul. 1995 to Sep. 1995, Mon, Aug. 21, 1995, 1 page, Available at http://1997.webhistory.org/www.lists/www-talk.1995q3/0419.html.
WWW-Talk Jul.-Sep. 1995 Archives, Messages from Jul. 1995 to Sep. 1995, Aug. 21, 1995, 1 page, Available at http://1997.webhistory.org/www.lists/www-talk.1995q3/0441.html.
Keith Andrews,"Soaring through hyperspace: A snapshot of Hyper-G and its Harmony client", in Proc. of Eurographics. Symposium and Workshop on Multimedia: Multimedia/Hypermedia in Open Distributed Environments, Graz, Austria, Jun. 1994, 10 pages.
Keith Andrews,"The Hyper-G Network Information System", Journal of Universal Computer Science, vol. 1, No. 4 (1995), 206-220, submitted: Aug. 13, 1994, accepted: Mar. 10, 1994, appeared: Apr. 28, 1995, ©Springer Pub. Co., 15 pages.
Nenad Marovac,"Hypernet: A Tool to Choreograph Worldwide Distributed Hypermedia Documents", Printed in Great Britain, 1992 Pergamon press Ltd, Comput. & Graphics vol. 16, No. 2, pp. 197-202, 6 pages.
Anja Haake,"The Individualized Electronic Newspaper: an example of an active publication", Electronic Publishing, vol. 7(2), 89-111 (Jun.), 1994 John Wiley & Sons, Ltd, Sep. 2, 1993,23 pages.
M. Cecelia Buchanan,"Specifying Temporal Behavior in Hypermedia Documents", 1992 ACM portal, Milano, Nov. 30-Dec. 4, 1992, 10 pages.
Jin-Kun Lin,"A Multimedia and Multisource Document Editor of an Open Architecture", 1992 ACM portal, SIGDOC '92, 6 pages.
Eric Thomas,"LISTSERV for the non-technical user", Sep. 18, 1993, 29 pages.
Kevin Hughes,"Entering the World-Wide A Guide to Cyberspace", Oct. 1993, 17 pages.

Horace H.S. Ip, "A Hyperdocument Architecture for Cardiac Catheterisation Documents", Downloaded on Mar. 19, 2010 at 13:40:09 EDT from IEEE Xplore, 6 pages.
"About the Xerox PARC Map Viewer", Xerox Palo Alto Research Center, Mar. 14, 1997, 1 page.
Christopher J.Dede,"Evolving from Multimedia to Visual Reality", Supplied by the British library world of knowledge, Apr. 8, 2010, 8 pages.
Andrew J. Hanson,"Interactive Methods for Visualizable Geometry", Downloaded on Apr. 19, 2010 at 17:45:27 UTC from IEEE Xplore, Jul. 1994, 11 pages.
"Marc Andreessen: Biography from Answers.com", Mar. 1, 2010, 8 pages, Available at http://www.answers.com/topic/marc-andreessen.
"Mosai—The First Global Web Browser", Mar. 10, 2010,3 pages, Available at http://www.livinginternet.com/w/wi_mosaic.html.
Marc Andreessen,"NCSA Mosaic Technical Summary", NCSA Mosaic Technical Summary, Feb. 20, 1993, 3 pages.
Marc Andreessen,"NCSA Mosaic Technical Summary", NCSA Mosaic Technical Summary 2.1, Revision 2.1 May 8, 1993, 5 pages.
Marc Andreessen,"NCSA Mosaic: A Global Hypermedia System", Journal: Internet Research, Year: 1994 vol. 4 Issue: 1 pp. 7-17, Publisher: MCB UP Ltd, ISSN: 1066-2243, 2 Pages.
T Srikanthan,"Multi-Media Network Mailing System", Downloaded on Mar. 19, 2010 at 13:41:57 EDT from IEEE Xplore,5 pages.
Pei-Yuan Wei,"Pei's Home Page", Mar. 10, 2010, 2 pages.
"Viola Web Browser", Mar. 10, 2010,3 pages, Available at http://www.viola.org/.
"ViolaWWW Features List",Mar. 10, 2010,1 page.
"Viola in a Nutshell The Viola World Wide Web Toolkit", Mar. 10, 2010,47 pages,Available at http://www.viola.org/viola/book/preface.html.
"Viola Press Mentions",Mar. 10, 2010,2 pages.
Pei E Wei, A Brief Overview of the VIOLA Engine, and its Applications, Aug. 16, 1994, P.Y. Wei, O'Reilly & Associates, Inc., http://www.viola.org/viola/violaIntro.html, 13 pages.
Pei E Wei, WWW Browsers: Extensibility Issues, Sep. 20-21, 1994, Pei Wei, O'Reilly & Associates, www-pcd. stanford.edu/workshop/abstracts/wei.html, 13 pages.
The Global Network Navigator, Aug. 1993, O'Reilly & Associates, http://oreilly.com/25 anniversary/gnn.html, 1 page.
Lavenant, M.G. and Kruper, J.A., The Phoenix Project: Distributed Hypermedia Authoring, First International WWW Conference, Geneva, 1994, http://www.cern.ch/PapersWWW94/j-kruper.ps, 6 pages.
Ethan Vincent Munson, Proteus: Software An Adaptable Presentation System for a Development and Multimedia Document Environment, Sep. 1994, http://www.eecs.berkeley.edu/Pubs/TechRpts/1994/5842.html, 116 pages.
Michael Lang, Survey of Hypermedia Studies [in Japanese], Journal of Information Processing Society of Japan, 2010 National Institute of Informatics. All, 2 pages.
H. Maurer, The A.E.I.O.U. Hypermedia Project, May 25, 1994, IEEE Xplore, 4 pages.
Mfirio J. Silva and Randy H. Katz, The Case for Design using the World Wide Web, Oct. 1994, UC Berkeley Technical Report number UCB/CSD-94-837, 25 pages.
Prasanth Duvvur, State of the Art Survey of Innovative Tools and Techniques, Managing Data on the World Wide Web, Sep. 1995, 102 pages.
T. Berners-Lee, Information Management: A Proposal, CERN, Mar. 1989, 14 pages.
T.J. Berners-Lee, R. Cailliau, J.-F. Groff, B. Pollermann, World-Wide Web: An Information Infrastructure for High-Energy Physics, Geneva, 1992, CERN Document Server, World Scientific, Singapore, ed. D Perret-Gallix, 9 pages.
Tim Berners-Lee, Jean-Franqois Groff, Robert Cailliau, Universal Document Identifiers on the Network, Geneva, 1992, file :info.cern.ch/pub/www/doct/udi I . ps, 11 pages.
Tim Berners-Lee, What W3 needs from WAIS and x.500, Geneva, 1991, file://info.cern.ch./pub/www/doc/ wais_x500_www.p, 3 pages.

Tim Berners-Lee, Cailliau, Groff, Pollermann, World-Wide Web: The Information Universe, Electronic Networks: Research, Applications and Policy, vol. 2, No. 1, Meckler Publishing, Geneva, 1992, 9 pages.
Tim Berners Lee, Hypertext Markup Language (HTML) Internet Draft IIIR Working Group, http ://www-w3. orgiMarkUp/ draft-ietf-iiir-html-01 .txt, Jun. 1993, 40 pages.
Tim Berners-Lee, The World-Wide Web Initiative, Geneva, 1993, 7 pages.
Tim Berners-Lee, Uniform Resource Locators: A unifying syntax for the expression of names and addresses of objects on the network, Geneva, Jan. 1994, 18 pages.
Tim Berners-Lee, Universal Resource Identifiers in WWW: A Unifying Syntax for the Expression of Names and Addresses of Objects on the Network as used in the World-Wide Web, http://www.w3, org/Addres sing/ft 1630.txt, Jun. 1994.
Berners-Lee, Masinter & McCahill, Uniform Resource Locators (URL), CERN, Dec. 1994, 25 Pages.
Tim Berners Lee, World-Wide Web Bibliography, http ://www-w3. org/History/19921103 hypertext/hypertext/WWW/ Bibliography, html, 3 pages.
R. Cailliau, Computer Networks and ISDM System, The International Journal of Computer and Telecommunications Networking, Geneva, 1994, 3 pages.
Andrea O. Leone and Antonio Ticca, Towards a user environment integrating hypermedia browsers, scientific visualization programs and numerical simulation programs, Proceeding AVI, new York, 1994, 3 pages.
Tutorial: The OOGL Geom File Formats, Jan. 1994, www.geomview.org/docs/oogItour.html, 10 pages.
Randy Pausch, Nathaniel R. Young II, and Robert DeLine, SUIT: The Pascal of User Interface Toolkits, Proceeding UIST, New York, Nov. 1991, 9 pages.
Takashi Ohtsu and Michael A. Harrison, User Interface Management System Embedded in a Multimedia Document Editor Framework, United States, Oct. 1993, 16 pages.
T. Munzner, P. Burchard, and E. H. Chi. Visualization through the World Wide Web with Geomview, Cyberview, W3Kit, and WebOOGL, World Wide Web Fall 1994 Conference, Chicago IL, Oct. 1994, 2 pages.
Paul Burchard, W3Kit 2.2, http ://www. geom.uiuc, edu/admin/mail/webmaster, Apr. 18, 1994, 2 pages.
Paul Burchard, A Tour through the Standard W3Kit Main Routine, Apr. 1994, 2 pages.
Paul Burchard, How W3Kit Works: A Conceptual Overview, Apr. 1994, 3 pages.
Paul Burchard, The Object-oriented GUI Framework of W3Kit, Apr. 1994, 2 pages.
James E. Pitkow & Krishna A. Bharat, WebViz: A Tool for WWW Access Log Analysis, 1994, 7 pages.
Daeron Meyer, ANNOUNCING: The Geometry Center's Interactive on line gallery, Feb. 1994, 2 pages.
William M. Perry, Release .3b of The WWW Browser for Emacs, http ://1997.webhistory. org/www.lists/www-talk. 1993q2/0256. html, May 1993, 3 pages.
Tony Johnson, Re: proposed new tag: IMG, Feb. 1993, http://1997.webhistory.org/www.lists/www-talk.1993q1/0183.html, 2 pages.
Pei Y. Wei, viola update (with latest W3 library), Jul., 1992, http://1997.webhistory.org/www.lists/www-talk.1991/0001. html 1 page.
Tim Berners-Lee, WorldWideWeb mailing list: Introduction, Oct. 1991, http://1997.webhistory.org/www.lists/www-talk.1991/0001.html 1 page.
Tony Johnson, MidasWWW—Motif based WWW browser now available, Nov. 1992, http://1997.webhistory.org/ www.lists/www-talk.1992/0296.html, 1 page.
Dave Raggett, Tables and HTML, May 1993, http://1997.webhistory.org/www.lists/www-talk.1993q2/0271.html, 1 page.
Marc Andreessen, NCSA X Mosaic 0.5 released, Jan. 1993, http://1997.webhistory.org/www.lists/www-talk.1993q1/0099.html, 2 pages.
Marc Andreessen, NCSA X Mosaic 0.5 released, Jun. 1993, http://1997.webhistory.org/www.lists/www-talk.1993q2/0012.html, 3 pages.

Marc Andreessen, NCSA Mosaic for X 2.0 prerelease 5 available, Oct. 1993.
Marc Andreessen, NCSA Mosaic for X 2.0 available, Nov. 1993, http://1997.webhistory.org/www.lists/www-talk.1993q4/0447.html, 8 pages.
NCSA Collage( Manual), Macintosh group of the Software Development Group at the National Center for Supercomputing Application, Oct. 1992, 76 pages.
NCSA Mosaic for the X Window SystemUser's Guide Version 2.1, Jul. 1994, National Center for Supercomputing Applications, University of Illinois, 62 pages.
Marc Andreessen, NCSA Mosaic Technical Summary, May 1993, 5 pages.
NCSA Data Transfer Mechanism Programming Manual, National Center for Supercomputing Applications University of Illinois at Urbana-Champaign, Feb. 1992, 68 pages.
FAQ— Frequently Asked Questions about HDF, Dec. 1993, 11 pages.
NCSA Poly View for the Silicon Graphics TM 413 Series Workstation Version 2.0, Jul. 1991, 62 pages.
Tim Berners-Lee, Re: proposed new tag: IMG, Feb. 1993, http://1997.webhistory.org/www.lists/www-talk.1993q1/0186.html, 1 page.
Jim Davis, Re: proposed new tag: IMG, http://1997.webhistory.org/www.lists/www-talk.1993q1/0188.html, Feb. 1993, 1 page.
Tim Berners-Lee, Re: proposed new tag: IMG, Feb. 1993, http://1997.webhistory.org/www.lists/www-talk.1993q1/0191.html, 2 pages.
288. Jay C. Weber, Re: proposed new tag: IMG, Feb. 1993, http://1997.webhistory.org/www.lists/www-talk.1993q1/0192.html, 1 page.
Jay C. Weber, Re: proposed new tag: IMG, Feb. 1993, http://1997.webhistory.org/www.lists/www-talk.1993q1/0198.html, 1 page.
Pei Y. Wei, Re: proposed new tag: IMG, Feb. 1993, http://1997.webhistory.org/www.lists/www-talk.1993q1/0201. html, 1 page.
Dave Raggett, Re: proposed new tag: IMG, Mar. 1993, http://1997.webhistory.org/www.lists/www-talk.1993q1/0204. html, 1 page.
Marc Andreessen , : proposed new tag: IMG, Mar. 1993, http://1997.webhistory.org/www.lists/www-talk.1993q1/0209.html, 1 page.
Bill Janssen, Re: proposed new tag: IMG, Mar. 1993, http://1997.webhistory.org/www.lists/www-talk.1993q1/0217. html, 1 page.
Tim Berners-Lee, Re: proposed new tag: IMG, Mar. 1993, http://1997.webhistory.org/www.lists/www-talk.1993q1/0221.html, 1 page.
Marc Andreessen , Re: proposed new tag: IMG, Mar. 1993, http://1997.webhistory.org/www.lists/www-talk.1993q1/0257.html, 2 pages.
Guido van Rossum, Re: proposed new tag: IMG, Mar. 1993, http://1997.webhistory.org/www.lists/www-talk.1993q1/0259.html, 1 page.
WWW-Talk Jul.-Sep. 1995 Archives, Messages from Jul. 1995 to Sep. 1995, Aug. 21, 1995, 1 page, Available at http://1997.webhistory.org/www.lists/www-talk.1995q3/0445.html.
WWW-Talk Jul.-Sep. 1995 Archives, Messages from Jul. 1995 to Sep. 1995, Aug. 21, 1995, 1 page, Available at http://www.intercom.co.cr/www-archives/1995-q3/0446.html.
WWW-Talk Jul.-Sep. 1995 Archives, Messages from Jul. 1995 to Sep. 1995, Mon, Aug. 21, 1995, 1 page, Available at http://www.intercom.co.cr/www-archives/1995-q3/0454.html.
WWW-Talk Jul.-Sep. 1995 Archives, Messages from Jul. 1995 to Sep. 1995, Mon, Aug. 21, 1995, 1 page, Available at http://www.intercom.co.cr/www-archives/1995-q3/0458.html.
WWW-Talk Jul.-Sep. 1995 Archives, Messages from Jul. 1995 to Sep. 1995, Mon, Aug. 21, 1995, 4 pages, Available at http://www.intercom.co.cr/www-archives/1995-q3/0419.html.
WWW-Talk Jul.-Sep. 1995 Archives, Messages from Jul. 1995 to Sep. 1995, Mon, Aug. 22, 1995, 1 page, Available at http://www.intercom.co.cr/www-archives/1995-q3/0472.html.
WWW-Talk Jul.-Sep. 1995 Archives, Messages from Jul. 1995 to Sep. 1995, Aug. 29, 1995,1 page,Available at http://www.intercom.co.cr/www-archives/1995-q3/0509.html.
WWW-Talk Jul.-Sep. 1995 Archives, Messages from Jul. 1995 to Sep. 1995, Mon, Sep. 18, 1995, 1 page, Available at http://www.intercom.co.cr/www-archives/1995-q3/0571.html.
WWW Talk Oct. 1993-present Archives, Messages from Sep. 30, 1993 to Dec. 31, 1993, 4 pages, Available at http://ksi.cpsc.ucalgary.ca/archives/WWW-TALK/www-talk-1993q4.messages/821.html.
"Introducing NCSA Mosaic", National Center for Supercomputing Applications, Dec. 1993, 2 pages.
Kraig Brockschmidt,"OLE Controls /COM Objects for the Internet", Microsoft Corporation, 41 pages.
David C, Martin, "Integrated Control of Distributed Volume virtualization Through the world-wide web", UCSF Library, Oct. 13, 1994, 8 pages.
"Proceedings of the IEEE Visualization '94 Conference", 1994, Institute of Electrical and Electronics Engineers, 21 pages.
Cheong Sang , "Distributed Hypermedia object Embedding with Mosaic", Oct. 30, 1994, 3 pages.
WWW-VRML 1994 by thread Archives, Messages from Jun. 10, 1994 to Dec. 27, 1994, 18 pages, Available at http://www.intercom.co.cr/www-archives/vrml-1994/index.html.
WWW Talk Apr.-Jun. 1993 Archives, Messages from Mar. 31, 1993 to Jun. 30, 1993,1 page, Available at http://ksi.cpsc. ucalgary.ca/archives/WWW-TALK/www-talk-1993g2.messages/164.html.
WWW Talk Apr.-Jun. 1993 Archives, Messages from Mar. 1993 to Jun. 1993, 1 pages, Available at http://ksi.cpsc.ucalgary. ca/archives/WWW-TALK/www-talk-1993q2.messages/167.html.
WWW Talk Apr.-Jun. 1993 Archives, Messages from Mar. 1993 to Jun. 1993, 2 pages, Available at http://ksi.cpsc.ucalgary. ca/archives/WWW-TALK/www-talk-1993q2.messages/173.html.
WWW Talk Apr.-Jun. 1993 Archives, Messages from Mar. 1993 to Jun. 1993, 1 page, Available at http://ksi.cpsc.ucalgary. ca/archives/WWW-TALK/www-talk-1993q2.messages/176.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/198.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/199.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/200.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/201.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/202.html.
WWW Talk Apr.-Jun. 1993 Archives, Messages from Mar. 1993 to Jun. 1993, 1 page, Available at http://ksi.cpsc.ucalgary. ca/archives/WWW-TALK/www-talk-1993q2.messages/204.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/379.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/572.html.
WWW Talk Apr.-Jun. 1993 Archives, Messages from Mar. 1993 to Jun. 1993,2 page, Available at http://ksi.cpsc.ucalgary. ca/archives/WWW-TALK/www-talk-1993q2.messages/573.html.
WWW Talk Apr.-Jun. 1993 Archives, Messages from Mar. 1993 to Jun. 1993,2 pages, Available at http://ksi.cpsc.ucalgary. ca/archives/WWW-TALK/www-talk-1993q2.messages/574.html.
WWW Talk Apr.-Jun. 1993 Archives, Messages from Mar. 1993 to Jun. 1993,2 pages, Available at http://ksi.cpsc.ucalgary. ca/archives/WWW-TALK/www-talk-1993q2.messages/653.html.
WWW Talk Apr.-Jun. 1993 Archives, Messages from Mar. 1993 to Jun. 1993,2 pages, Available at http://ksi.cpsc.ucalgary. ca/archives/WWW-TALK/www-talk-1993q2.messages/655.html.
WWW Talk Apr.-Jun. 1993 Archives, Messages from Mar. 1993 to Jun. 1993,1 page, Available at http://ksi.cpsc.ucalgary. ca/archives/WWW-TALK/www-talk-1993q2.messages/599.html.

WWW Talk Apr.-Jun. 1993 Archives, Messages from Mar. 1993 to Jun. 1993,2 pages, Available at http://ksi.cpsc.ucalgary. ca/archives/WWW-TALK/www-talk-1993q2.messages/654.html.
WWW Talk Apr.-Jun. 1993 Archives, Messages from Mar. 1993 to Jun. 1993,1 page,Available at http://ksi.cpsc.ucalgary.ca/ archives/WWW-TALK/www-talk-1993q2.messages/656.html.
WWW Talk Apr.-Jun. 1993 Archives, Messages from Mar. 1993 to Jun. 1993,2 pages,Available at http://ksi.cpsc.ucalgary. ca/archives/WWW-TALK/www-talk-1993q2.messages/660.html.
WWW Talk Apr.-Jun. 1993 Archives, Messages from Mar. 1993 to Jun. 1993,1 page,Available at http://ksi.cpsc.ucalgary. ca/archives/WWW-TALK/www-talk-1993q2.messages/686.html.
Robert Cailliau, "A Little History of the Worldwide Web", W3C, Jan. 27, 1998, 5 pages.
Bayard E. Wynn,"Lean Management, Group Support Systems, And Hypermedia A Combination Whose Time Has Come",IEEE, 1993,10 pages.
Wilfred J. Hansen D,"Andrew as a Multiparadigm Environment for Visual Languages", IEEE, 1993, 5 pages.
Wilfred J. Hansen D,"Enhancing documents with embedded programs: How Ness Extends inserts in the Andrew Tool kit", 1990 IEEE,10 pages.
"Information Disclosure Statement for Related Litigation", U.S. Reexamination Control No: 90/006/831, Dec. 30, 2003.
"Offoce Action in Ex Parte Reexamination", Information disclosure statement, U.S. Reexamination Control No: 90/006/831, Feb. 26, 2004, 15 pages.
"Ex Parte Reexamination Interview Summary", U.S. Reexamination Control No. 90/006/831, Apr. 27, 2004, 43 pages.
"Interview Summary", U.S. Reexamination Control No. 90/006/831, Apr. 27, 2004, 43 pages.
"Submission Under 37 CFR §1.565(a)", U.S. Reexamination Control No. 90/006/831, Apr. 8, 2005, 32 pages.
Michael D. Doyle, "Patent Reexamination, Interview with Examiner St. John Courtenay III", Aug. 18, 2005, 36 pages.
Interview Summary, U.S. Reexamination Control No. 90/006/831, Sep. 15, 2005, 3 pages.
"Bibliographic Data Sheet", U.S. Appl. No. 90/006,831, Aug. 30, 2005, 1 page.
Search Notes, U.S. Reexamination Control No. 90/006/831, Aug. 25, 2008, 4 pages.
"Notice of Intent to Issue Ex Parte Reexamination Certificate ",U.S. Reexamination Control No. 90/006/83, Sep. 27, 2005, 77 pages.
"Notice of Intent to Issue supplemental Ex Parte Reexamination Certificate", U.S. Reexamination Control No. 90/006/831, Jan. 20, 2006, 75 pages.
"Communication from USPTO", U.S. Reexamination Control No. 90/006/831, Feb. 9, 2006, 6 pages.
"Request for Ex Parte Reexamination", Reexamination of U.S. Patent No. 5,838,906, Dec. 22, 2005, 43 pages.
"Notice of Concurrent Proceeding", Expartes Reexam Control No. 90/007,858, Reexamination filed Dec. 22, 2005, 1 page.
"Patent Assignment Abstract of Title", U.S. Patent No. 5838906, Issue date Nov. 17, 1998, Search result date Dec. 28, 2005, 1 page.
"Notice of Assignment of Reexamination Request", Reexamination Control No. 90/007,858, Dec. 29, 2005 1 page.
"*EOLAS technologies inc.* V. *Microsoft Corp*", United States Court of Appeals, Federal Circuit, Mar. 2, 2005, 17 Pages.
"HTML + DTD",WWW Talk Apr.-Jun 1993 Archives, Messages from Mar. 1993 to Jun. 93, Jun. 2, 1993, 1 page, Available at http://ksi.cpsc.ucalgary.ca/archives/WWW-TALK/www-talk-1993q2. messages/428.html.
"HTML+ support for eqn & Postscript", WWW Talk Apr.-Jun. 1993 Archives, Messages from Mar. 1993 to Jun. 1993, Jun. 14, 1993, 2 pages, Available at http://ksi.cpsc.ucalgary.ca/archives/WWW-TALK/www-talk-1993q2.messages/467.html.
"HTML+ support for eqn & Postscript", WWW Talk Apr.-Jun. 1993 Archives, Messages from Mar. 1993 to Jun. 1993, Jun. 14, 1993, 2 pages., Available at http://ksi.cpsc.ucalgary.ca/archives/WWW-TALK/www-talk-1993q2.messages/467. html.
"HTML+ support for eqn & Postscript", WWW Talk Apr.-Jun. 1993 Archives, Messages from Mar. 1993 to Jun. 1993, Jun. 15, 1993, 2 pp., Available at http://ksi.cpsc.ucalgary.ca/archives/WWW-TALK/www-talk-1993q2.messages/564. html.
"HTML+ and browser functionality", WWW Talk Apr.-Jun. 1993 Archives, Messages from Mar. 1993 to Jun. 1993,2 pages, Available at http://ksi.cpsc.ucalgary.ca/archives/WWW-TALK/www-talk-1993q2.messages/668.html.
"Re: HTML+ and browser functionality", WWW Talk Apr.-Jun. 1993 Archives, Messages from Mar. 1993 to Jun. 1993,1.page, Available at http://ksi.cpsc.ucalgary.ca/archives/WWW-TALK/www-talk-1993q2.messages/679.html.
David Ragett,"HTML+ (Hypertext markup language)", "A proposed standard for a light weight presentation independent delivery format for browsing and querying information across the Internet", Hewlett Packard, Jul. 23, 1993, 34 pages.
"HTML+ spec now available in other formats", WWW Talk Jul.-Oct. 1993 Archives, Messages from Jun. 1993 to Sep. 1993, 1 page, Available at http://ksi.cpsc.ucalgary.ca/archives/WWW-TALK/www-talk-1993q3.messages/290.html.
"Re: HTML+ support for eqn & Postscript", WWW Talk Apr.-Jun. 1993 Archives, Messages from Mar. 1993 to Jun. 1993,1 page, Available at http://ksi.cpsc.ucalgary.ca/archives/WWW-TALK/www-talk-1993q2.messages/482.html.
"Re: HTML+ and browser functionality", WWW Talk Apr.-Jun. 1993 Archives, Messages from Mar. 1993 to Jun. 19 93,1 page, Available at http://ksi.cpsc.ucalgary.ca/archives/WWW-TALK/www-talk-1993q2.messages/672.html.
"New release of WWW Browser for emacs (.007beta)", WWW Talk Apr.-Jun 1993 Archives, Messages from Mar. 1993 to Jun. 1993,2 pages ,Available at http://ksi.cpsc.ucalgary.ca/archives/WWW-TALK/www-talk-1993q2.messages/18.html.
William M. Perry, "Enhancements for Lucid Emacs", 1993, 12 pages.
William M. Perry, "Variable definitions for W3", 1993, 24 pages.
Message form Willam M. Perry, To alt.Lucid-Emcas.help newsgroup, May 28 1994, 1 page.
Message form Jeff Sparkes, To alt.Lucid-Emcas.help newsgroup, May 31, 1994, 1 page.
Message form Chuck Thompson, To alt.Lucid-Emcas.help newsgroup, Jun. 3, 1994, 1 page.
Jamie Zawinski, "Emacs Timeline", Mar. 8, 1999, 3 pages.
"New Version of the Emacs Browser for W3 (.04b)", WWW-Talk Apr.-Jun. 1993 by thread, Messages from Apr. 1, 1993 to Jun. 30, 1993, 2 pages, available at http://1997.webhistory.org/www.lists/www-talk.1993q2/0062.html.
"New Version of WWW Browser for Emacs", WWW-Talk Apr.-Jun. 1993 by thread, Messages from Thu Apr. 1, 1993 to Wed Jun. 30, 1993, 1 page, available at http://1997.webhistory.org/www.lists/www-talk.1993q2/0564.html.
Arsi Vaziri,"Scientific visualization network in high-speed environments", Computer Networks and ISDN Systems Journal, vol. 22, Issue 2, Sep. 1991, Elsevier Science Publisher B.V. pp. 111-129.
John Cullen,"The use of FTAM to access graphical pictures across wide area network", Computer Networks and ISDN Systems 25 (1992), pp. 377-383.
Y. Z. Lashkari, "PLX: A Proposal To Implement A General Broadcasting Facility In A Distributed Environment Running X Windows" Computer & Graphics, 1992, vol. 16, No. 2, pp. 143-149.
Thomas Kirste,"Spacepicture—An Interactive Hypermedia Satellite Image Archival System", Computer & Graphics, 1993, vol. 17, No. 3, pp. 251-260.
G. Coulsbn,"Extensions to ANSA for multimedia computing" Computer Networks and ISDN Systems, vol. 25, 1992, pp. 305-323.
Duong Le Huynh,"PIX: An Object-Oriented Network Graphics Environment", Computer & Graphics, 1993, vol. 17, No. 3, pp. 251-260.
T.J. Berners-Lee,"The world-wide web", Computer Networks and ISDN Systems, vol. 25, 1992, pp. 454-459.
Terrence Crowley,"MMConf: An Infrastructure for Building Shared Multimedia Applications", CSCW 90 Proceedings, ACM conference on Computer-supported cooperative work, Oct. 1990, p. 329-342 pages.

Masayuki Tani, "Object-Oriented Video: Interaction With Real-World Objects Through Live Video", CHI '92 Proceedings, ACM SIGCHI conference on Human factors in computing systems, May 1992, pp. 593-598.

Hugh Davis, "Towards an Integrated Information Environment with Open Hypermedia Systems", ECHT '92 Proceedings, ACM conference on Hypertext, Nov. 30-Dec. 4, 1992, pp. 181-190.

Hugh Davis, "Microcosm: An open hypermedia system", ACM, Apr. 24-29, 1993, 1 page.

Tim Berner s-Lee, "Hypertext Markup Language (HTML)", Jun. 1993, 49 pages.

Patrick J. Moran, "Tele-Nicer-Slicer-Dicer: A New Tool for the Visualization of Large Volumetric Data", NCSA Technical Report, Nov. 17, 1998, 7 pages.

Douglas E. Shaekelford, "The Architecture and Implementation of a Distributed Hypermedia Storage System", HYPERTEXT '93, Proceedings of the fifth ACM conference on Hypertext, ACM Portal, Nov. 1993, 13 pages.

"Cello WWW Browser Release 1.01", Mar. 16, 1994, 8 pages.

John Rizzo, What's Open Doc, Mac User Magazine, Apr. 1994, 3 pages.

Don Labriola, "White Board Software, Remote Possibilities", PC Magazine, Jun. 14, 1994, 6 pages.

Fabrizio Massimo Ferrara, "The KIM Query System", An Iconic Interface for the Unified Access to Distributed Multimedia Databases, SIGCHI Bulletin, vol. 26, No. 3, Jul. 1994, 10 pages.

Ronald J. Vetter, "Mosaic and the World-Wide Web", Magazine Article, Oct. 1994, 9 pages.

"Object Linking and Embedding (OLE)", An Overview of Data Sharing Capabilities in Windows 3.1, Microsoft Corporation, 1992, 19 pages.

Kraig Brockschmidt, "OLE 2 Developer's Guide", May 10, 1993, 13 pages.

Tony Williams, "extensible Compound Document Architecture", Microsoft Corporation, Jul. 10, 1990, 36 pages.

"Extensible Application Protocols Object Linking and Embedding", Microsoft Corporation, Dec. 1, 1990, 71 pages.

"Information at Your Fingertips Backgrounder", Microsoft Corporation, Dec. 1990.

"Extensible Application Protocols Object linking and embedding", Beta Version, Microsoft Corporation, Apr. 8, 1991, 90 pages.

Barry MacKichan, "OLE 2.0 Strawman Spec", Microsoft Applications Division, May 7, 1991, 21 pages.

"OLE 2.0 Design Summary", Microsoft Corporation, Jul. 5, 1991, 44 pages.

"OLE 2.0 Architecture and Protocol Proposal", Microsoft Corporation, Jul. 9, 1991, 41 pages.

"Object linking and embedding OLE 2.0 Specification", Microsoft Corporation, Apr. 15, 1993, 312 pages.

"Windows Objects: Object Linking & Embedding 2.0 Developers Conference", Microsoft Corporation, May 3-5, 1993, 245 pages.

"Previews Applications Using Object Technology for Windows", Microsoft OLE 2.0 Developers Conference, Microsoft News Release, May 3, 1993, 6 pages.

"Sample Code", "Windows Objects : Object Linking & Embedding 2.0" Developers Conference", Microsoft Corporation, May 3-5, 1993, 173 pages.

Dave Seres, "Path to the Future of Windows", Windows Summit, Microsoft Corporation, May 1993, 13 pages.

"Systems Strategy", OLE 2.0 Developers Conference, Microsoft Corporation, May 1993, 850 pages.

Article by Stuart J. Johnston, Developers get hands on complex but vital OLE 2.0, Published in INFO WORLD Magazine, vol. 15, Issue 19, May 10, 1993, 3 pages.

Tim McCaffrey, Microsoft OLE 2.0 Developers Conference, Microsoft Corporation, Aug. 6, 1993, 1 page.

"Visual Editing: In-Place Activation and In-Place Containers", Aug. 19, 1993, 73 pages.

"OLE 2.0 Implementation Seminar", Microsoft OLE 2.0 Developers Conference, Aug. 1993, 306 pages.

"Microsoft OLE Today and Tomorrow Technology Overview", Microsoft Corporation, Dec. 1993, 11 pages.

"Microsoft OLE Controls—Preliminary Specification and Overview", Microsoft Corporation, Jan. 1994, 18 pages.

Tammy Steele, "Microsoft Developers Network News", Microsoft Corporation, vol. 3, No. 2, Mar. 1994, 16 pages.

"The Power of OLE", Microsoft Object Strategy, Feb. 3, 1994, 26 pages.

"Microsoft Multimedia Viewer : Getting Started", Microsoft Corporation, Version 2.0, 1993, 37 pages.

"Microsoft Multimedia Viewer : Authoring Guide", Microsoft Corporation, Version 2.0, 1993, 241 pages.

"Microsoft Multimedia Viewer : Technical Reference", Microsoft Corporation, Version 2.0, 1993, 229 pages.

"Microsoft Provides the Latest Technology and Information to Develop OLE 2.0 Applications", Microsoft News Release, Feb. 9, 1993, 5 pages.

"Developers Prepare for Chicago at Largest Windows Conference Ever", Dec. 14, 1993, 7 pages.

"Microsoft Windows at Deadline", Feb. 15, 1994, 4 pages.

"Microsoft and Shiva to Provide Remote Networking Capabilities in Windows Chicago", Apr. 19, 1994, Microsoft Corporation, 3 pages.

"Microsoft Releases Windows NT Server 3.5, Windows NT Workstation 3.5 to Manufacturing", Microsoft Corporation, Sep. 13, 1994, 6 pages.

Get Up to Speed on Windows, "The International Developers Conference for Windows", Oct. 1993, 12 pages.

"Microsoft WIN32 Professional Developers Conference", Dec. 1993, 29 pages.

Kraig Brockschmidt, "A Primer on Designing Custom Controls", Microsoft System S Journal, Mar.-Apr. 1992, 14 pages.

"Object Linking and Embedding Background", Microsoft Corporation, Dec. 1990, 6 pages.

"Compound Documents Backgrounder", Microsoft Corporation, Dec. 1990, 5 pages.

Kraig Brockschmidt , "OLE Controls Architecture", Sep. 10, 1993, Rev. 2, 31 pages.

"Microsoft Will Blend System 7 OLE in Excel", Article in Infoworld, May 13, 1991, 1 page.

Kraig Brockschmidt, "Network DDE in Windows for Workgroups 3.1 Bridges Programs Between PCs", Microsoft Systems Journal Jan. 1993, 15 pages.

Jon Udell, "Visual Basic Custom Controls Meet OLE", Byte Magazine, Mar. 1994, 3 pages.

"OLE 2.0: Death to Monoliths?", Reviews Roundup, Byte Magazine , Mar. 1994, 1 page.

David E, "OLE Gains Without (Much) Pain", Datamation Magazine, Jun. 15, 1994, 2 pages.

Kevin Fogarty, "Microsoft OLE can be New Trojan horses", Network World Magazine, vol. 11, No. 26, Jun. 27, 1994, 1 page.

"Montage of the 1991 Vintage viola", 5 pages, 1991, available at http://www.viola.org/viola/vintage/montage.html.

WWW-TALK 1991 Archives, Messages from November to December, 1 page, Available at http://lists.w3.org/Archives/ Public/www-talk/1991NovDec/0023.html.

WWW-TALK 1992 Archives, Messages from Jan. to Feb., 3 pages, available at http://lists.w3.org/Archives/Public/www-talk/1992JanFeb/0002.html.

WWW-TALK 1991 Archives, Messages from Nov. to Dec., 1 page, Available at http://lists.w3.org/Archives/Public/www-talk/1991NovDec/0023.html.

WWW-TALK 1992 Archives, Messages from May to Jun., 1 page, Available at http://lists.w3.org/Archives/Public/www-talk/1992MayJun/0004.html.

WWW-TALK 1992 Archives, Messages from May to Jun., Re: World Wide Web and Viola, May 13, 1992, 1 page. Available at http://lists.w3.org/Archives/Public/www-talk/1992MayJun/0005.html.

WWW Talk Apr.-Jun. 1993 Archives: WWW Developer's Conference, Messages from Mar. 31, 1993 to Jun. 30, 1993, 2 pages. Available at http://ksi.cpsc.ucalgary.ca/archives/WWW-TALK/www-talk-1993q2.messages/570.html.

WWW Talk Apr.-Jun. 1993 Archives: WWW Developer's Conference, Messages from Mar. 31, 1993 to Jun. 30, 1993, 1 page. Available at http://ksi.cpsc.ucalgary.ca/archives/WWW-TALK/www-talk-1993q2.messages/603.html.

"WWW-Talk Jan.-Mar. 1994 by thread", Messages from Oct. 18, 1993 to Mar. 31, 1994, 3 pages. Available at http://www.intercom.co.cr/www-archives/1994-q1/0361.html.
WWW-Talk Jan.-Mar. 1994 by thread: ViolaWWW beta release is available, Messages from Oct. 18, 1993 to Mar. 31, 1994, 3 pages. Available at http://www.intercom.co.cr/www-archives/1994-q1/0722.html.
WWW-Talk Jan.-Mar. 1994 by thread, Messages from Oct. 18, 1993 to Mar. 31, 1994, 2 pages. Available at http://www.intercom.co.cr/www-archives/1994-q1/0716.html.
"Contributors to the Viola and Viola Www" Mar. 15, 1994, 1 p.. [PA00318341].
ViolaWWW Release, WWW-Talk Jan.-Mar. 1994 by thread, Messages from Oct. 18, 1993 to Mar. 31, 1994, 1 page. Available at http://www.intercom.co.cr/www-archives/1994-q1/1031.html.
Pei Y. Wei, WWW-Talk Jan.-Mar. 1994 by thread, Messages from Oct. 18, 1993 to Mar. 31, 1994, 1 page. Available at http://www.intercom.co.cr/www-archives/1994-q1/1069.html.
WWW-Talk Apr.-Jun. 1994 by thread, Messages from Apr. 1, 1994 to Jun. 30, 1994, 3 pages. Available at http://www.intercom.co.cr/www-archives/1994-q2/0183.html.
WWW-Talk Apr.-Jun. 1994 by thread, Messages from Apr. 1, 1994 to Jun. 30, 1994, 1 page. Available at http://www.intercom.co.cr/www-archives/1994-q2/0165.html.
Pei Y Wei, "A Brief Overview of the Viola Engine, and its Applications" O'Reilly & Associates, Inc., Aug. 16, 1994, 11 pages.
Pei Y Wei, "ViolaWWW Demo Documents", Viola Central , O'Reilly & Associates, Inc., Aug. 16, 1994, 17 pages.
WWW-VRML 1994 by thread, Messages from Jun. 10, 1994 to Dec. 27, 1994, 1 page. Available at http://1997.webhistory.org/www.lists/www-vrml.1994/0487.html.
WWW-VRML 1994 by thread, Messages from Jun. 10, 1994 to , 1 page. Available at http://1997.webhistory.org/www.lists/www-vrml.1994/0488.html.
WWW-VRML 1994 by thread, Messages from Michael D. Doyle, Aug. 31, 1994, 2 pages. Available at http://1997.webhistory.org/www.lists/www-vrml.1994/0489.html.
WWW-VRML 1994 by thread, Messages from Michael D. Doyle, Aug. 31, 1994, 2 pages. Available at http://1997.webhistory.org/www.lists/www-vrml.1994/0490.html.
WWW-VRML 1994 by thread, Messages from Michael D. Doyle, Sep. 1, 1994, 2 pages. Available at http://1997.webhistory.org/www.lists/www-vrml.1994/0493.html.
WWWW-VRML 1994 by thread, Messages from Pei Y. Wei, Sep. 1, 1994, 2 pages. Available at http://1997.webhistory.org/www.lists/www-vrml.1994/0492.html.
WWW-VRML 1994 by thread, Messages from Michael D. Doyle, Sep. 1, 1994, 1 page. Available at http://1997.webhistory.org/www.lists/www-vrml.1994/0496.html.
WWW-VRML 1994 by thread, Messages from Michael D. Doyle, Sep. 1, 1994, 2 pages. Available at http://1997.webhistory.org/www.lists/www-vrml.1994/0496.html.
Pei Wei, "WWW Browsers: Extensibility Issues", O'Reilly & Associates, Sep. 20-21, 1994, 12 pages.
"The Viola Home Page", Oct. 24, 1999, 32 pages available at http://www.viola.org/.
"Stanford WWW Workshop Schedule", Stanford Computer Forum , Sep. 20-21, 1994, 2 pages.
WWW-Talk Jan.-Mar 1995 by thread, Messages from Michael D. Doyle, Mar. 27, 1995, 2 pages. Available at http://1997.webhistory.org/www.lists/www-talk.1995q1/0711.html.
Pei Wei, "Welcome to ViolaWWW", ViolaWWW News Page, O'Reilly & Associates, Inc., 5 pages.
WWW-Talk Jan.-Mar. 1995 by thread, Messages from Pei Wei, Apr. 17, 1995, 2 pages. Available at http://1997.webhistory.org/www.lists/www-talk.1995q2/0128.html.
WWW-TALK@w3.org from Jul. to Aug. 1995 by date, Aug. 21, 1995, 2 pages. Available at http://lists.w3.org/Archives/Public/www-talk/1995JulAug/0429.html.
WWW-TALK@w3.org from Jul. to Aug. 1995 by date, Aug. 21, 1995, 2 pages. Available at http://lists.w3.org/Archives/Public/www-talk/1995JulAug/0435.html.
WWW-TALK@w3.org from Jul. to Aug. 1995 by date, Aug. 21, 1995, 2 pages. Available at http://lists.w3.org/Archives/Public/www-talk/1995JulAug/0446.html.
WWW-TALK@w3.org from Jul. to Aug. 1995 Archives, Message from Jul. to Aug,1 page, available at http://lists.w3.org/Archives/Public/www-talk/1995JulAug/0429.html.
WWW-TALK@w3.org from Jul. to Aug. 1995 Archives, Message from Jul. to Aug,1 page, available at http://lists.w3.org/Archives/Public/www-talk/1995JulAug/0430.html.
WWW-TALK@w3.org from Jul. to Aug. 1995 Archives, Message from Jul. to Aug,1 page, available at http://lists.w3.org/Archives/Public/www-talk/1995JulAug/0430.html.
WWW-TALK@w3.org from Jul. to Aug. 1995 Archives, Message from Jul. to Aug, 1 page, available at, http://lists.w3.org/Archives/Public/www-talk/1995JulAug/0432.html.
www-talk@w3.org from Jul. to Aug. 1995 Archives, Message from Jul. to Aug,1 page, available at, http://lists.w3.org/Archives/Public/www-talk/1995JulAug/0435.html.
WWW Talk Jan. 94-present Archives, Message from Jan.-Mar.,2 pages, available at http://ksi.cpsc.ucalgary.ca/archives/WWW-TALK/www-talk-1994q1.messages/357.html.
Pei-Yuan Wei, Support of In-Document Interactive .Objects in the Viola WWW Browser, Circa May 1993, Jan. 20, 1999,11 pages.
WWW-Talk Jan.-Mar 1995 Archives, Message from Jun. to Mar., 1 page, available at http://1997.webhistory.org/www.lists/www-talk.1995q1/0722.html.
WWW-Talk Jan.-Mar. 1995 Archives, Message from Jan. to Mar, "Re: Hot Java is here! and it *rocks*", 1 page. Available at http://1997.webhistory.org/www.lists/www-talk.1995q1/0711.html.
WWW-Talk Jan.-Mar. 1995 Archives, Message from Jan. to Mar, "Re: Hot Java is here! and it *rocks*", 1 page. Available at http://1997.webhistory.org/www.lists/www-talk.1995q1/0720.html.
WWW-Talk Jan.-Mar. 1995 Archives, Message From Jan. to Mar., 1 page, available at http://1997.webhistory.org/www.lists/www-talk.1995q1/0743.html.
WWW-TALK@w3.org from Jul. to Aug. 1995 Archives, Message from Jul. to Aug., 1 page, available at http://lists.w3.org/Archives/Public/www-talk/1995JulAug/0458.html.
WWW Talk Apr.-Jun. 1993 Archives, Message from Mar. to Jun.,1 page, available at http://ksi.cpsc.ucalgary.ca/archives/WWW-TALK/www-talk-1993q2.messages/127.html.
WWW-Talk Apr.-Jun. 1994 Achives, Message from Apr. to Jun., 1 page, available at http://www.intercom.co.cr/www-archives/1994-q210597.html.
WWW-Talk Jan.-Mar. 1993 Archives, Message from Jan. to Mar., 1 page, available at http://1997.webhistory.org/www.lists/www-talk.1993q1/0120.html.
Kazutoshi Fujikawa,"Multimedia Presentation System" Harmony"with Temporal and Active Media", USENIX—Summer 1991 Technical Conference , 20 pages.
John Ousterhout,"Hypergraphics and Hypertext in Tk",7th Annual X Technical Conference, The X Resource issue 5, 16 pages.
Guide to the Apple Computer, Online Archives of California ,Special Collections M1007, Records 1977-1998, 230 pages.
Tim Berners-Lee,"World-Wide Web: The Information Universe", Emerald Backfiles 2007, Electronic Networking, vol. 2, No. 1, Spring 1992, pp. 52-58.
Gary Thomas Howell,"Building Hypermedia Applications", McGraw-Hill, Inc, 1992, 293 pages.
George Toye, "Share: A Methodology and Environment for Collaborative Product Development", Post-Prec. IEEE Second Workshop Enabling Technologies : Infrastructure for Collaborative Enterprises, Apr. 1993 IEEE Computer Society Press, 18 pages.
WWW-Talk Apr.-Jun. 1993 Archives, Message from Apr.-Jun., 1 page, available at http://1997.webhistory.org/www.lists/www-talk.1993q2/0484.html.
WWW-Talk Apr.-Jun. 1993 Archives, Message from Apr.-Jun., 2 pages, available at http://1997.webhistory.org/www.lists/ www-talk.1993q2/0469.html.
WWW Talk Apr.-Jun. 1993 Archives , Message from Apr.-Jun., 1 page, available at http://1997.webhistory.org/www.lists/www-talk.1993q2/0588.html.

David Raggett, "HTML+ (Hypertext markup language)", Jul. 23, 1993, 35 pages.
WWW Talk Jul.-Oct. 1993 Archivres, Message from Jun.—Sep., 1 page, available at http://ksi.cpsc.ucalgary.ca/archives/ WWW-TALK/www-talk-1993q3.messages/282.html.
WWW Talk Jul.-Oct. 1993 Archives, Message from Jun.-Sep., 1 page, available at http://ksi.cpsc.ucalgary.ca/archives/ WWW-TALK/www-talk-1993q3.messages/290.html.
Don Crass,"Claris' Hyper Card 2.0 Builds on its strengths", Reviews From Infoworld Magazine, May 6, 1991,5 pages.
Don Crass, "Toolbook Upgrade Easier To Learn Faster", Reviews Infoworld Magazine, Aug. 26, 1991, vol. 13 Issue 34, 3 pages.
INFOWORLD Magazine, Sep. 23, 1991, vol. 13 Issue 38, 3 Pages.
INFOWORLD Magazine, Jun. 3, 1991, vol. 13 Issue 22, 3 Pages.
INFOWORLD Magazine, Nov. 28 1980, vol. 12 Issue 48, 3 pages.
INFOWORLD Magazine, Jul. 18, 1890, vol. 12 Issue 29, 3 Pages.
INFOWORLD Magazine, Mar. 9, 1992, vol. 14 Issue 10, 4 pages.
INFOWORLD Magazine, Dec. 20 1993, vol. 15 Issue 51, 4 Pages.
John Bradley, "Interactive Image Display for the X Window System", University of Pennsylvania, Jan. 1992, 67 Pages.
Robert M,"KMS: A Distributed Hypermedia System for Man/ Ging Knowledge in Organizations", Communications of the ACM vol. 31, No. 7, Jul. 1988, 16 pages.
G. X. RI-FiER, "Information Processing 89", Proceedings of the IFIP 11th World Computer Congress, Elsevier Science Publishing Company Inc., Aug. 28-Sep. 1, 1989, 8 pages.
Steve Ditlea, "HYPETED", PC Computing Magazine, vol. 3 No. 10, Oct. 1990, pp. 200-210, 11 Pages.
Niels P. Mayer ,"The Winterp Widget Interpreter—A Lisp Prototyping and Extension Environment for OSF/Motif-based Applications and User-Interfaces", Hewlett Packard Laboratories, 16 pages.
Michael A. Harrison,"Defining Hypermedia: The Essential Elements", Computer Science Division, University of California, Jul. 29, 1992, 18 pages.
Friedrich H. Vogt,"Personal Computers and Intelligent Systems Information Processing' 92", Elsevier Science Publishers B.V., Sep. 7-11, 1992, 9 pages.
Kaj Grenbak, "Design issues for a Dexter-based hypermedia system", ACM ECHT Conference, Nov. 30-Dec. 4, 1992, 10 pages.
M. Cecelia Buchanan,"Specifying Temporal Behavior in Hypermedia Documents", ACM ECHT Conference, Nov. 30-Dec. 4, 1992, 10 pages.
Takeshi Yoneda,"A Time Dependent Multimedia Document as an Advanced Communication Media", 1992 ACM Computer Science Conference, Mar. 3-5, 1992, 19 pages.
Uffe Kock Wiil,"Extensibility in Open, Distributed Hypertext Systems", Ph.D. Dissertation, Aalborg University, Mar. 1993, 15 pages.
Thesis by Charles P. Lombardo,"Hyper.Npsnet:Embedded Multimedia in A 3D Virtual World"Naval Postgraduate School, Sep. 1993, 74 pages.
Nils Hoimyr," Distributed Engineering Data Management (EDM) using HyperText ",Oct. 12, 1993,14 pages.
Dario Lucarella,"More: Multimedia Object Retrieval Environment", Hypertext '93 Proceedings, ACM Nov. 1993, 12 pages.
Douglas E. Shackelford,"The Architecture and Implementation of a Distributed Hypermedia Storage System", Hypertext '93 Proceedings, ACM Nov. 1993, 13 pages.
Antya Umstatter,"Ping", Apr. 15, 1994, 3 pages.
Steve Putz,"Interactive Information Services Using World-Wide Web Hypertext", Prepared for the First International Conference on World-Wide Web, Xerox Corporation Apr. 20, 1994, 10 pages.
Frank Y. Ho,"Design of the User Interface for a Document Browser Supporting Interactive Search", Massachusetts Institute of Technology, May 1994, 90 pages.
Sandy Ressler,"Approaches Using Virtual Environments with Mosaic", in Proceedings of the Second International WWW Conference, Dec. 22, 1994, 8 pages.
Darren S. Foltinek,"Electronic documents and the World Wide Web", CREWES Research Report, vol. 6, 1994, 9 pages.
Patrick J. Moran,"Tele-Nicer-Slicer-Dicer: A New Tool for the Visualization of", J H Howard et at. "Scale and Performance in a Distributed File System."ACM Transactions on Computer Systems 6(1):51-81, Feb. 1988, 7 pages.

Bertrand Ibrahim,"World-wide algorithm animation", Journal: Computer Networks and ISDN Systems, vol. 27 Issue 2, Nov. 1994, 12 pages.
Amy Pearl,"Sun's Link Service: A Protocol for Open Linking", Sun Microsystems, Hypertext '89 Proceedings, Nov. 1989, 10 pages.
Mail from Dave Raggett to WWW Talk Newsgroup, "Subject: Supporting the Book metaphor", Nov. 23, 1992, 2 pages. Available at http://lists.w3.org/Archives/Public/www-talk/1992NovDec/0101.html.
Guido van Rossum, "CMIFed: A Presentation Environment for Portable Hypermedia Documents", ACM MULTIMEDIA '93, Proceedings of the first ACM international conference on Multimedia, 1993 6 pages.
Kazutoshi Fujikawa, "Multimedia Presentation System "Harmony" with Temporal and Active Media", USENIX—Summer '91, Jun. 1991, 20 pages.
Sunao Ueda,"Hypertext System: TownsGEAR", Scientific and Technical Journal, Autum 1990 vol. 26, No. 3, 11 pages.
Robert L. Ashenhurst, "ACM FORUM", Communications of ACM, Jul. 1989, vol. 32, No. 7, 4 pages.
Andrew Lippman,"Coding Image Sequences for Interactive Retrieval ", Communications of ACM, Jul. 1989, vol. 32, No. 7, 9 pages.
Michael Tinker,"DVI Parallel Image Compression", Communications of ACM, Jul. 1989, vol. 32, No. 7, 8 pages.
G. David Ripley,"DVI—A Digital Multimedia Technology",Communications of the ACM, vol. 32, No. 7, Jul. 1989, 12 pages.
Clement Yu,"Efficient Placement of Audio Data on Optical Disks for Real-Time Applications", Communications of the ACM, Jul. 1989, vol. 32 No. 7, 10 pages.
Diane Crawford,"Two Bills equal Forewarning", Communications of the ACM, Jul. 1989, vol. 32 No. 7, 3 pages.
Scott M. Stevens,"Intelligent Interactive Video Simulation of a Code Inspection", Communications of the ACM, Jul. 1989, vol. 32 No. 7, 12 pages.
Douglas F. Dixon,"Life Before the Chips: Simulating Digital Video Interactive Technology", Communications of the ACM, Jul. 1989, vol. 32 No. 7, 8 pages.
"News Track", Communications of the ACM, Jul. 1989, vol. 32 No. 7, 2 pages.
Larry Press,"Personal Computing", Communications of the ACM, Jul. 1989, vol. 32 No. 7, 5 pages.
Bryan Kocher,"SIGGRAPH", Communications of the ACM, Jul. 1989, vol. 32 No. 7, Jul. 1989, 1 page.
Edward A. Fox, "Interactive Digital Video", Communications of the ACM, Jul. 1989, vol. 32 No. 7, Jul. 1989, 8 pages.
Karen A. Frenkel,"The Next Generation of Interactive Technologies", Communications of the ACM, Jul. 1989, vol. 32 No. 7, 10 pages.
Wendy E,"Virtual Video Editing in Interactive Multimedia Applications", Communications of the ACM, Jul. 1989, vol. 32 No. 7, 9 pages.
Dr. Philip Thrift , "Preprocessing instructions: Embedding External Notations in HTML", Second International World Wide Web Conference: Mosaic and the Web, Oct. 2, 1994, 29 pages.
Second International World Wide Web Conference: Mosaic and the Web Advance Proceedings, vol. 1, Oct. 1994, 75 pages.
"CRIPT/VS Text Programmer's Guide Release 4.0", IBM Corp, 7th Edition, 1991,378 pages.
"Book Master General Information Release 4.0", International Business Machines Corporation, 6th Edition, Jun. 1992, 60 pages.
Richard L. Phillips,"Distributed Visualization at Los Alamos National Laboratory", Researchers Overview, Aug. 1989,8 pages.
Richard .L Phillips,"MediaView, A general Multimedia Publication System", Communications of the ACM, Jul. 1991, vol. 31, No. 7, 9 pages.
Richard L. Phillips,"An Interpersonal Multimedia Visualization System", IEEE Computer Graphics & Applications, May 1991, 8 pages.
Richard L. Phillips, "MediaView: An Editable Multimedia Publishing System Developed with an Object-Oriented Toolkit", USENIX Summer 1991, 12 pages.

Richard L. Phillips,"A Scientific Visualization Workbench", IEEE Xplore, Supercomputing '88. [vol. 1]. Proceedings, Nov. 1988, 8 pages.
Dick Phillips,"Digital Publication: Status, Opportunities and Problems", SIGGRAPH '90, ACM SIGGRAPH 90 Panel Proceedings, 1990, 22 pages.
Mail form Marc Andreessen, WWW Talk Newsgroup, Sub:Solicitation For Widgets, Jan. 30, 1993, 1 page.
Message by Tony Sanders, "Sub: Re: Standardizing new HTML features", WWW Talk Newsgroup, Apr. 29, 1993, 2 pages.
Message by Bill Jansse,"Sub :Re: Standardizing new HTML features", WWW Talk Newsgroup, Apr. 29, 1993, 1 page.
Message by Bill Janssen,"Sub:Re: Standardizing new HTML features", WWW Talk Newsgroup, Apr. 29, 1993 1, 1 page.
Message by Tony Sanders,"Sub: Re: Standardizing new HTML features", WWW Talk Newsgroup, Apr. 29, 1993, 1 page.
Message by Bill Janssen,"Sub:Re: Standardizing new HTML features", WWW Talk Newsgroup, Apr. 29, 1993, 1 page.
Message by Thomas R. Bruce, "Interapplication Communication", WWW Talk Newsgroup, Apr. 30, 1993, 1 page.
Kim Halskov Madsen,"Experiences Using Cooperative Interactive Storyboard Prototyping", Communications of the ACM, Jun. 1993, vol. 36, No. 4, 8 pages.
Richard L. Phillips,"MediaView: An Editable Multimedia Publishing System Developed with an Object-Oriented Toolkit", Usenix Summer 1991, 12 pages.
"Component Objects Technology Overview", Microsoft Corporation, Sep. 1993, 17 pages.
"Microsoft® OLE Today and Tomorrow", Microsoft Corporation Dec. 1993 Part No. 098-56454, 11 pages.
Ryuichi Ogawa,"Design Strategies for Scenario-based Hypermedia: Description of its Structure, Dynamics, and Style", MILANO, Nov. 30 -Dec. 4, 1992, 10 pages.
Herbert Weber, "Software Engineering", SIGSOFT '92 , Proceedings of the Fifth ACM SIGSOFT Symposium on Software Development Environments, ACM, vol. 17, No. 5, Dec. 9, 1992 13 pages.
Kim Halskov Madsen, "Experiences using Cooperative Interactive Story Board Prototyping" communications of the ACM, Jun. 1993, vol. 36 No. 4, 12 pages.
George G. Robertson, "Information Visualization Using 3D Interactive Animation", Communications of the ACM, Apr. 1993, vol. 36 No. 4, 19 pages.
Chris Adie,"Network Access to Multimedia Information", Edinburgh University, 2nd Edition, Aug. 9, 1993, 60 pages.
George G. Robertson,"The Document Lens", Sixth Annual Symposium on User Interface Software Technology, ACM Press, Nov. 3-5, 1993, 11 pages.
Andrew Laursen,"Oracle Media Server: Providing Consumer Based Interactive Access to Multimedia Data", SIGMOD '94, ACM press, vol. 23, Issue 2, Jun. 1994, 12 pages.
Message from David C. Martin,"Sub:Re: HTML 2.0 specification", available at http://ksi.cpsc.ucalgary.ca/archives/ HTML-WG/html-wg-94q3.messages/0059.html ,3 pages.
Komei Harada," Anecdote : A Multimedia Storyboarding System with Seamless Authoring Support", ACM Multimedia, 1996, 11 pages.
Donald D. Chamberlin,"Quill: An Extensible System for Editing Documents of Mixed Type", IEEE Explore, 1988, 10 pages.
Jeffrey Friedberg,"Extending X for Double-Buffering, Multi-Buffering, and Stereo", Jan. 11, 1990, 28 pages.
Masayuki Tani, Kimiya Yamaashi,"Object-Oriented Video: Interaction With Real-World Objects Through Live Video", ACM Conference on Human Factors in Computing Systems, ACM Portal, May 3 - 7, 1992, 7 pages.
"The Windows Interface", An Application Design guide, Microsoft Press, 1987, 222 pages.
Millikin, M., "OLE for Compound Documents", Patricia Seybold's Office Computing Group, Feb 1991, v14 n2, 5 pages.
Gore, Andrew. "Claris and Beagle Bros. shoot for the Works integrated programs due before year-end.", MacWEEK Journal , Jul. 16, 1991, v5 n25, 3 pages.
Gore, Andrew."Claris 'Suite' On Integration", MacWEEK Journal , Feb. 5, 1991, v5 n5, 2 pages.

"Claris Works Handbook", Claris Corporation, 1991, 27 pages.
"Claris Works Getting Started", Claris Corporation, 1991, 27 pages.
"Full Write Professional Learning guide", Ashton-Tate Corporation, 1987, 24 pages.
"Claris Works Getting Started", Claris Corporation, 1991, 56 pages.
"Lotus works", User Guide, Spinnaker Software Corporation , 1991, 13 pages.
"Microsoft Windows Users Guide", For the Windows Graphical Environment, Microsoft Corporation, 1985-90, Version 3.0, 10 pages.
James Donahue,"Whiteboards: A Graphical Database Tool", ACM transaction on Office Information Systems, vol. 4 No. 1, Jan. 1986, 9 pages.
"Lotus works", User guide, Spinnaker Software Corporation , 1991, 32 pages.
John R. Rymer, "Unraveling the NewWave Confusion", Office Computing Report, vol. 14 No. 9, Sep. 1991, 1 page.
M. Frans Kaashoek, "Dynamic Documents: Extensibility and Adaptability in the WWW", Sep. 15, 1994, 12 pages.
"The Windows Interface", An Application interface Guide, Microsoft Press, 1987 65 pages.
Robert H. Thomas,"Diamond: A Multimedia Message System Built on a Distributed Architecture" Dec. 1985, 13 pages.
Brian W. Kernighan,"A System for Typesetting Mathematics", Communications of ACM, Mar. 1975, vol. 18 No. 3, 7 pages.
"Using the World Wide Web", The comprehensive Guide to Navigate the WWW on the Internet, QUE Corporation 1994, 28 pages.
H. B. Sieburg,"The Cellular Device Machine: Point Of Departure For Large-Scale Simulations Of Complex Biological Systems", University of California, 1990, vol. 20, No. 4-6, 21 pages.
Hans B. Sieburg,"The Cellular Device Machine Development System for Modeling Biology on the Computer", University of California , 1991, 27 pages.
Dafoe, M.E.,"In Silico Knowledge Discovery In Biomedical Databases", 5th Workshop on Neural Networks, Nov. 7-10, 1993, 6 pages.
Hans B. Sieburg,"Testing HIV Molecular Biology In In Silico Physiologies", 1st International Conference on Intelligent Systems in Molecular Biology (ISMB), 1993, 8 pages.
K.S Kunzelman, "In Silico Prototyping of Wetlab Experiments", IEEE explore, 1993, 8 pages.
Hans El. Sieburg,"Physiological Studies in Silico", SFI Studies in the Science of Complexity, Lect, vol. III, 1991, 24 pages.
Osterhus, T. L.,"Simulation Directed Knowledge Discovery in Databases", The Society for Computer Simulation (SCS), 1994, 12 pages.
White Paper, Visible Human Project : Internet Data Server, Meta Map Inc/Muritech Co., Sep. 1, 1994, 9 pages.
Time B.L, "Tim's Notes on W5", Jul. 1993, 4 Pages.
Dale K. Myers "INTERACTIVE VEDIO", USENIX Association, Proceedings of the Winter 1993 USENIX Conference, Jan. 1993, 6 pages.
"Proceedings of the IEEE Visualization '94 Conference", 1994, 21 pages.
"The Viola Home Page", ViolaWWW Browser circa 1993, available at http://viola.org/ , 32 pages.
WWW Talk Jan.-Mar. 94: "Viola WWW beta release is available", Messages from Jan. 1, 1994 to Mar. 31, 1994, available at http://ksi.cpsc.ucalgary.ca/archives/WWW-TALK/www-talk-1994q1.messages/711.html 3 pages.
Www Talk Jan.-Mar. 1994: "Viola WWW beta release is available", Messages from Jan. 1, 1994 to Mar. 31, 1994, available at http://ksi.cpsc.ucalgary.ca/archives/WWW-TALK/www-talk-1994q1.messages/717.html 2 pages.
WWW-VRML 1994 by Archive: "FYI . . . press release", Messages from Jun. 10 to Dec. 27, 1994, 2 pages. Available at http://1997.webhistory.org/www.lists/www-vrml.1994/0480.html.
www-talk@w3.org from Jul. to Aug. 1995 by date: "EOLAS Acquires Milestone Internet Software Patent", Messages from Jul. 3, 1995 to Aug. 31, 1995, 1 page. Available at http://lists.w3.org/Archives/Public/www-talk/1995JulAug/0421.html.
"Viola Subpoena Package #2", Aug. 4, 1999, 1 page.
"Proceedings of the IEEE Visualization '94 Conference", IEEE 1994, 21 pages.

Ken Doyle, "The QuickTime XCMDs", Quick Time Software group, Apple Computer Inc., Apr. 26, 1994, 51 pages.
*Eolas Technologies Incorporated* v. *Adobe Systems Incorporated, et al.*, In the United States District Court for the Eastern District of Texas Tyler Division, Civil Action No. 6:09-CV-446 (LED), Defendants' Invalidity Contentions [PA-NAT-Defendants' Invalidity Contentions].
Defendants' Invalidity Contentions Claim Charts A-BL [PA-NAT-Defendants' Invalidity Contentions Claim Charts A-BL].
May 12, 1993 codebase obtained from software\viola930512.tar.gz hereinafter referred to as "DX34"on the disc.
May 27, 1993 codebase obtained from the archive violaTOGO.tar.Z in the disc.
Oct. 16, 1993 codebase obtained from the archive violaTOGO.tar.Z in the disc "1—Tar Secondaries"8 in the folder 047263-000006\usr2\users\pei\. ("Alpha release.").
Feb. 23, 1994 codebase obtained from the disc [PA-NAT-00000023], hereinafter referred to as "MS_Supp_1205_002," in the folder 051209_1055(E)\, in the archive viola940223.tar.gz. ("February beta release").
The Mar. 23, 1994 codebase obtained from the disc "1—TAR Secondaries," in the folder 047263-000004/usr/work/viola940323.13 ("March beta release.").
Other public demonstrations before Oct. 17, 1993, as corroborated at least by the contents of the four DVDs "1—TAR Secondaries," "2—Solaris Secondaries," "3—TAR Images," and "4—Solaris images."20 Such corroboration may include, but is not limited to: email correspondence, timesheets, code files, and other documents.
"DX34," in the folder demo\linux\vplot.
"MS_SUPP_1205_001," in the folder 051208_1551 (E)\, the contents of the folder petra\vplot.
"MS_Supp_1205_001," in the folder 051208_1551 (E)\, the contents of the archive viola_demo.tar.gz.
Solaris Secondaries, Exhibit 52 of the Oct. 28, 1999 Deposition of Perry Wei in connection with the case *Eolas Technologies, Inc.* v. *Microsoft Corp.*, No. 99-C-626 (N. D. Ill. Jul. 8, 2003—Aug. 7, 2003).
MS_SUPP_1205_001 Subdirectory labeled "MS_SUPP_1205_001\viola_demo"In "MS_SUPP_1205_001," in the folder 051208_1551 (E)\, the archive viola_demo.tar.gz.
Wei Dep Exh. 53 Subdirectory labeled "Oct. 28, 1999 Wei Dep ex 52" Exhibit 52 of the Oct. 28, 1999 Deposition of Perry Wei in connection with the case *Eolas Technologies, Inc.* v. *Microsoft Corp.*, No. 99-C-626 (N. D. Ill. Jul. 8, 2003—Aug. 7, 2003).
"Book Manager Build/ VM", IBM Corporation, 2nd Ed, Sep. 1990, 155 Pages.
Book Manager Build/ Vm, 2nd Ed, IBM Corporation, Sep. 1990, 317 pp.
IBM BookMaster Text Programmer's Notebook : Release 4.0, 4th Ed., Aug. 1992, 196 Pages.
IBM BookMaster, User Guide, Release 4.0, 5th ed., Aug. 1992, 818 Pages.
"Data Stream and Object Architectures", Graphics Object Content Architecture Reference, IBM Corporation, 2nd Ed, Nov. 1993, 658 pages.
Danny Goodman, "The Complete HyperCard 2.0 Handbook", Batnam Books, 2nd Ed., Oct., 1988, 869 Pages.
Andrew Himes and Craig Ragland, "Inside SuperCard", The Completed Guide for Macintosh Developers and Users, Microsoft Press, 1990, 638 pages.
Jerry Borrell, "Mastering the World of Quicktime", Random House electronic Publishing, 1993, 245 Pages.
Dan Gookin, "The Complete Super Card Handbook", Compute Publications, 1989, 629 Pages.
OpenDoc Programmer's Guide, Apple computing Inc., Addison-Wesley Publishing Company, 1996, 686 Pages.
Valerie Quercia and Tim O'Reilly, "X Window System User's Guide, OSF/Motif Edition", vol. 3, May 1990, 705 Pages.
Dan Heller, Motif Programming Manual for OSF/Motif Version 1.1, vol. 6, 1991, 1013 Pages.
W. Richard Stevens, "UNIX Network Programming", PTR Prentice Hall, 1990, 785 Pages.

Xerox Development Environment, View Point Programmer's Manual, 1986, 684 Pages.
Ray Duncan, "Advanced MS Dos Programming", Microsoft Press, Washington, 1986, 604 pages.
Kraig Brockschmidt, "Programming for Windows with Object Linking and Embedding 2.0", Microsoft Press, 1993, 565 Pages.
Kraig Brockschmidt, "Inside OLE 2.0", Microsoft Press, 1994, 501 Pages.
"Information Disclosure Statement", U.S. Reexamination Control No: 90/007,858, Aug. 24, 2006, 602 Pages.
Kraig Brockschmidt, "Programming for Windows with Object Linking and Embedding 2.0", Microsoft Press, 1993, 501 Pages.
"Object Linking and Embedding: Ole 2.0 Specification", Microsoft OLE Design Team, Microsoft Corporation Apr. 1993, 564 Pages.
Kraig Brockschmidt, Programming for Windows with Object Linking and Embedding 2.0, Microsoft Press, 1993, 511 Pages.
"Authoring Guide, Microsoft Multimedia Viewer", Microsoft Corporation, 1993, 595 Pages.
Dave Raggett, Re: "internal-gopher-image", Jan. 1994, http://1997.webhistory.org/www.lists/www-talk.1994q1/0014.html, 471 Pages.
Frank Kappe, "HTML DTD and related problems (rather long)", http://1997.webhistory.org/www.lists/www-talk.1992/0119.html, 790 Pages.
WWW Talk Oct 93-present, http://1997.webhistory.org/www.lists/www-talk.1993q4/, 1330 Pages.
"Information Disclosure Statement", U.S. Reexamination Control No: 90/007,858, Jun. 12, 2007, 732 Pages.
Information Disclosure Statement, U.S. Reexamination Control No: 90/007,858, Dec. 22, 2005, 669 Pages.
Ex Parte Re Examination Communication Exhibit X, U.S.Reexamination Control No: 90/006,831, Sep. 27, 2005, 713 Pages.
Information Disclosure Statement by Applicant, U.S. Reexamination Control No: 90/007,858, Oct. 31, 2007, 7198 Pages.
Information Disclosure Statement, U.S. Reexamination Control No: 90/007,858, 4379 Pages.
Ex Parte Re Examination Communication, U.S.Reexamination Control No: 90/006,831, Dec. 22, 2005, 510 Pages.
Bill Janssen, "Filters for HTML", available at http://1997.webhistory.org/www.lists/www-talk.1993q2/0000.html, Apr. 1993, 527 Pages.
"Information Disclosure Statement", U.S. Reexamination Control No: 90/007,858, Jan. 4, 2007, 503 Pages.
Pei Y. Wei, In matter of *Eolas Technologies Inc.* v. *Microsoft Corporation*, vol. 1, Oct. 27, 1999, 574 Pages.
Joe Athena, "UU-NNA Meta-library now supports complex keyword searches", obtained from http://1997.webhistory.org/www.lists/www-talk.1993q3/0311.html, Jul. 1993, 4798 Pages.
Kraig Brockschmidt, "Programming for Windows with Object Linking and Embedding 2.0", Microsoft Press, Sep. 27, 1993, 190 Pages.
Kraig Brockschmidt, "Programming for Windows with Object Linking and Embedding 2.0", Microsoft Press, Sep. 27, 1993, 354 Pages.
Thomas Bruce, "Interapplication communication", available at http://1997.webhistory.org/www.lists/www-talk.1993q2/0207.html, Apr. 1993, 746 Pages.
"Programming for Windows with Object Linking and Embedding 2.0", Programmer's Reference, 1992, 724 Pages.
"Microsoft's Offer of Proof and Motion to Reconsider Regarding Revision of Claim Construction", *Eolas Technologies* Vs *Microsoft Corporation*, Apr. 26, 2007, 726 Pages.
Kraig Brockschmidt, "Programming for Windows with Object Linking and Embedding 2.0", Microsoft Press, Sep. 27, 1993, 632 Pages.
Kraig Brockschmidt, "Inside OLE 2.0", Microsoft Press, 1994, 989 Pages.
"Rebuttal Expert Report of Edward W. Felten Regarding Validity", In the US District Court, *Eolas Technologies* Vs *Microsoft Corporation*, Jan. 18, 2002, 508 Pages.
"WWW Talk 1991 Archives", available at http://1997.webhistory.org/www.lists/www-talk.1991/, Oct. 1991, 1265 Pages.
"WWW Talk Oct 93-present", available at http://1997.webhistory.org/www.lists/www-talk.1993q4/, Oct. 1993, 1838 Pages.
Nathaniel S. Borenstein, "Multimedia Applications Development with the Andrew Toolkit", 1990, 330 Pages.

Arthur Van Hoff, HyperLook, The Turning institute Limited, 1992, 301 Pages.
Ben Shneiderman & Greg Kearsley, "Hypertext Hands on: An Introduction to a new way of organizing and accessing Information", Addison-Wesley Publishing Company, 1989, 184 Pages.
Mark Schulman, "Que's Guide to Lotus Notes", Que Corporation, 1993, 427 Pages.
John Helliwell, "HELP! Lotus Notes 3.0", Ziff-Davis Press, 1993, 347 Pages.
Adam A. Wilcox, "PC Learning Labs Teaches Lotus Notes 3.0", ZD Press, 1993, 382 Pages.
"Object Linking & Embedding, Programmer's Reference", Version 1, Microsoft Press, 1992, 412 Pages.
Object Linking and Embedding 2.0, Programmer's Reference, Version 2, Microsoft Press, 1992, 724 Pages.
Object Linking and Embedding: OLE 2.0 Design Specification, Microsoft Press, Apr. 15, 1993, 332 Pages.
Object Linking and Embedding: OLE 2.01 Design Specification, Microsoft Press, Sep. 27, 1993, 353 Pages.
Kraig Brockschmidt, "Programming-for Windows with Object Linking and Embedding 2.0" Mar. 1, 1993, 632 Pages.
Kraig Brockschmidt, "Inside OLE 2.0", The Fast track to building powerful Object-Oriented Applications with Windows Object, Microsoft Press, 1994, 989 Pages.
"OLE 2.0 Programmer's Reference", "Working with Windows Object", vol. 1, Microsoft Press, 1994, 933 Pages.
OLE 2.0 Programmer's Reference, "Working with Windows Object", vol. 2, Microsoft Press, 1994, 363 Pages.
Rebecca Thomas, Lawrence R. Rogers & Jean L. Yates, Advanced Programmer's Guide to Unix System V, Osborne McGraw-Hill, 1986, 580 Pages.
W. Richard Stevens, "UNIX Network Programming", PTR Prentice Hall, 1990, 785 Pages.
Xerox Development Environment, View Point Programmer's Manual, 1986, 684 Pages.
Valerie Quercia and Tim O'Reilly, "X Window System User's Guide, OSF/Motif Edition", vol. 3, May 1990, 705 Pages.
Dan Heller, Motif Programming Manual for OSF/Motif Version 1.1, vol. 6, 1991, 1013 Pages.
Adrian Nye and Tim O'Reilly, "X Toolkit Intrinsics. Programming Manual", O'Reilly & Associates Inc., vol. 4, 1992, 592 Pages.
Paula M. Ferguson, Motif Reference Manual, O'Reilly & Associates Inc , vol. 6 B, 1993, 922 Pages.
Danny Goodman, The Complete HyperCard 2.0 Handbook, 3rd edition, Aug. 1990, 931 Pages.
David L Drucker, Michael D Murie, Quicktime Handbook, Prentice hall Publishing, 1992, 788 Pages.
Tim Berners Lee, "Re: Filters for HTML", obtained from http://1997.webhistory.org/www.lists/www-talk.1993q2/0001.html, Apr. 1993, 1020 pages.
Kraig Brockschmidt, Programming for 'Windows with Object Linking and Embedding 2.0, Mar. 1, 1993, 454 Pages.
Kraig Brockschmidt, "Inside OLE 2.0", Microsoft Press, 1994, 988 Pages.
"Transcript of Proceedings", United States District Court between EOLAS Technologies Inc Vs Microsoft Corporation, Jul. 8, 2003, 3355 Pages.
"Reports of Proceedings", United States District Court between EOLAS Technologies Inc Vs Microsoft Corporations, Aug. 14, 2003, 73 pages.
"Reports of Proceedings", United States District Court between EOLAS Technologies Inc Vs Microsoft Corporations, Aug. 15, 2003, 190 pages.
"Reports of Proceedings", United States District Court between EOLAS Technologies Inc Vs Microsoft Corporations, Aug. 18, 2003, 96 pages.
Kraig Brockschmidt, "Programming for Windows with Object Linking and Embedding 2.0", Microsoft Press, Mar. 1, 1993, 564 Pages.
"Object Linking and Embedding: OLE 2.01 Specification", Microsoft corporation, Sep. 27, 1993, 358 Pages.
"Object Linking and Embedding: OLE 2.0 Specification", Programmers Reference, Version 2.0, 1992, 726 Pages.

Jakob Nielsen, Hypertext & Hypermedia, Academic Press Inc, 1990, 273 Pages.
Ed Krol, "The Whole Internet User's Guide & Catalog", O'reilly & Associates, Inc., 1992, 408 Pages.
John December, Neil Randall, The World Wide Web: Unleashed, 1st ed, Sams Publishing, 1994, 150 pages.
James Gillies & Robert Cailliau, How the Web was Born, Oxford University Press, 2000, 390 Pages.
Gareth Branwyn, "Mosaic Quick Tour for Windows", Ventana Press, 1994, 216 Pages.
R. Cailliau, O. Nierstrasz, M. Ruggier, "First International World-Wide Web Conference", Advance Proceedings, May 1994, 462 Pages.
Email re WWW client development, Marc Andreessen Jun. 4, 1993.
Email re Fyi . . . Press Releas, Michael Doyle, Aug. 31, 1994.
Posting re 'External' viewers, Bill Jansen, Oct. 7, 1993.
Posting re Hot Java is here! And it rocks, Sarr Blumson, Mar. 28, 1995.
Email re binaries, Cheong Ang, Aug. 26, 1994.
Eolas Response to Request for Admissions, Dec. 17, 1999.
Email NCSA Mosaic Additons, Michael Doyle, Jan. 6, 1994.
Email re viola alpha status, Pei Wei Oct. 14, 1993.
Email re first alpha releas, Scott Silvey Oct. 15, 1993.
Email re viola alpha status, Pei Wei Oct. 15, 1993.
Email re viola alpha upadate, Pei Wei Oct. 16, 1993.
Email re violaWWW, Pei Wei Oct. 17, 1993.
Email re viola subjects and praise, Jason Bluming, Oct. 18, 1993.
Email re violaWWW alpha, John Cahill Oct. 21, 1993.
Email re Tables, Chris Hector Oct. 29, 1993.
Email re violaWWW alpha is now ready, Pei Wei Jan. 6, 1994.
Email re Testing account for ViolaWWW, Dave Martin May 19, 1994.
Viola Builder posting, Stefan Schmidt Dec. 20, 1992.
WWWViola posting, Andreessen Feb. 8, 1993.
violaWWW posting, Pei Wei Feb. 8, 1993.
HHML Posting, Pei Wei May 10, 1993.
Email re viola.tar.Z for ftping, Pei Wei May 31, 1993.
Email re viola tar, Pei Wei May 31, 1993.
WWW Conference Photos, Jul. 30, 1993.
Information VR and Hyperbolic space posting, Jun. 10, 1994.
Xerox Map Viewer Web Server requests Sep. 1997.
William Perry Posting Jun. 1996.
Lucid GNU Emacs 19.10 Posting May 27, 1994.
Dan Connolly posting Sep. 2, 1994.
X-WIN Posting Jun. 17, 2010.
NCSA Collage for the Macintosh Oct. 1992.
README DTM Jan. 18, 1993.
proposed new tag: IMG Andreessen Mar. 1993.
Dialog Printout Mar. 10, 2010.
Information Processing Society of Japan, vol. 34, No. 1 Jan. 1993.
Dialog Printout Mar. 10, 2010.
CSA Illumna Mar. 12, 2010.
MS,Win32 Professional Developers Conference, Nov. 8, 1993.
Chapt. 1 OLE Controls Architecture Nov. 18, 1993.
8010 Star Information System Reference Library Product Descriptions, Xerox 1994.
Dialog Printout Mar. 12, 2010.
Dialog Printout Mar. 12, 2010.
Dialog Printout Mar. 12, 2010.
Eolas v Microsoft, Rulings on Motions, Jul. 3, 2003.
PTO office action, Suspension, Aug. 13, 2007.
Eolas v MS, Parties papers on Inequitable Conduct, Jul. 9, 2007.
Eolas v Ms , Parties papers on Obviousness, Jul. 9, 2007.
Eolas v MS, transcript of proceedings, Jul. 30, 2003.
pubes.sgm, Oct. 23, 1992.
Eolas v Microsoft, JMOL, Jul. 3, 2003.
PTO Notice of Suspension, Jan. 18, 2006.
OLE controls, Brocshmitdt, Jan. 10, 1993.
Dave Martin posting, Mar. 13, 1994.
Graphshot Outruns Claras, Oct. 1994.
Inteview with Clark and Andreeson, 1993/1994.
MS Rivals Join Fight, New York Post, Oct. 9, 2003.
Sidley letter to Kunin with WWWTalk CDs, Oct. 22, 2003.

WWW Conference '94, Mosaic and the Web, Advance Proceedings, Oct. 17, 1994.
Second Phase of the Revolution Has Begun, Wired Magazine, Oct. 1994.
Extensible WWW Browsers, Aug. 4, 1998.
Email re Motif, Pei Wei, Mar. 26, 1993.
Email re Motif, Dougherty, Mar. 26, 1993.
Email re Motif in viola, Dougherty, Apr. 30, 1993.
Dialog printout re CCIC Catalogue of Chinese Softwares, Sep. 10, 1996.
Email re Announcing Emacs-W3 v2.1, William Perry, Apr. 6, 1994.
Email re Displaying Widgets in lemacs, William Perry, Aug. 13, 1993.
Posting re W3 mode for Emacs 19.24 and higher, William Perry, Jun. 9, 1994.
Posting WWW>Tle-robotics via the Web (fwd), Gleason Sackman, Sep. 7, 1994.
Email re OLE2.0 is Golden, Mike Maples, Apr. 21, 1993.
Posting Lotus Positions on the Internet, Michael Doyle, Aug. 29, 1994.
Email William Perry re Interest in HTML Conformance? Apr. 18, 1994.
Email re Presentation Tags, Wiliam Perry May 5, 1994.
Image of CD titled William Perry Emacs/W3 Mailing List Archives Aug. 8, 2001.
Email re Lucid Emacs 19.9 available, Jamie Zawinski, Jan. 12, 1994.
Posting lemacs answer list, Feb. 3, 1994.
Email re Lucid Emacs 19.10 released, Jamie Zawinski, May 27, 1994.
Email re New Version of the Emacs WWW Browser, William Perry, Nov. 16, 1993.
Email re Announcing version 2.0 of the EMacs WWW Browser, William Perry, Feb. 5, 1994.
Initial Experience with Multimedia Documents in Diamond, Forsdick et al.,1984.
Chapt. 5 OLE Fundamentals, 1984.
Unofficial WWW Conference Notes: Day 1-3, Steve Putz, Jul. 28, 1993.
Email re Plan, Cheong S. Ang, Oct. 7, 1994.
Email re Video, Michael Doyle, May 11, 1994.
Email re the <EMBED> tage in HTML-30, Dave Raggett, May 20, 1994.
Email re video, Michael Doyle, May 11, 1994.
Email re HMML, Pei Wei, May 10, 1993.
Email re HMML, Dave Raggett, May 11, 1993.
Email re Announcing tkWWW release 0.4, Joe@athena.mit.edu, Oct. 18, 1992.
Email re viola, Bob Frankston, Mar. 4, 1994.
Email re viola announcement, Pei Wei, Apr. 14, 1994.
Email re list of subscribers, Mar. 28, 1994.
Email re Testing accounts for ViolaWWW, Dave Martin, May 20, 1994.
Email re update on viola matters.., Pei Wei, Aug. 9, 1994.
Email re FYI . . . press release, Pei Wei, Aug. 31, 1994.
Email re thought on viola development plans, Pei Wei, Nov. 1, 1994.
Email re RECIPIENTS VIOLA-TALK, Dec. 14, 1994.
Email re Eolas Acquires Milestone Internet Software Patent, Pei Wei, Aug. 21, 1995.
Press release, WWW-past, present and future, Berners-Lee, Aug. 4, 1998.
Email re toolbars and info agents, Pei Wei, Jan. 17, 1994.
Email re viola stuff done this wee, Jan. 21, 1994.
Email re Weekly viola report, Pei Wei, Feb. 16, 1994.
Email re viola is updated on rock&ruby, Pei Wei, Feb. 23, 1994.
Email re viola, Bob Frankston, Mar. 1, 1994.
Email re viola, Dougherty, Mar. 1, 1994.
Email re mail problem, Mar. 2, 1994.
Email re viola, Pei Wei, Mar. 2, 1994.
Email re viola, Steve Moore, Mar. 3, 1994.
Email re viola, Bob Frankston, Mar. 4, 1994.
Email re Semantic Richness/ VIOLA, Dougherty, Jul. 13, 1993.
Handwritten notes, O'Reilly, Jul. 19, 1993.
Email re Differences between HMML and HTMLplus, Oct. 9, 1993.

Email re viola alpha staus, Pei Wei, Oct. 14, 1993.
Email re violaWWW, Pei Wei, Oct. 17, 1993.
Email re violaWWW alpha, John Cahill, Oct. 21, 1993.
Email re violaWWW alpha is now ready, Pei Wei, Jan. 6, 1994.
Email re viola on linux, Pei Wei, Jan. 6, 1994.
Email re Format Negotiation, Dougherty, May 29, 1993.
Email re viola.tar.Z for ftping, Pei Wei, May 31, 1993.
Email re viola tar, Pei Wei, May 31, 1993.
Email re viola.tar for SUN, Dougherty, Jun. 3, 1993.
Email re PostScript, TeX, Pei Wei, Jun. 15, 1993.
Email re status report, Pei Wei Jun. 17, 1993.
Email re Viola source, Pei Wei Jun. 24, 1993.
Email re Viola, Pei Wei, Jun. 29, 1993.
Email re Visiting ORA's Berkeley office, Pei Wei, Jun. 30, 1993.
Email re DMG Status report, Dougherty, Jul. 7, 1993.
Email re viola/www memory leak, Marc Andreessen, Feb. 8, 1993.
Email re Friday Meeting, Dougherty, May 4, 1993.
vplot.h: xplot for Viola, Scott Silvey, May 6, 1993.
Emaile re Dale's at the Berkeley office, Pei Wei, May 7, 1993.
Email re DMG Status Report-5/7, Dougherty, May 8, 1993.
Email re HMML, Pei Wei, May 10, 1993.
Email re tomorrow, Pei Wei, May 18, 1993.
Image of CD labelled Dale Dougherty Oct. 9, 2001.
Email re status on tape for SUN, Pei Wei, May 27, 1993.
log.scam.Berkeley,EDU, Nov. 1992.
Email re your efforts, Pei Wei Jan. 19, 1993.
Email re future Vola development Jan. 19, 1993.
Email re stuff in new violaWWW, Pei Wei Feb. 8, 1993.
Email re stuff in new violaWWW, Pei Wei Feb. 8, 1993.
Email re stuff in new violaWWW, Marc Andreessen, Feb. 8, 1993.
Email re stuff in new violaWWW, Marc Andreessen, Feb. 8, 1993.
SIGGRAPH Video Review Special Issue #57 All the Widgets (2 hours, 14 minutes, 57 seconds), Apr. 1990.
Video and presentation of Educom 1990.
Quicktime 2.0, including "QTMovie"XCMDs, 1994 disc "Quicktime: The Official Guide for Macintosh Users".
The Apple Chronicle CD-Rom (publicly distributed along with computerssold by Apple Computer by at least 1992) containing exemplary HyperCard content, Macintosh image.
The Apple Chronicle CD-Rom (publicly distributed along with computerssold by Apple Computer by at least 1992) containing exemplary HyperCard content, Windows hybrid image.
Feb. 11, 1993 codebase obtained from midaswww-2.0.pre1.tar.gz and its associated README file midaswww-2.0. pre1.README.
Kahn, P. et al. "Design of Hypermedia Publications: Issues and Solutions,"Proceedings of the International Conference on Electronic Publishing, Document Manipulation & Typography, pp. 107-124, Sep.,1990 ("Hypermedia Design").
Kahn, P. et al. "Video in Hypermedia: The Design of InterVideo," Visual Resources, vol. 7, No. 4, pp. 353-360, 1991 ("Hypermedia Video").
Coombs, J. "Hypertext, Full Text, and Automatic Linking," pp. 83-98, Proceedings of the 13th International Conference on Research and Development in Information Retrieval, Sep., 1990 ("Automatic Linking").
Utting, Kenneth, et al. "Context and Orientation in Hypermedia Networks,"ACM Transactions on Information Systems, vol. 7, No. 1, pp. 58-84, Jan. 1989 ("Context").
Meyrowitz, N. "Intermedia: The Architecture and Construction of an Object-Oriented Hypermedia System and Applications Framework," OOPSLA '86 Proceedings, pp. 186-201, Sep., 1986 ("Intermedia-Architecture").
Meyrowitz, N. "The Missing Link: Why We're All Doing Hypertext Wrong," The Society of Text, pp. 107-114, MIT Press (1989) ("Missing Link").
Smith, Karen E. et al. "Intermedia: A Case Study of the Differences Between Relational and Object-Oriented Database Systems," OOPSLA '87 Proceedings, pp. 452-465, Oct. 1987 ("Intermedia-Relational").
DVD labeled "The Intermedia System, Mar. 13, 1986, Tape 4," with a video on Intermedia.
Yankelovich, N. "Intermedia User's Guide," Version 0.1, Jan. 1986.
"Intermedia Tutorials." Version 1.0, Jan. 1987.

"Intermedia System Administrator's Guide," Version 1.0, 1987.

"Intermedia User's Guide, Alpha Version, IRIS Intermedia Release 3.0," Aug. 1988.

"Intermedia User's Guide, IRIS Intermedia Release 3.0," 1988-1989.

"Intermedia User's Guide: Addendum, IRIS Intermedia Release 3.0," 1988-1989.

"IRIS InterLex Server: User's and Installation Guide," 1989.

Yankelovich, N. "Design Samples," 1991.

Kahn, P. "Information Retrieval as Hypermedia: An Outline of Interbrowse,"Proceedings of the National Online Meeting on Learned Information, Medford,NJ, pp. 131-139, 1988.

Kahn, P. et al. "Design of Hypermedia Publications: Issues and Solutions,"Proceedings of the International Conference on Electronic Publishing, Document Manipulation, and Typography (EP90), pp. 107-124, 1990.

Kahn, P. et al. "Guide, HyperCard and Intermedia: A Comparison of Hypertext/Hypermedia Systems," IRIS Technical Report No. 88-7, 1988.

Meyrowitz, N. "Hypertext —Does It Reduce Cholesterol, Too?," Hypertext '89 Keynote Address, Nov. 6, 1989.

Conklin, J. "Hypertext: An Introduction and Survey," IEEE, Sep. 1987.

Palaniappan, M. et al. "The Envoy Framework: An Open Architecture for Agents," ACM Transactions on Information Systems, vol. 10, No. 3, Jul. 1992, pp. 233-264.

Chapts. 6-14, Programming for Windows with Object Linking and Embedding, Apr. 18, 1993.

MS_SUPP_1205_001 Subdirectory labeled "MS_SUPP_1205_001\viola_demo" In "MS_SUPP_1205_001," in the folder 051208_1551 (E)\, the archive viola_demo.tar.gz.

Wei Dep Exh. 53 Subdirectory labeled "Oct. 28, 1999 Wei Dep ex 52"Exhibit 52 of the Oct. 28, 1999 Deposition of Perry Wei in connection with the case Eolas Technologies, Inc. v. Microsoft Corp., No. 99-C-626 (N. D. Ill. Jul. 8, 2003—Aug. 7, 2003).

Hyperties video (2 minutes, 17 seconds), available at http://www.donhopkins.com/home/movies/HypertiesDemo.mov, 1991.

"SIGGRAPH Video Review Special Issue #57 All the Widgets" (2 hours, 14 minutes, 57 seconds), available at http://www.cs.cmu.edu/~natprog/movies/all-the-widgets.wmv, Apr. 1990.

Oct. 10, 1993 codebase obtained from Eric Bina (a co-author of the original Mosaic web browser).

Anonymous, "xresources.h," 15 pages (1993). (Downloaded from "Index of/pub/mosaic/Unix/source/old" as part of The file "xmosaic-1.2.tar.z"; Exhibit E has 15 pages, including printouts for: (1) the web page for downloading "xmosaic-1.2.tar.z," (2) the contents of "xmosaic-1.2.tar.z," and (3) the file "xresources.h" in "xmosaic-1.2. tar.z").

Anonymous, "gs.interface," 2 pages (Jul. 1993). (Downloaded from "ftp://mirror.cs.wesc.edu/pub/mirrors/ghost/gnu/ghostview/" as part of the file "ghoastview-1.5.targz.").

Marc Andreessen, "NCSA Mosaic for X 2.0 prerelease 4 available," www-talk email list, 4 pages (Sep. 29, 1993).

John Bradley, "xv, Interactive Image Display for the X Window System," 72 pages (1992). (Downloaded from "Index of/root/usr.local.src/xv-2.21" as part of the file "xv-2.21.tar.z"; Exhibit I has 77 pages, including printouts for: (1) the web page for downloading "xv-2.21.tar.z," (2) the contents of "xv-2.21.tarz," and (3) the file "xvdocs.ps. z" in "xv-2.21. tar.z.").

John Bradley, "xv, Interactive Image Display for the X Window System," 105 pages (Apr. 26, 1993). (Downloaded.from "Index of/pub/net/infosys/NCSA/Web/Mosaic/Unix/view" as part of the file "xv-3.00.tar.z"; Exhibit J has 110 pages, including printouts for: (1) the web page for downloading "xv-3.00.tar.z," (2) the contents of "xv-3.00.tarz," and (3) the file "xvdocs.ps. z").

Doyle et al., "Processing Cross-sectional Image Data for Reconstruction of Human Developmental Anatomy from Museum Specimens," Newsletter of the Association for Computing Machinery Special Interest Group on Biomedical Computing, vol. 13, No. 1, ACM Press, coverage page, table of contents, pp. 9-15 (Feb. 1993).

Adrian Nye, Xlib Programming Manual for Version 11, O'Reilly & Associates, Inc., title page, copyright page, pages i-xxxiii, 1-46, and index (1988).

Timothy Thiesen, "Ghostview(1) Unix Programmer's Manual," 14 pages (Jul. 1993). (Downloaded from "ftp://mirror.cs.wesc.edu/pub/mirrors/ghost/gnu/ghostview/" as part of the file "ghostview-1.5.tar.gz"; Exhibit L has 21 pages, including printouts for: (1) the FTP site for downloading "ghostview-1.5.targz," (2) the contents of "ghostview-1.5.tar.gz," and (3) the file "ghostview.ps" in "ghostview-1.5.tar.gz," and (4) the file "README" in "ghostview-1.5.tar.gz.").

Douglas Young, the X Window System, Programming and Applications with Xt, Prentice Hall, title p., copyright p., pages i-x, 1-13, 123-166, 280-332, 520-533 (1990).

Office Action issued by the U.S. Patent Office for Reexamination Control No. 90/007,858 dated Jul. 30, 2007, 40 pages.

* cited by examiner

DISTRIBUTED HYPERMEDIA METHOD AND SYSTEM FOR AUTOMATICALLY INVOKING EXTERNAL APPLICATION PROVIDING INTERACTION AND DISPLAY OF EMBEDDED OBJECTS WITHIN A HYPERMEDIA DOCUMENT

RELATED APPLICATIONS

This application is a continuation and claims the benefit of U.S. application Ser. No. 10/217,955 filed Aug. 9, 2002, which is a continuation of U.S. application Ser. No. 09/075,359 filed May 8, 1998, which is a continuation of U.S. Application Ser. No. 08/324,443 filed Oct. 17, 1994, now U.S. Pat. No. 5,838,906, the disclosures of which are hereby incorporated by reference.

BACKGROUND OF THE INVENTION

This invention relates generally to manipulating data in a computer network, and specifically to retrieving, presenting and manipulating embedded program objects in distributed hypermedia systems.

Computer networks are becoming increasingly popular as a medium for locating and accessing a wide range of data from locations all over the world. The most popular global network is the Internet with millions of computer systems connected to it. The Internet has become popular due to widely adopted standard protocols that allow a vast interconnection of computers and localized computer networks to communicate with each other. Computer systems connected to a network such as the Internet may be of varying types, e.g., mainframes, workstations, personal computers, etc. The computers are manufactured by different companies using proprietary hardware and operating systems and thus have incompatibilities in their instruction sets, busses, software, file formats and other aspects of their architecture and operating systems. Localized computer networks connected to the Internet may be incompatible with other computer systems and localized networks in terms of the physical layer of communication including the specific hardware used to implement the network. Also, different networks use differing, incompatible protocols for transferring information and are not able to communicate with each other without a translation mechanism such as a "gateway".

The Internet provides a uniform and open standard for allowing various computers and networks to communicate with each other. For example, the Internet uses Transfer Control Protocol/Internet Protocol ("TCP/IP") that defines a uniform packet-switched communication standard which is ultimately used in every transfer of information that takes place over the Internet.

Other Internet standards are the HyperText Transmission Protocol ("HTTP") that allows hypertext documents to be exchanged freely among any computers connected to the Internet and HyperText Markup Language ("HTML") that defines the way in which hypertext documents designate links to information. See, e.g., Berners-Lee, T. J., "The world-wide web," Computer Networks and ISDN Systems 25 (1992).

A hypertext document is a document that allows a user to view a text document displayed on a display device connected to the user's computer and to access, retrieve and view other data objects that are linked to hypertext words or phrases in the hypertext document. In a hypertext document, the user may "click on," or select, certain words or phrases in the text that specify a link to other documents, or data objects. In this way, the user is able to navigate easily among data objects.

The data objects may be local to the user's computer system or remotely located over a network. An early hypertext system is Hypercard, by Apple Computer, Inc. Hypercard is a standalone system where the data objects are local to the user's system.

When a user selects a phrase in a hypertext document that has an associated link to another document, the linked document is retrieved and displayed on the user's display screen. This allows the user to obtain more information in an efficient and easy manner. This provides the user with a simple, intuitive and powerful way to "branch off" from a main document to learn more about topics of interest.

Objects may be text, images, sound files, video data, documents or other types of information that is presentable to a user of a computer system. When a document is primarily text and includes links to other data objects according to the hypertext format, the document is said to be a hypertext document. When graphics, sound, video or other media capable of being manipulated and presented in a computer system is used as the object linked to, the document is said to be a hypermedia document. A hypermedia document is similar to a hypertext document, except that the user is able to click on images, sound icons, video icons, etc., that link to other objects of various media types, such as additional graphics, sound, video, text, or hypermedia or hypertext documents.

FIG. 1 shows examples of hypertext and hypermedia documents and links associating data objects in the documents to other data objects. Hypermedia document 10 includes hypertext 20, an image icon at 22, a sound icon at 24 and more hypertext 26. FIG. 1 shows hypermedia document 10 substantially as it would appear on a user's display screen. The user is able to select, or "click" on icons and text on a display screen by using an input device, such as a mouse, in a manner well-known in the art.

When the user clicks on the phrase "hypermedia," software running on the user's computer obtains the link associated with the phrase, symbolically shown by arrow 30, to access hypermedia document 14. Hypermedia document 14 is retrieved and displayed on the user's display screen. Thus, the user is presented with more information on the phrase "hypermedia." The mechanism for specifying and locating a linked object such as hypermedia document 14 is an HTML "element" that includes an object address in the format of a Uniform Resource Locator (URL).

Similarly, additional hypertext 26 can be selected by the user to access hypertext document 12 via link 32 as shown in FIG. 1. If the user selects additional hypertext 26, then the text for hypertext document 12 is displayed on the user screen. Note that hypertext document 12, itself, has hypertext at 28. Thus, the user can click on the phrase "hypermedia" while viewing document 12 to access hypermedia document 14 in a manner similar to that discussed above.

Documents, and other data objects, can be referenced by many links from many different source documents. FIG. 1 shows document 14 serving as a target link for both documents 10 and 12. A distributed hypertext or hypermedia document typically has many links within it that specify many different data objects located in computers at different geographical locations connected by a network. Hypermedia document 10 includes image icon 22 with a link to image 16. One method of viewing images is to include an icon, or other indicator, within the text.

Typically, the indicator is a very small image and may be a scaled down version of the full image. The indicator may be shown embedded within the text when the text is displayed on the display screen. The user may select the indicator to obtain the full image. When the user clicks on image icon 22 browser software executing on the user's computer system retrieves the corresponding full image, e.g., a bit map, and displays it by using external software called a "viewer." This results in the full image, represented by image 16, being displayed on the screen.

An example of a browser program is the National Center for Supercomputing Application's (NCSA) Mosaic software developed by the University of Illinois at Urbana/Champaign, Ill. Another example is "Cello" available on the Internet at http://www.law.cornell.edu/. Many viewers exist that handle various file formats such as ".TIF," ".GIF," formats. When a browser program invokes a viewer program, the viewer is launched as a separate process. The view displays the full image in a separate "window" (in a windowing environment) or on a separate screen. This means that the browser program is no longer active while the viewer is active. By using indicators to act as place holders for full images that are retrieved and displayed only when a user selects the indicator, data traffic over the network is reduced. Also, since the retrieval and display of large images may require several seconds or more of transfer time the user does not have to wait to have images transferred that are of no interest to the user.

Returning to FIG. 1, another type of data object is a sound object shown as sound icon 24 within the hypermedia document. When the user selects sound icon 24, the user's computer accesses sound data shown symbolically by data file 40. The accessed sound data plays through a speaker or other audio device.

As discussed above, hypermedia documents allow a user to access different data objects. The objects may be text, images, sound files, video, additional documents, etc. As used in this specification, a data object is information capable of being retrieved and presented to a user of a computer system. Some data objects include executable code combined with data. An example of such a combination is a "self-extracting" data object that includes code to "unpack" or decompress data that has been compressed to make it smaller before transferring. When a browser retrieves an object such as a self-extracting data object the browser may allow the user to "launch" the self-extracting data object to automatically execute the unpacking instructions to expand the data object to its original size. Such a combination of executable code and data is limited in that the user can do no more than invoke the code to perform a singular function such as performing the self-extraction after which time the object is a standard data object.

Other existing approaches to embedding interactive program objects in documents include the Object Linking and Embedding (OLE) facility in Microsoft Windows, by Microsoft Corp., and OpenDoc, by Apple Computer, Inc. At least one shortcoming of these approaches is that neither is capable of allowing a user to access embedded interactive program objects in distributed hypermedia documents over networks.

FIG. 2 is an example of a computer network. In FIG. 2, computer systems are connected to Internet 100, although in practice Internet 100 may be replaced by any suitable computer network. In FIG. 2, a user 102 operates a small computer 104, such as a personal computer or a work station. The user's computer is equipped with various components, such as user input devices (mouse, trackball, keyboard, etc.), a display device (monitor, liquid crystal display (LCD), etc.), local storage (hard disk drive, etc.), and other components. Typically, small computer 104 is connected to a larger computer, such as server A at 106. The larger computer may have additional users and computer systems connected to it, such as computer 108 operated by user 110. Any group of computers may form a localized network. A localized network does not necessarily adopt the uniform protocols of the larger interconnecting network (i.e., Internet 100) and is more geographically constrained than the larger network. The localized network may connect to the larger network through a "gateway" or "node" implemented on, for example, a server.

Internet 100 connects other localized networks, such as server B at 120, which interconnects users 122, 124 and 126 and their respective computer systems to Internet 100. Internet 100 is made up of many interconnected computer systems and communication links. Communication links may be by hardwire, fiber optic cable, satellite or other radio wave propagation, etc. Data may move from server A to server B through any number of intermediate servers and communication links or other computers and data processing equipment not shown in FIG. 2 but symbolically represented by Internet 100.

A user at a workstation or personal computer need not connect to the Internet via a larger computer, such as server A or server B. This is shown, for example, by small computer 130 connected directly to Internet 100 as by a telephone modem or other link. Also, a server need not have users connected to it locally, as is shown by server C at 132 of FIG. 2. Many configurations of large and small computers are possible.

Typically, a computer on the Internet is characterized as either a "client" or "server" depending on the role that the computer is playing with respect to requesting information or providing information. Client computers are computers that typically request information from a server computer which provides the information. For this reason, servers are usually larger and faster machines that have access to many data files, programs, etc., in a large storage associated with the server. However, the role of a server may also be adopted by a smaller machine depending on the transaction. That is, user 110 may request information via their computer 108 from server A. At a later time, server A may make a request for information from computer 108. In the first case, where computer 108 issues a request for information from server A, computer 108 is a "client" making a request of information from server A. Server A may have the information in a storage device that is local to Server A or server A may have to make requests of other computer systems to obtain the information. User 110 may also request information via their computer 108 from a server, such as server B located at a remote geographical location on the Internet. However, user 110 may also request information from a computer, such as small computer 124, thus placing small computer 124 in the role of a "server." For purposes of this specification, client and server computers are categorized in terms of their predominant role as either an information requestor or provider. Clients are generally information requestors, while servers are generally information providers.

Referring again to FIG. 1, data objects such as distributed hypermedia documents 10, 12 and 14, image 16 and sound data file 40, may be located at any of the computers shown in FIG. 2. Since these data objects may be linked to a document located on another computer the Internet allows for remote object linking.

For example, hypertext document 10 of FIG. 1 may be located at user 110's client computer 108. When user 110 makes a request by, for example, clicking on hypertext 20 (i.e., the phrase "hypermedia"), user 110's small client computer 108 processes links within hypertext document 10 to retrieve document 14. In this example, we assume that document 14 is stored at a remote location on server B. Thus, in this example, computer 108 issues a command that includes the address of document 14. This command is routed through server A and Internet 100 and eventually is received by server B. Server B processes the command and locates document 14 on its local storage. Server 14 then transfers a copy of the document back to client 108 via Internet 100 and server A. After client computer 108 receives document 14, it is displayed so that user 110 may view it.

Similarly, image object 16 and sound data file 40 may reside at any of the computers shown in FIG. 2. Assuming image object 16 resides on server C when user 110 clicks on image icon 22, client computer 108 generates a command to retrieve image object 16 to server C. Server C receives the command and transfers a copy of image object 16 to client computer 108. Alternatively, an object, such as sound data file 40, may reside on server A so that it is not necessary to traverse long distances via the Internet in order to retrieve the data object.

The Internet is said to provide an "open distributed hypermedia system." It is an "open" system since Internet 100 implements a standard protocol that each of the connecting computer systems, 106, 130, 120, 132 and 134 must implement (TCP/IP). It is a "hypermedia" system because it is able to handle hypermedia documents as described above via standards such as the HTTP and HTML hypertext transmission and mark up standards, respectively. Further, it is a "distributed" system because data objects that are imbedded within a document may be located on many of the computer systems connected to the Internet. An example of an open distributed hypermedia system is the so-called "world-wide web" implemented on the Internet and discussed in papers such as the Berners-Lee reference given above.

The open distributed hypermedia system provided by the Internet allows users to easily access and retrieve different data objects located in remote geographic locations on the Internet. However, this open distributed hypermedia system as it currently exists has shortcomings in that today's large data objects are limited largely by bandwidth constraints in the various communication links in the Internet and localized networks, and by the limited processing power, or computing constraints, of small computer systems normally provided to most users. Large data objects are difficult to update at frame rates fast enough (e.g., 30 frames per second) to achieve smooth animation. Moreover, the processing power needed to perform the calculations to animate such images in real time does not exist on most workstations, not to mention personal computers. Today's browsers and viewers are not capable of performing the computation necessary to generate and render new views of these large data objects in real time.

For example, the Internet's open distributed hypermedia system allows users to view still images. These images are simple non-interactive two-dimensional images, similar to photographs. Much digital data available today exists in the form of high-resolution multi-dimensional image data (e.g., three dimensional images) which is viewed on a computer while allowing the user to perform real time viewing transformations on the data in order for the user to better understand the data.

An example of such type of data is in medical imaging where advanced scanning devices, such as Magnetic Resonance Imaging (MRI) and Computed Tomography (CT), are widely used in the fields of medicine, quality assurance and meteorology to present physicians, technicians and meteorologists with large amounts of data in an efficient way. Because visualization of the data is the best way for a user to grasp the data's meaning, a variety of visualization techniques and real time computer graphics methods have been developed. However, these systems are bandwidth-intensive and compute-intensive and often require multiprocessor arrays and other specialized graphics hardware to carry them out in real time. Also, large amounts of secondary storage for data are required. The expense of these requirements has limited the ability of researchers to readily exchange findings since these larger computers required to store, present and manipulate images are not available to many of the researchers that need to have access to the data.

On the other hand, small client computers in the form of personal computers or workstations such as client computer 108 of FIG. 2 are generally available to a much larger number of researchers. Further, it is common for these smaller computers to be connected to the Internet. Thus, it is desirable to have a system that allows the accessing, display and manipulation of large amounts of data, especially image data, over the Internet to a small, and relatively cheap, client computer.

Due to the relatively low bandwidth of the Internet (as compared to today's large data objects) and the relatively small amount of processing power available at client computers, many valuable tasks performed by computers cannot be performed by users at client computers on the Internet. Also, while the present open distributed hypermedia system on the Internet allows users to locate and retrieve data objects it allows users very little, if any, interaction with these data objects. Users are limited to traditional hypertext and hypermedia forms of selecting linked data objects for retrieval and launching viewers or other forms of external software to have the data objects presented in a comprehensible way.

Thus, it is desirable to have a system that allows a user at a small client computer connected to the Internet to locate, retrieve and manipulate data objects when the data objects are bandwidth-intensive and compute-intensive. Further, it is desirable to allow a user to manipulate data objects in an interactive way to provide the user with a better understanding of information presented and to allow the user to accomplish a wider variety of tasks.

BRIEF SUMMARY OF THE INVENTION

The present invention provides a method for running embedded program objects in a computer network environment. The method includes the steps of providing at least one client workstation and one network server coupled to the network environment where the network environment is a distributed hypermedia environment; displaying, on the client workstation, a portion of a hypermedia document received over the network from the server, where the hypermedia document includes an embedded controllable application; and interactively controlling the embedded controllable application from the client workstation via communication sent over the distributed hypermedia environment.

The present invention allows a user at a client computer connected to a network to locate, retrieve and manipulate objects in an interactive way. The invention not only allows the user to use a hypermedia format to locate and retrieve program objects, but also allows the user to interact with an application program located at a remote computer. Interprocess communication between the hypermedia browser and the embedded application program is ongoing after the program object has been launched. The user is able to use a vast amount of computing power beyond that which is contained in the user's client computer.

In one application, high resolution three dimensional images are processed in a distributed manner by several computers located remotely from the user's client computer. This amounts to providing parallel distributed processing for tasks such as volume rendering or three dimensional image transformation and display. Also, the user is able to rotate, scale and otherwise reposition the viewpoint with respect to these images without exiting the hypermedia browser software. The control and interaction of viewing the image may be provided within the same window that the browser is using assuming the environment is a "windowing" environment. The viewing transformation and volume rendering calculations may be performed by remote distributed computer systems.

Once an image representing a new viewpoint is computed the frame image is transmitted over the network to the user's client computer where it is displayed at a designated position within a hypermedia document. By transmitting only enough information to update the image, the need for a high bandwidth data connection is reduced. Compression can be used to further reduce the bandwidth requirements for data transmission.

Other applications of the invention are possible. For example, the user can operate a spreadsheet program that is being executed by one or more other computer systems connected via the network to the user's client computer. Once the spreadsheet program has calculated results, the results may be sent over the network to the user's client computer for display to the user. In this way, computer systems located remotely on the network can be used to provide the computing power that may be required for certain tasks and to reduce the data bandwidth by only transmitting results of the computations.

Still other applications of the present invention are possible, as disclosed in the specification, below.

DETAILED DESCRIPTION OF THE INVENTION 375 pages of Source code on 4 microfiche Appendices A and B are provided to this specification. The source code should be consulted to provide details of a specific embodiment of the invention in conjunction with the discussion of the routines in this specification. The source code in Appendix A includes NCSA Mosaic version 2.4 source code along with modifications to the source code to implement the present invention. Appendix B includes source code implementing an application program interface. The source code is written in the "C" computer language to run on an X-Window platform.

Figure 3:
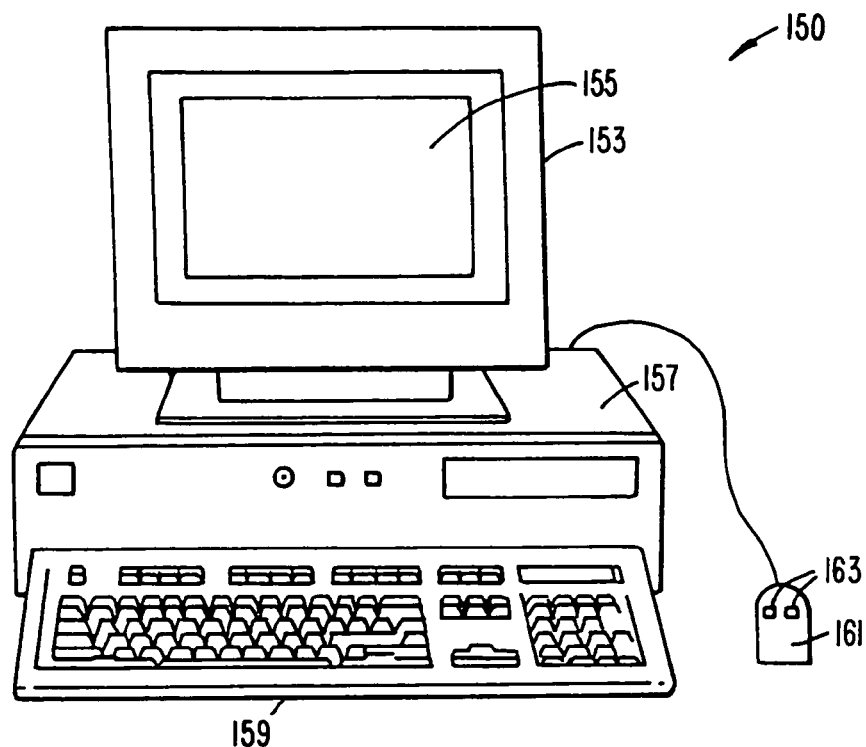
FIG. 3 is an illustration of a computer system suitable for use with the present invention.

FIG. 3 is an illustration of a computer system suitable for use with the present invention. FIG. 3 depicts but one example of many possible computer types or configurations capable of being used with the present invention. FIG. 3 shows computer system 150 including display device 153, display screen 155, cabinet 157, keyboard 159 and mouse 161.

Mouse 161 and keyboard 159 are "user input devices." Other examples of user input devices are a touch screen, light pen, track ball, data glove, etc. Mouse 161 may have one or more buttons such as buttons 163 shown in FIG. 3. Cabinet 157 houses familiar computer components such as disk drives, a processor, storage means, etc. As used in this specification "storage means" includes any storage device used in connection with a computer system such as disk drives, magnetic tape, solid state memory, bubble memory, etc. Cabinet 157 may include additional hardware such as input/output (I/O) interface cards for connecting computer system 150 to external devices such as an optical character reader, external storage devices, other computers or additional devices.

Figure 4:
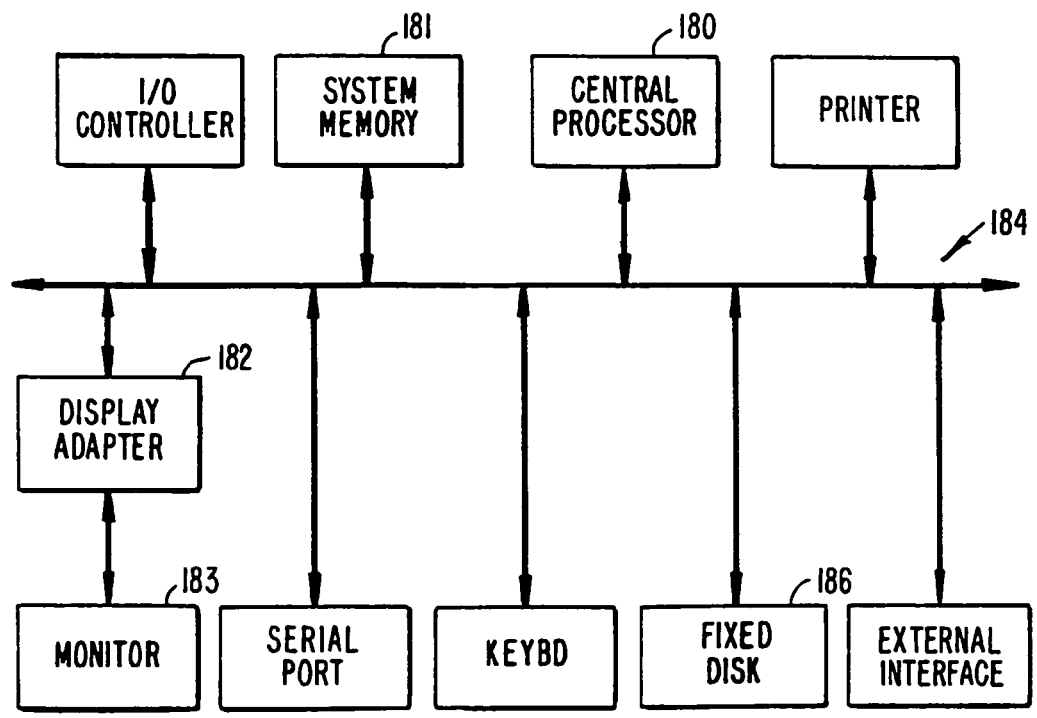
FIG. 4 is an illustration of basic subsystems in the computer system of FIG. 3.

FIG. 4 is an illustration of basic subsystems in computer system 150 of FIG. 3. In FIG. 4, subsystems are represented by blocks such as central processor 180, system memory 181 consisting of random access memory (RAM) and/or read-only memory (ROM), display adapter 182, monitor 183 (equivalent to display device 153 of FIG. 3), etc. The subsystems are interconnected via a system bus 184. Additional subsystems such as a printer, keyboard, fixed disk and others are shown. Peripherals and input/output (I/O) devices can be connected to the computer system by, for example serial port 185. For example, serial port 185 can be used to connect the computer system to a modem for connection to a network or serial port 185 can be used to interface with a mouse input device. The interconnection via system bus 184 allows central processor 180 to communicate with each subsystem and to control the execution of instructions from system memory 181 or fixed disk 186, and the exchange of information between subsystems. Other arrangements of subsystems and interconnections are possible.

Figure 5:
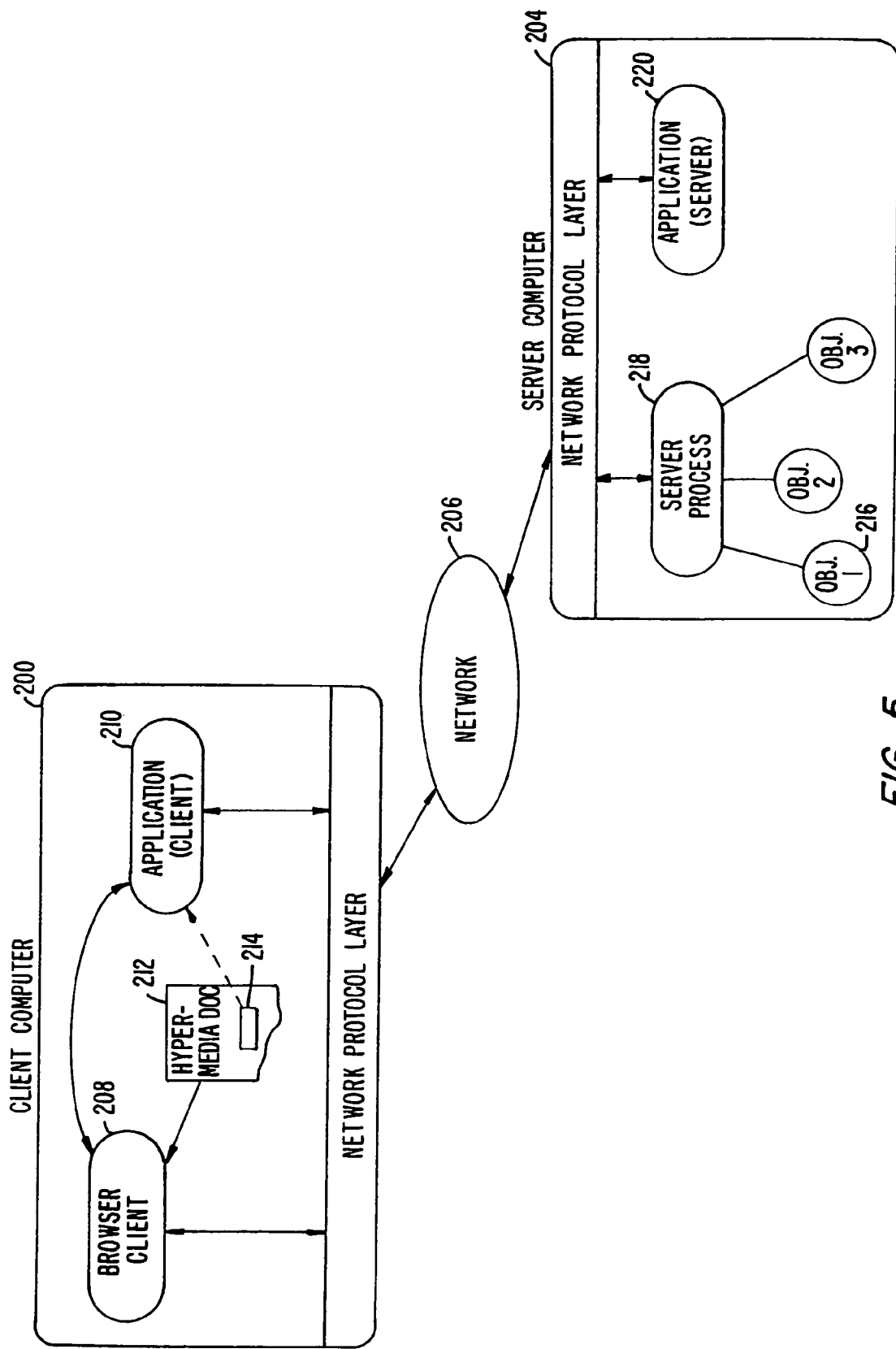
FIG. 5 is an illustration of an embodiment of the invention using a client computer, server computer and a network.

FIG. 5 is an illustration of an embodiment of the invention using a client computer, server computer and a network.

In FIG. 5, client computer 200 communicates with server computer 204 via network 206. Both client computer 200 and server computer 204 use a network protocol layer to communicate with network 206. In a preferred embodiment, network 206 is the Internet and the network protocol layers are TCP/IP. Other networks and network protocols may be used. For ease of illustration, additional hardware and software layers are not shown in FIG. 5.

Client computer 200 includes processes, such as browser client 208 and application client 210. In a preferred embodiment, application client 210 is resident within client computer 200 prior to browser client 208's parsing of a hypermedia document as discussed below. In a preferred embodiment application client 210 resides on the hard disk or RAM of client computer 200 and is loaded (if necessary) and executed when browser client 208 detects a link to application client 210. The preferred embodiment uses the XEvent interprocess communication protocol to exchange information between browser client 208 and application client 210 as described in more detail, below. Another possibility is to install application client 210 as a "terminate and stay resident" (TSR) program in an operating system environment, such as X-Window. Thereby making access to application client 210 much faster.

Browser client 208 is a process that a user of client computer 200 invokes in order to access various data objects, such as hypermedia documents, on network 206. Hypermedia document 212 shown within client computer 200 is an example of a hypermedia document, or object, that a user has requested access to. In this example, hypermedia document 212 has been retrieved from a server connected to network 206 and has been loaded into, e.g., client computer 200's RAM or other storage device.

Once hypermedia document 212 has been loaded into client computer 200, browser client 208 parses hypermedia document 212. In parsing hypermedia document 212, browser client 208 detects links to data objects as discussed above in the Background of the Invention section. In FIG. 5, hypermedia document 212 includes an embedded program link at 214. Embedded program link 214 identifies application client 212 as an application to invoke. In this present example, the application, namely, application client 210, resides on the same computer as the browser client 208 that the user is executing to view the hypermedia document. Embedded program link 214 may include additional information, such as parameters, that tell application client 210 how to proceed. For example, embedded program link 214 may include a specification as to a data object that application client 210 is to retrieve and process.

When browser client 208 encounters embedded program link 214, it invokes application client 210 (optionally, with parameters or other information) and application client 210 executes instructions to perform processing in accordance with the present invention.

An example of the type of processing that application client 210 may perform is multidimensional image visualization. Note that application client 210 is in communication with network 206 via the network protocol layer of client computer 200. This means that application client 210 can make requests over network 206 for data objects, such as multidimensional image objects. For example, application client 210 may request an object, such as object 1 at 216, located in server computer 204. Application client 210 may make the request by any suitable means. Assuming network 206 is the Internet, such a request would typically be made by using HTTP in response to a HTML-style link definition for embedded program link 214.

Assuming application client 210 has made a request for the data object at 216, server process 218 ultimately receives the request. Server process 218 then retrieves data object 216 and transfers it over network 206 back to application client 210. To continue with the example of a multidimensional visualization application, data object 216 may be a three dimensional view of medical data for, e.g., an embryo.

After application client 210 receives the multidimensional data object 216, application client 210 executes instructions to display the multidimensional embryo data on the display screen to a user of the client computer 200. The user is then able to interactively operate controls to recompute different views for the image data. In a preferred embodiment, a control window is displayed within, or adjacent to, a window generated by browser client 208 that contains a display of hypermedia document 212. An example of such display is discussed below in connection with FIG. 9. Thus, the user is able to interactively manipulate a multidimensional image object by means of the present invention. In order to make application client 210 integral with displays created by browser client 208, both the browser client and the application client must be in communication with each other, as shown by the arrow connecting the two within client computer 200. The manner of communication is through an application program interface (API), discussed below.

Browser client 208 is a process, such as NCSA Mosaic, Cello, etc. Application client 210 is embodied in software presently under development called "VIS" and "Panel" created by the Center for Knowledge Management at the University of California, San Francisco, as part of the Doyle Group's distributed hypermedia object embedding approach described in "Integrated Control of Distributed Volume Visualization Through the World-Wide-Web," by C. Ang, D. Martin, M. Doyle; to be published in the Proceedings of Visualization 1994, IEEE Press, Washington, D.C., October 1994.

Versions and descriptions of software embodying the present invention are generally available as hyperlinked data objects from the Visible Embryo Project's World Wide Web document at the URL address "HTTP://visembryo.ucsf.edu/".

Another embodiment of the present invention uses an application server process executing on server computer 204 to assist in processing that may need to be performed by an external program. For example, in FIG. 5, application server 220 resides on server computer 204. Application server 220 works in communication with application client 210 residing on client computer 200. In a preferred embodiment, application server 220 is called VRServer, also a part of Doyle Group's approach. Since server computer 204 is typically a larger computer having more data processing capabilities and larger storage capacity, application server 220 can operate more efficiently, and much faster, than application client 210 in executing complicated and numerous instructions.

In the present example where a multidimensional image object representing medical data for an embryo is being viewed, application server 220 could perform much of the viewing transformation and volume rendering calculations to allow a user to interactively view the embryo data at their client computer display screen. In a preferred embodiment, application client 210 receives signals from a user input device at the user's client computer 200. An example of such input would be to rotate the embryo image from a current position to a new position from the user's point of view. This information is received by application client 210 and processed to generate a command sent over network 206 to application server 220. Once application server 220 receives the information in the form of, e.g., a coordinate transformation for a new viewing position, application server 220 performs the mathematical calculations to compute a new view for the embryo image. Once the new view has been computed, the image data for the new view is sent over network 206 to application client 210 so that application client 210 can update the viewing window currently displaying the embryo image. In a preferred embodiment, application server 220 computes a frame buffer of raster display data, e.g., pixel values, and transfers this frame buffer to application client 210. Techniques, such as data compression and delta encoding, can be used to compress the data before transmitting over network 206 to reduce the bandwidth requirement.

It will be readily seen that application server 220 can advantageously use server computer 204's computing resources to perform the viewing transformation much more quickly than could application client 210 executing on client computer 200. Further, by only transmitting the updated frame buffer containing a new view for the embryo image, the amount of data sent over network 206 is reduced. By using appropriate compression techniques, such as, e.g., MPEG (Motion Picture Experts Group) or JPEG (Joint Photographic Experts Group), efficient use of network 206 is preserved.

Figure 6:
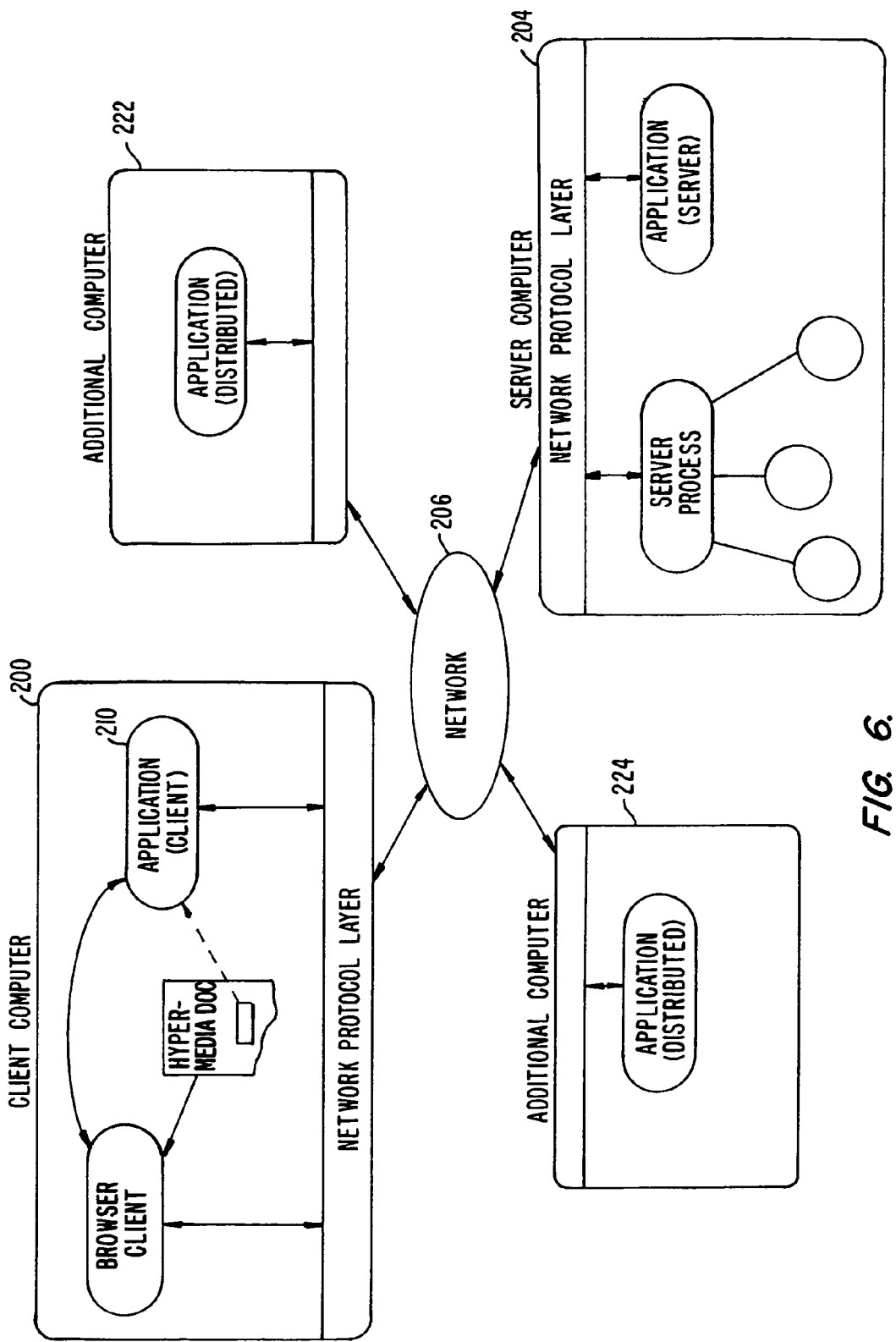
FIG. 6 shows another embodiment of the present invention using additional computers on the network.

FIG. 6 shows yet another embodiment of the present invention. FIG. 6 is similar to FIG. 5, except that additional computers 222 and 224 are illustrated. Each additional computer includes a process labeled "Application (Distributed)." The distributed application performs a portion of the task that an application, such as application server 220 or application client 210, perform. In the present example, tasks such as volume rendering may be broken up and easily performed among two or more computers. These computers can be remote from each other on network 206. Thus, several computers, such as server computer 204 and additional computers 222 and 224 can all work together to perform the task of computing a new viewpoint and frame buffer for the embryo for the new orientation of the embryo image in the present example. The coordination of the distributed processing can be performed at client computer 200 by application client 210, at server computer 204 by application server 220, or by any of the distributed applications executing on additional computers, such as 222 and 224. In a preferred embodiment, distributed processing is coordinated by a program called "VIS" represented by application client 210 in FIG. 6.

Other applications of the invention are possible. For example, the user can operate a spreadsheet program that is being executed by one or more other computer systems connected via the network to the user's client computer. Once the spreadsheet program has calculated results, those results may be sent over the network to the user's client computer for display within the hypermedia document on the user's client computer. In this way, computer systems located remotely on the network can be used to provide the computing power that may be required for certain tasks and to reduce the data bandwidth required by only transmitting results of the computations.

Another type of possible application of this invention would involve embedding a program which runs only on the client machine, but which provides the user with more functionality than exists in the hypermedia browser alone. An example of this is an embedded client application which is capable of viewing and interacting with images which have been processed with Dr. Doyle's MetaMAP invention (U.S. Pat. No. 4,847,604). This MetaMAP process uses object-oriented color map processing to allow individual color index ranges within paletted images to have object identities, and is useful for the creation of, for example, interactive picture atlases. It is a more efficient means for defining irregular "hotspots" on images than the ISMAP function of the World Wide Web, which uses polygonal outlines to define objects in images. A MetaMAP-capable client-based image browser application can be embedded, together with an associated image, within a hypermedia document, allowing objects within the MetaMAP-processed image to have URL addresses associated with them. When a user clicks with a mouse upon an object within the MetaMAP-processed image, the MetaMAP client application relays the relevant URL back to the hypermedia browser application, which then retrieves the HTML file or hypermedia object which corresponds to that URL.

The various processes in the system of the present invention communicate through a custom API called Mosaic/External Application Program Interface MEAPI. The MEAPI set of predefined messages includes those shown in Table I.

TABLE I

| Message Function | Message Name |
| --- | --- |
| Messages from server to client: | |
| 1. Server Update Done | XtNrefreshNotify |
| 2. Server Ready | XtNpanelStartNotify |
| 3. Server Exiting | XtNpanelExitNotify |
| Messages from client to server: | |
| 4. Area Shown | XtNmapNotify |
| 5. Area Hidden | XtNunmapNotify |
| 6. Area Destroyed | XtNexitNotify |

The messages in Table I are defined in the file protocol.sub.--lib.h in Appendix B. The functions of the MEAPI are provided in protocol. sub.--lib.c of Appendix B. Thus, by using MEAPI a server process communicates to a client application program to let the client application know when the server has finished updating information, such as an image frame buffer, or pixmap (Message 1); when the server is ready to start processing messages (Message 2) and when the server is exiting or stopping computation related to the server application program.

For client to server communications, MEAPI provides for the client informing the server when the image display window area is visible, when the area is hidden and when the area is destroyed. Such information allows the server to decide whether to allocate computing resources for, e.g., rendering and viewing transformation tasks where the server is running an application program to generate new views of a multi dimensional object. Source code for MEAPI fundamental functions such as handle.sub.--client.sub.--msg, register-.sub.--client, register.sub.--client.sub.--msg.sub.--callback and send.sub.--client. sub.--msg may be found in protocol-.sub.--lib.c as part of the source code in Appendix B. Next, a discussion of the software processes that perform parsing of a hypermedia document and launching of an application program is provided in connection with Table II and FIGS. 7A, 7B, 8A and 8B. Table II, below, shows an example of an HTML tag format used by the present invention to embed a link to an application program within a hypermedia document.

For client to server communications, MEAPI provides for the client informing the server when the image display window area is visible, when the area is hidden and when the area is destroyed. Such information allows the server to decide whether to allocate computing resources for, e.g., rendering and viewing transformation tasks where the server is running an application program to generate new views of a multi dimensional object. Source code for MEAPI fundamental functions such as handle.sub.--client.sub.--msg, register-.sub.--client, register.sub.--client.sub.--msg.sub.--callback and send.sub.--client. sub.--msg may be found in protocol-.sub.--lib.c as part of the source code in Appendix B.

Next, a discussion of the software processes that perform parsing of a hypermedia document and launching of an application program is provided in connection with Table II and FIGS. 7A, 7B, 8A and 8B.

Table II, below, shows an example of an HTML tag format used by the present invention to embed a link to an application program within a hypermedia document.

TABLE II

< EMBED
TYPE = "type"
HREF = "href"
WIDTH = width
HEIGHT = height
>

As shown in Table II, the EMBED tag includes TYPE, HREF, WIDTH and HEIGHT elements. The TYPE element is a Multipurpose Internet Mail Extensions (MIME) type. Examples of values for the TYPE element are "application/x-vis" or "video/mpeg". The type "application /x-vis" indicates that an application named "x-vis" is to be used to handle the object at the URL specified by the HREF. Other types are possible such as "application/x-inventor", "application/postscript" etc. In the case where TYPE is "application/x-vis" this means that the object at the URL address is a three dimensional image object since the program "x-vis" is a data visualization tool designed to operate on three dimensional image objects. However, any manner of application program may be specified by the TYPE element so that other types of applications, such as a spreadsheet program, database program, word processor, etc. may be used with the present invention. Accordingly, the object reference by the HREF element would be, respectively, a spreadsheet object, database object, word processor document object, etc.

On the other hand, TYPE values such as "video/mpeg", "image/gif", "video/x-sgi-movie", etc. describe the type of data that HREF specifies. This is useful where an external application program, such as a video player, needs to know what format the data is in, or where the browser client needs to determine which application to launch based on the data format. Thus, the TYPE value can specify either an application program or a data type. Other TYPE values are possible. HREF specifies a URL address as discussed above for a data object. Where TYPE is "application/x-vis" the URL address specifies a multi-dimensional image object. Where TYPE is "video/mpeg" the URL address specifies a video object.

WIDTH and HEIGHT elements specify the width and height dimensions, respectively, of a Distributed Hypermedia Object Embedding (DHOE) window to display an external application object such as the three dimensional image object or video object discussed above.

Figure 7A:
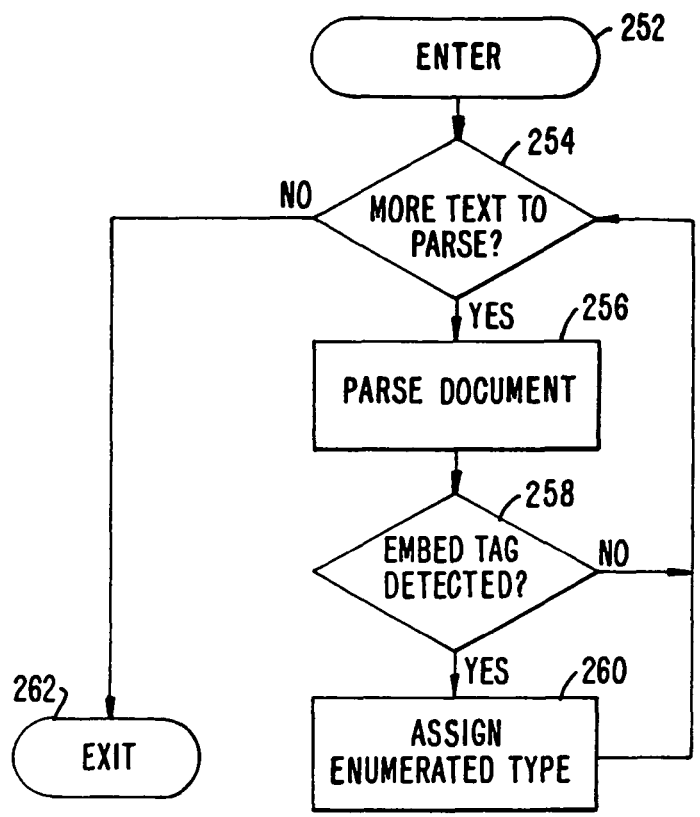
FIG. 7A is a flowchart of some of the functionality within the HTMLparse.c file.

FIG. 7A is a flowchart describing some of the functionality within the HTMLparse.c file of routines. The routines in HTMLparse.c perform the task of parsing a hypermedia document and detecting the EMBED tag. In a preferred embodiment, the enhancements to include the EMBED tag are made to an HTML library included in public domain NCSA Mosaic version 2.4. Note that much of the source code in is pre-existing NCSA Mosaic code. Only those portions of the source code that relate to the new functionality discussed in this specification should be considered as part of the invention. The new functionality is identifiable as being set off from the main body of source code by conditional compilation macros such as "#ifdef . . . #endif" as will be readily apparent to one of skill in the art.

Figure 1:
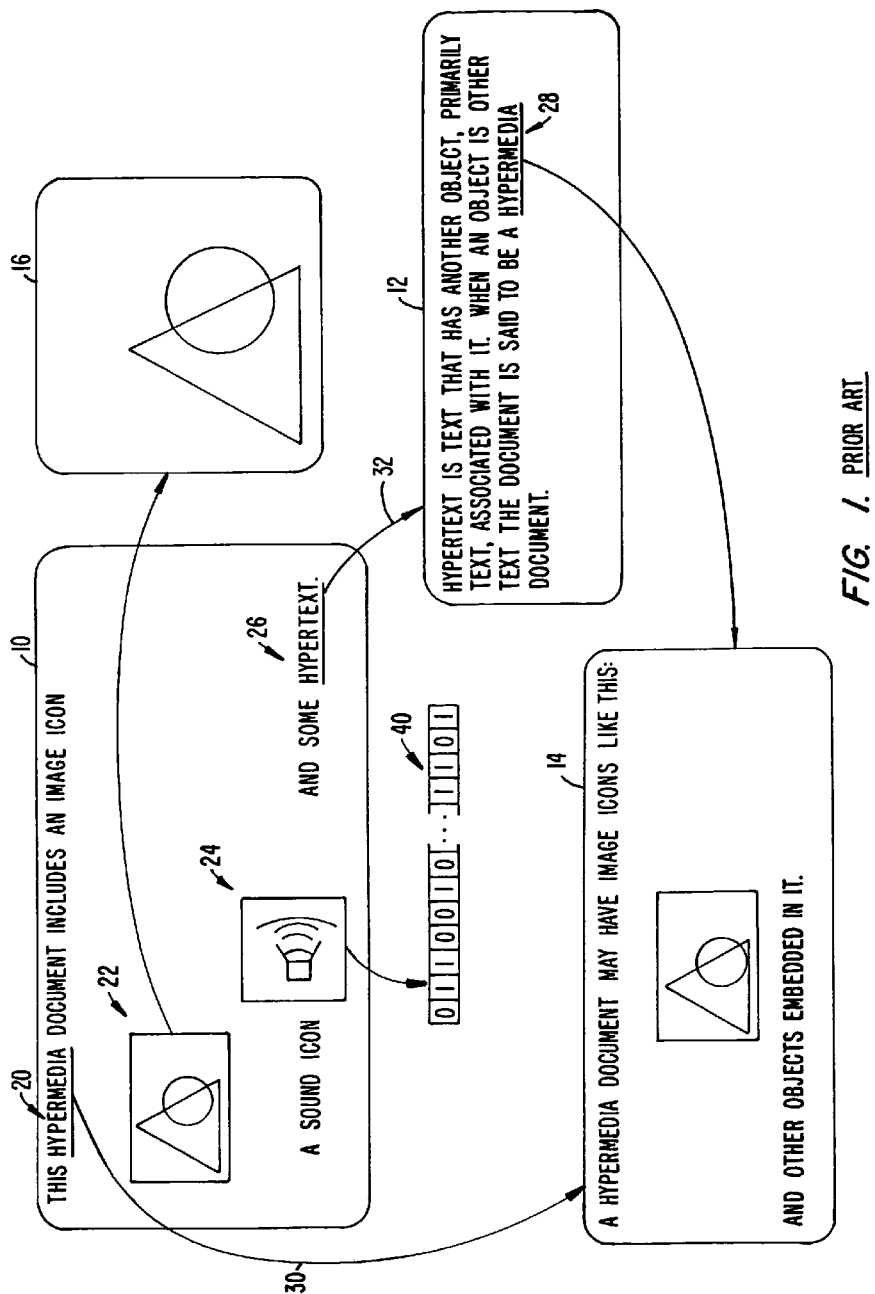
FIG. 1 illustrates examples of hypertext and hypermedia documents and links.
Figure 2:
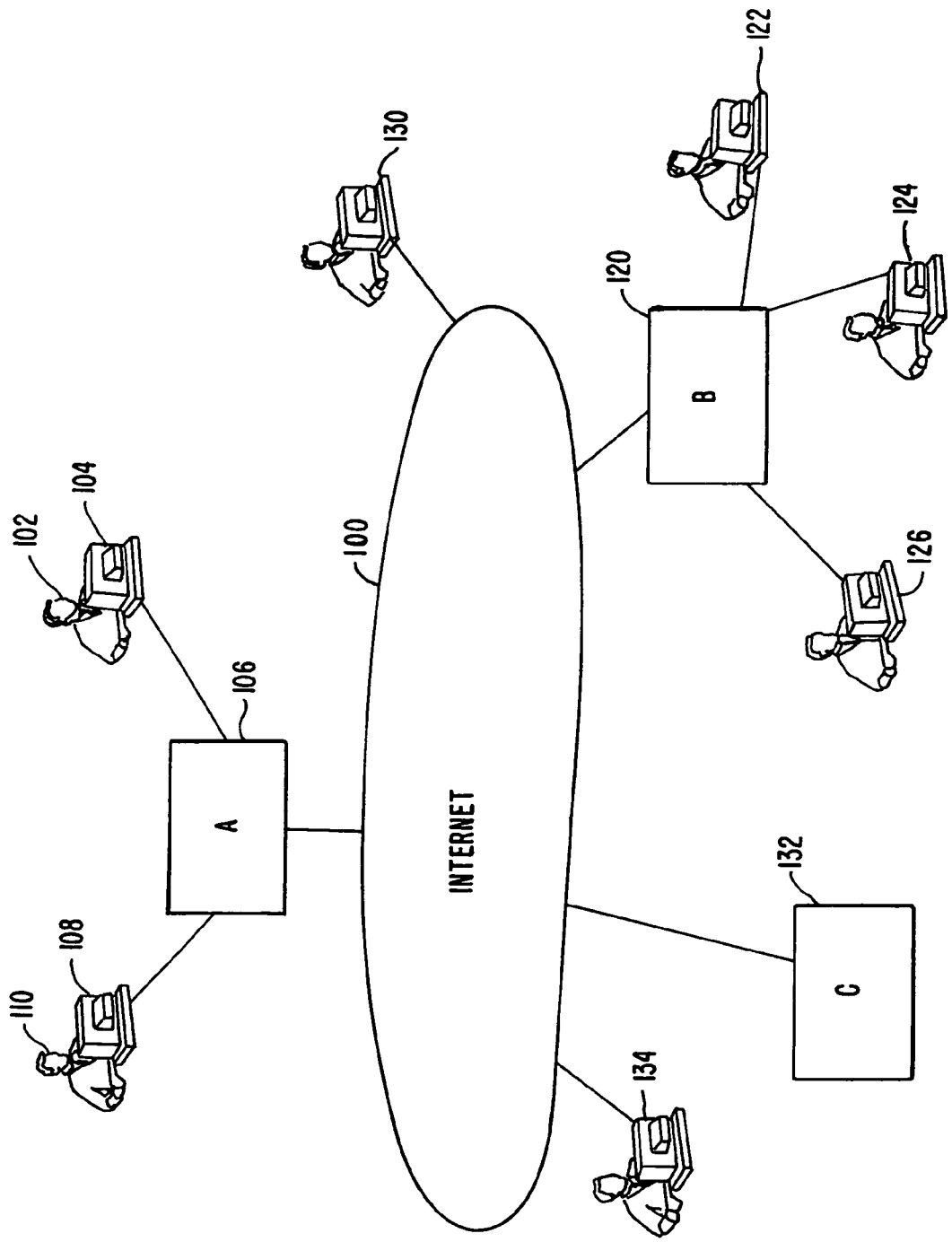
FIG. 2 is an example of a computer network.

In general, the flowcharts in this specification illustrate one or more software routines executing in a computer system such as computer system 1 of FIG. 1. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart may be referred to as if implemented in a single "routine".

The modifications to NCSA Mosaic version 2.4 software files HTMLparse.c, HTMLformat.c, HTMLwidget.c and HTML.c will next be discussed, in turn.

Returning to FIG. 7, it is assumed that a hypermedia document has been obtained at a user's client computer and that a browser program executing on the client computer displays the document and calls a first routine in the HTMLparse.c file called "HTMLparse". This first routine, HTMLparse, is entered at step 252 where a pointer to the start of the document portion is passed. Steps 254, 256 and 258 represent a loop where the document is parsed or scanned for HTML tags or other symbols. While the file HTMLparse.c includes routines to handle all possible tags and symbols that may be encountered, FIG. 7A, for simplicity, only illustrates the handling of EMBED tags.

Assuming there is more text to parse, execution proceeds to step 256 where routines in HTMLparse.c obtain the next item (e.g., word, tag or symbol) from the document. At step 258 a check is made as to whether the current tag is the EMBED tag. If not, execution returns to step 254 where the next tag in the document is obtained. If, at step 258, it is determined that the tag is the EMBED tag, execution proceeds to step 260 where an enumerated type is assigned for the tag. Each occurrence of a valid EMBED tag specifies an embedded object. HTMLParse calls a routine "get.sub.--mark" in HTMLparse.c to put sections of HTML document text into a "markup" text data structure. Routine get.sub.--mark, in turn, calls ParseMarkType to assign an enumerated type. The enumerated type is an identifier with a unique integer associated with it that is used in later processing described below.

Once all of the hypermedia text in the text portion to be displayed has been parsed, execution of HTMLparse.c routines terminates at step 262.

Figure 7B:
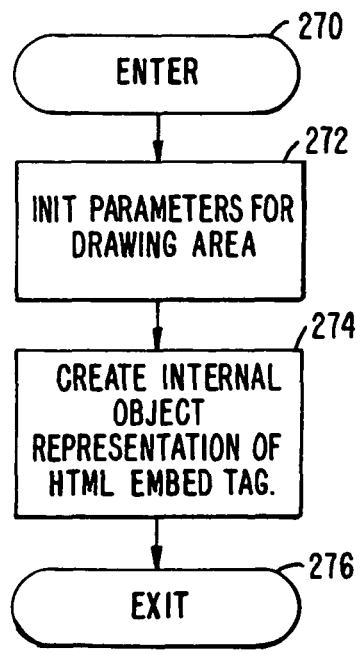
FIG. 7B is a flowchart of some of the functionality within the HTMLformat.c file.

FIG. 7B is a flowchart of routines in file HTMLformat.c to process the enumerated type created for the EMBED tag by routines in HTMLparse.c. In the X-Window implementation of a preferred embodiment, the enumerated type is processed as if it is a regular Motif/XT widget. For details on X-Window development see, e.g., "Xlib Programming Manual," "X Toolkit Intrinsics Programming Manual" and "Motif Programming Manual" published by O'Reilly & Associates, Inc. HTMLformat is entered at step 270 where a pointer to the enumerated type to process is passed.

At step 272 the parameters of the structure are initialized in preparation for inserting a DrawingArea widget on an HTML page. This includes providing values for the width and height of a window on the display to contain an image, position of the window, style, URL of the image object, etc. Various codes are also added by routines in HTMLformat.c (such as TriggerMarkChanges) to insert an internal representation of the HTML statement into an object list maintained internally by the browser. In the X-Window application corresponding to the source code of Appendix A, the browser is NCSA Mosaic version 2.4.

Figure 8A:
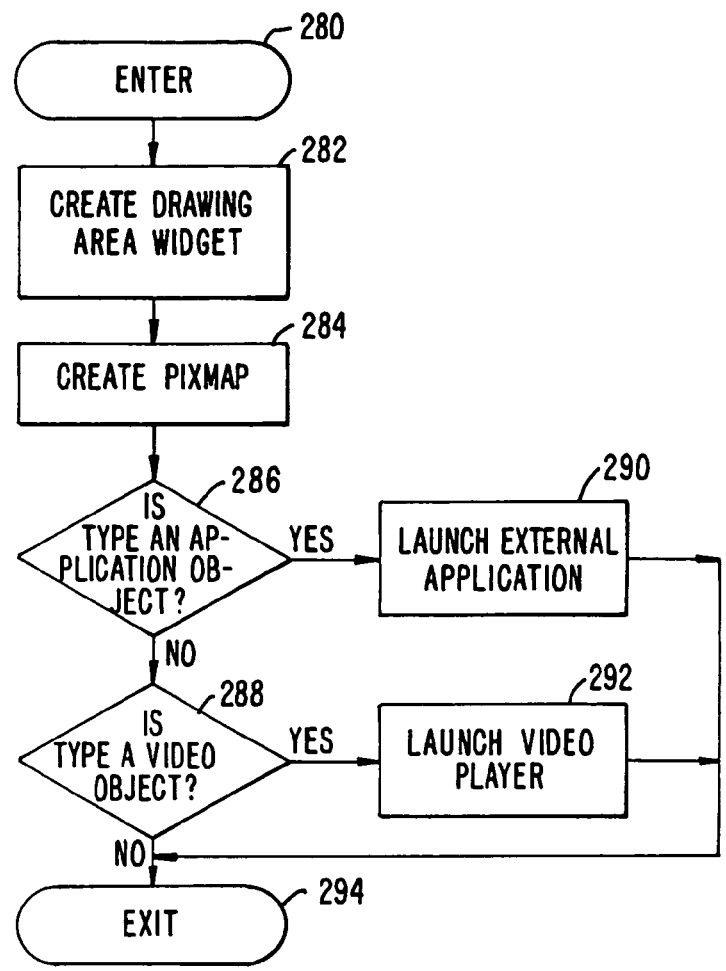
FIG. 8A is a flowchart of some of the functionality within the HTMLwidget.c file.

FIG. 8A is a flowchart for routine HTMLwidget. HTMLwidget creates display data structures and launches an external application program to handle the data object specified by the URL in the EMBED tag.

HTMLwidget is entered at step 280 after HTMLformat has created the internal object representation of the EMBED tag. HTMLwidget is passed the internal object and performs its processing on the object. At step 282 the DrawingArea widget is created according to the type of the internal representation, from HTMLformat, specified in the internal object. Similarly, at step 284 a pixmap area for backing storage is defined.

At step 286 a check is made as to whether the type attribute of the object, i.e., the value for the TYPE element of the EMBED tag, is an application. If so, step 290 is executed to launch a predetermined application. In a preferred embodiment an application is launched according to a user-defined list of application type/application pairs. The list is defined as a user-configurable)(Resource as described in "Xlib Programming Manual." An alternative embodiment could use the MIME database as the source of the list of application type/application pairs. The routine "vis.sub.--start.sub.--external.sub.--application" in file HTMLformat.c is invoked to match the application type and to identify the application to launch.

The external application is started as a child process of the current running process (Mosaic), and informed about the window ID of the DrawingArea created in HTMLformat. The external application is also passed information about the ID of the pixmap, the data URL and dimensions. Codes for communication such as popping-up/iconifying, start notification, quit notification and refresh notification with external applications and DrawingArea refreshing are also added. Examples of such codes are (1) "setup/start" in vis.sub.--register.sub.--client and vis. sub.--get panel.sub.--window in HTMLwidgets.c; (2) "handle messages from external applications" in vis.sub.--handle panel.sub.--msg in HTMLwidgets.c; (3) "send messages to external applications" in vis.sub.--send.sub.--msg in HTMLwidgets.c; (4) "terminate external applications" in vis.sub.--exit in HTMLwidgets.c which calls vis.sub.--send.sub.--msg to send a quit message; and (5) "respond to refresh msgs" in vis.sub.--redraw in HTMLwidgets.c.

If, at step 286, the type is determined not to be an application object (e.g., a three dimensional image object in the case of application "x-vis") a check is made at step 288 to determine if the type is a video object. If so, step 292 is executed to launch a video player application. Parameters are passed to the video player application to allow the player to display the video object within the DrawingArea within the display of the portion of hypermedia document on the client's computer. Note that many other application objects types are possible as described above.

Figure 8B:
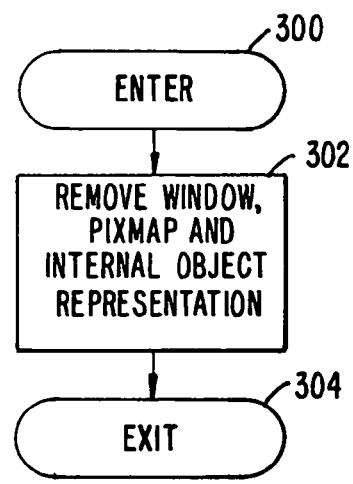
FIG. 8B is a flowchart of some of the functionality within the HTML.c file.

FIG. 8B is a flowchart for routine HTML. Routine HTML takes care of "shutting down" the objects, data areas, etc. that were set up to launch the external application and display the data object. HTML is entered at step 300 and is called when the display or other processing of the EMBED tag has been completed. At step 302 the display window is removed and the memory areas for the pixmap and internal object structure is made free for other uses. Completion of processing can be by user command or by computer control.

The present invention allows a user to have interactive control over application objects such as three dimensional image objects and video objects. In a preferred embodiment, controls are provided on the external applications' user interface. In the case of a VIS/panel application, a process, "panel" creates a graphical user interface (GUI) thru which the user interacts with the data. The application program, VIS, can be executing locally with the user's computer or remotely on a server, or on one or more different computers, on the network. The application program updates pixmap data and transfers the pixmap data (frame image data) to a buffer to which the browser has access. The browser only needs to respond to the refresh request to copy the contents from the updated pixmap to the DrawingArea. The Panel process sends messages as "Msg" sending performed by routines such as vis.sub.--send.sub.--msg and vis.sub.--handle panel.sub.--msg to send events (mousemove, keypress, etc.) to the external application.

Figure 9:
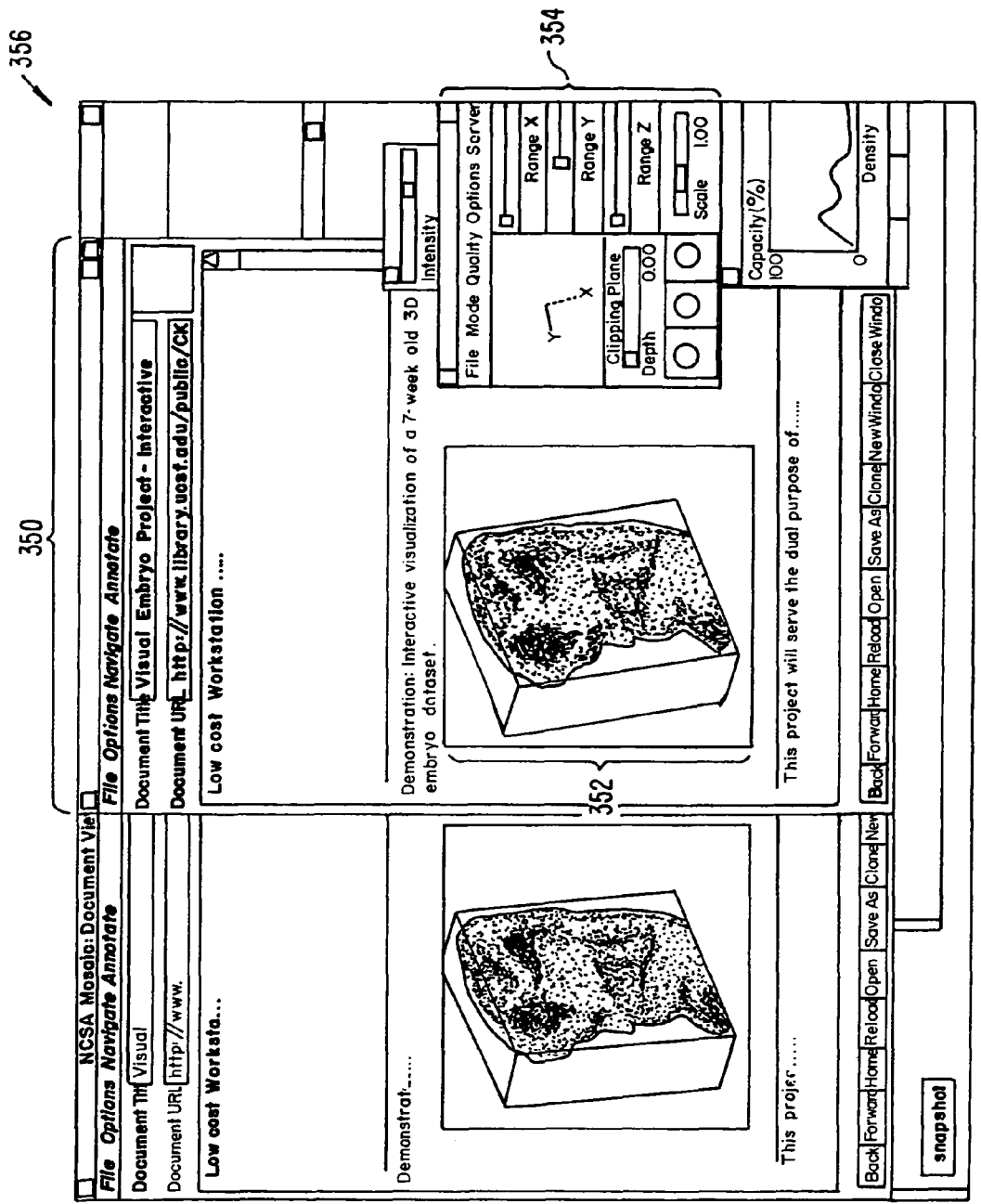
FIG. 9 is a screen display generated in accordance with the present invention.

FIG. 9 is a screen display of the invention showing an interactive application object (in this case a three dimensional image object) in a window within a browser window. In FIG. 9, the browser is NCSA Mosaic version 2.4. The processes VIS, Panel and VRServer work as discussed above. FIG. 9 shows screen display 356 Mosaic window 350 containing image window 352 and a portion of a panel window 354. Note that image window 352 is within Mosaic window 350 while panel window 354 is external to Mosaic window 350. Another possibility is to have panel window 354 within Mosaic window 350. By using the controls in panel window 354 the user is able to manipulate the image within image window 352 in real time do perform such operations as scaling, rotation, translation, color map selection, etc. In FIG. 9, two Mosaic windows are being used to show two different views of an embryo image. One of the views is rotated by six degrees from the other view so that a stereoscopic effect can be achieved when viewing the images. Communication between Panel and VIS is via "Tooltalk" described in, e.g., "Tooltalk 1.1.1 Reference Manual," from SunSoft.

Figure 10:
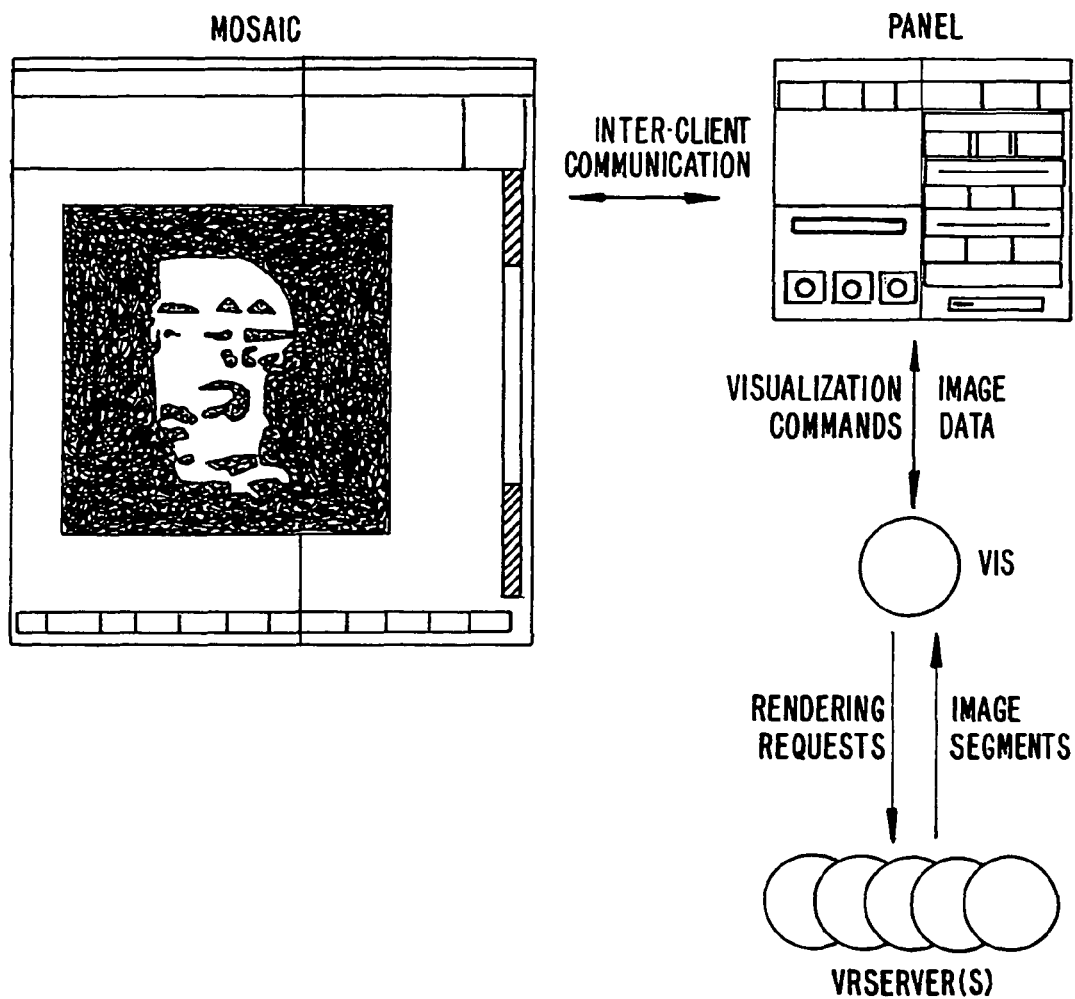
FIG. 10 is a diagram of the various processes and data paths in the present invention.

FIG. 10 is an illustration of the processes VIS, Panel and VRServer discussed above. As shown in FIG. 10, the browser process, Mosaic, communicates with the Panel process via inter-client communication mechanisms such as provided in the X-Window environment. The Panel process communicates with the VIS process through a communications protocol (ToolTalk, in the preferred embodiment) to exchange visualization command messages and image data. The image data is computed by one or more copies of a process called VRServer that may be executing on remote computers on the network. VRServer processes respond to requests such as rendering requests to generate image segments. The image segments are sent to VIS and combined into a pixmap, or frame image, by VIS. The frame image is then transferred to the Mosaic screen via communications between VIS, Panel and Mosaic. A further description of the data transfer may be found in the paper "Integrated Control of Distributed Volume Visualization Through the World-Wide-Web," referenced above.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for viewing delta encoded and compressed video images in a distributed hypermedia network environment, wherein the distributed hypermedia network environment comprises at least one client workstation and one remote network server coupled to the distributed hypermedia network environment, the method comprising:

receiving, at the client workstation from the network server over the distributed hypermedia network environment, at least one file containing information to enable a browser application to display at least a portion of a distributed hypermedia document within a browser-controlled window;

executing the browser application on the client workstation, with the browser application:

responding to text formats to initiate processing specified by the text formats;

displaying at least a portion of the document within the browser-controlled window;

identifying an embed text format which corresponds to a first location in the document;

automatically invoking program code, in response to the identifying of the embed text format, in order to enable an end-user to view a series of delta encoded and compressed video images, with the video images being displayed within a display area created at the first location within the portion of the hypermedia document being displayed in the browser-controlled window, wherein the series of delta encoded and compressed video images is received from a remote network server coupled to the distributed hypermedia network environment.

2. The method of claim 1 where:
the information to enable comprises text formats.

3. The method of claim 2 where:
the text formats are HTML tags.

4. The method of claim 1 where:
the information contained in the file received comprises at least one embed text format.

5. One or more non-transitory computer-readable storage media with an executable program stored thereon, for use in a distributed hypermedia network environment, wherein the network environment comprises at least one client workstation and one network server coupled to the distributed hypermedia network environment, and wherein the program instructs the client workstation to perform the following steps:

receiving, at the client workstation from the network server over the distributed hypermedia network environment, at least one file containing information to enable a browser application to display at least a portion of a distributed hypermedia document within a browser-controlled window;

utilizing the browser to:

respond to text formats to initiate processing specified by the text formats;

display at least a portion of the document within the browser-controlled window;

identify an embed text format which corresponds to a first location in the document;

automatically invoke program code, in response to the identifying of the embed text format, in order to enable an end-user to view a series of delta encoded and compressed video images, with the video images being displayed within a display area created at the first location within the portion of the hypermedia document being displayed in the browser-controlled window, wherein the series of video images is received from a remote network server coupled to the distributed hypermedia network environment.

6. One or more non-transitory computer-readable storage media of claim 5 where:
the information to enable comprises text formats.

7. One or more non-transitory computer-readable storage media of claim 6 where:
the text formats are HTML tags.

8. One or more non-transitory computer-readable storage media of claim 5 where:
the information contained in the file received comprises at least one embed text format.

9. A method of serving digital information in a network environment having a network server coupled to the network environment, and where the network environment is a distributed hypermedia environment, the method comprising:

transferring, using the network server, at least one file containing information onto the network environment, where the information enables at least one browser application, configured to execute on at least one client workstation, to:

display at least a portion of a distributed hypermedia document within a browser-controlled window;

respond to text formats to initiate processing specified by the text formats;

identify an embed text format which corresponds to a first location in the document;

automatically invoke program code, in response to the identifying of the embed text format, in order to enable an end-user to view a series of delta encoded and compressed video images, with the video images being displayed within a display area created at the first location within the portion of the hypermedia document being displayed in the browser-controlled window, wherein the series of video images is received from a remote network server coupled to the distributed hypermedia network environment.

10. The method of claim 9 where:
the information to enable comprises text formats.

11. The method of claim 10 where:
the text formats are HTML tags.

12. The method of claim 9 where:
the information contained in the file received comprises at least one embed text format.

13. One or more non-transitory computer-readable storage media with an executable program stored thereon, for use in a distributed hypermedia network environment, wherein the network environment comprises at least one client workstation and one network server coupled to the network environment, and wherein the program instructs the network server to perform the following step:

transferring at least one file containing information onto said network environment, wherein the information enables at least one browser application, configured to execute on at least one client workstation to:

display at least a portion of a distributed hypermedia document within a browser-controlled window;

respond to text formats to initiate processing specified by the text formats;

identify an embed text format which corresponds to a first location in the distributed hypermedia document;

automatically invoke program code, in response to the identifying of the embed text format, in order to enable an end-user to view a series of delta encoded and compressed video images, with the video images being displayed within a display area created at the first location within the portion of the hypermedia document displayed in the browser-controlled window, wherein the source of the series of video images is a remote network server coupled to the distributed hypermedia network environment.

14. One or more non-transitory computer-readable storage media of claim 13 where:
the information to enable comprises text formats.

15. One or more non-transitory computer-readable storage media of claim 14 where:
the text formats are HTML tags.

16. One or more non-transitory computer-readable storage media of claim 13 where:
the information contained in the file received comprises at least one embed text format.

17. A method, implemented by running program code in a network environment, wherein said network environment has at least one client workstation and one network server coupled to the network environment, the method comprising:
enabling an end-user to view a series of delta encoded and compressed video images by executing program code to display delta encoded and compressed video images within a display area created at a first location within a portion of a hypermedia document being displayed in a browser-controlled window, wherein said network environment is a distributed hypermedia environment, wherein said client workstation receives, over said network environment from said server, at least one file containing information to enable said browser application to display, on said client workstation, at least said portion of said distributed hypermedia document within said browser-controlled window, with the browser application responding to text formats to initiate processing specified by the text formats, wherein at least said portion of the document is displayed within the browser-controlled window, wherein an embed text format which corresponds to said first location in the document is identified by the browser, wherein the program code is automatically invoked by the browser, in response to the identifying of the embed text format, wherein the source of the series of delta encoded and compressed video images is a remote network server coupled to the distributed hypermedia network environment.

18. The method of claim 17 where:
the information to enable comprises text formats.

19. The method of claim 18 where:
the text formats are HTML tags.

20. The method of claim 17 where:
the information contained in the file received comprises at least one embed text format.

21. One or more non-transitory computer-readable storage media with an executable program stored thereon for use in a system having at least one client workstation and one network server coupled to a distributed hypermedia network environment, and wherein the program instructs the client workstation to perform the following steps:
displaying a series of delta encoded and compressed video images within a display area created at a first location within a portion of a hypermedia document being displayed in a browser-controlled window, wherein said network environment is a distributed hypermedia environment, wherein said client workstation receives, over said network environment from said server, at least one file containing information to enable said browser application to display, on said client workstation, at least said portion of said distributed hypermedia document within a browser-controlled window, with the browser application responding to text formats to initiate processing specified by the text formats, wherein at least said portion of the document is displayed within the browser-controlled window, wherein an embed text format which corresponds to said first location in the document is identified by the browser, wherein the program code is automatically invoked by the browser, in response to the identifying of the embed text format, wherein the series of delta encoded and compressed video images is received from a remote network server coupled to the distributed hypermedia network environment.

22. One or more non-transitory computer-readable storage media of claim 21 where:
the information to enable comprises text formats.

23. One or more non-transitory computer-readable storage media of claim 22 where:
the text formats are HTML tags.

24. One or more non-transitory computer-readable storage media of claim 21 where:
the information contained in the file received comprises at least one embed text format.

25. A method of serving digital information in a distributed hypermedia network environment having a network server coupled to the distributed hypermedia network environment, and where at least one client workstation is coupled to the distributed hypermedia network environment, the method comprising:
transferring, using a network video server, a series of delta encoded and compressed video images onto the network environment, with said at least one client workstation configured to execute at least one browser application, with said browser application configured to:
receive over said network environment from a network server, at least one file containing information to enable said browser application to display at least a portion of a distributed hypermedia document within a browser-controlled window;
respond to text formats to initiate processing specified by the text formats;
display at least said portion of the document within the browser-controlled window;
identify an embed text format which corresponds to said first location in the document;
automatically invoke program code, in response to the identifying of the embed text format, to enable an end-user to view said delta encoded and compressed video images, with the delta encoded and compressed video images being displayed within a display area created at the first location within the portion of the hypermedia document being displayed in the browser-controlled window.

26. The method of claim 25 where:
the information to enable comprises text formats.

27. The method of claim 26 where:
the text formats are HTML tags.

28. The method of claim 25 where:
the information contained in the file received comprises at least one embed text format.

* * * * *